US011955082B2

(12) United States Patent
Wang et al.

(10) Patent No.: US 11,955,082 B2
(45) Date of Patent: Apr. 9, 2024

(54) PIXEL CIRCUIT, DRIVING METHOD THEREOF, DISPLAY SUBSTRATE AND DISPLAY APPARATUS

(71) Applicants: Chongqing BOE Display Technology Co., Ltd., Chongqing (CN); BOE Technology Group Co., Ltd., Beijing (CN)

(72) Inventors: Rui Wang, Beijing (CN); Ming Hu, Beijing (CN); Haijun Qiu, Beijing (CN); Juntao Chen, Beijing (CN)

(73) Assignees: Chongqing BOE Display Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/032,811

(22) PCT Filed: May 30, 2022

(86) PCT No.: PCT/CN2022/096074

§ 371 (c)(1),
(2) Date: Apr. 20, 2023

(87) PCT Pub. No.: WO2023/230791

PCT Pub. Date: Dec. 7, 2023

(65) Prior Publication Data

US 2023/0386411 A1 Nov. 30, 2023

(51) Int. Cl.
*G09G 5/20* (2006.01)
*G09G 3/3258* (2016.01)

(52) U.S. Cl.
CPC .................... *G09G 3/3258* (2013.01); *G09G 2300/0426* (2013.01); *G09G 2300/0842* (2013.01); *G09G 2310/061* (2013.01); *G09G 2310/08* (2013.01)

(58) Field of Classification Search
CPC ......... G09G 3/3258; G09G 2300/0426; G09G 2300/0842; G09G 2310/061; G09G 2310/08
(Continued)

(56) References Cited

U.S. PATENT DOCUMENTS

2012/0050350 A1 3/2012 Matsui
2019/0355302 A1 11/2019 Ding et al.
(Continued)

FOREIGN PATENT DOCUMENTS

CN 106981268 A 7/2017
CN 107492343 A 12/2017
(Continued)

*Primary Examiner* — Jennifer T Nguyen
(74) *Attorney, Agent, or Firm* — Ling Wu; Stephen Yang; Ling and Yang Intellectual Property

(57) ABSTRACT

A pixel circuit is disposed in the display substrate, the display substrate includes a display stage and a non-display stage, the pixel circuit is configured to drive the light emitting element to emit light in the display stage, and includes a first control sub-circuit, a second control sub-circuit, a third control sub-circuit, a fourth control sub-circuit, a light emitting control sub-circuit and a driving sub-circuit; the third control sub-circuit is electrically connected with a third reset signal terminal, a control signal terminal and a third node respectively, and is configured to provide a first signal to the third node in the display stage and a second signal to the third node or acquire a signal of the third node in the non-display stage under control of the third reset signal terminal.

20 Claims, 22 Drawing Sheets

(58) Field of Classification Search
USPC ........................................................... 345/55
See application file for complete search history.

(56) References Cited

U.S. PATENT DOCUMENTS

| | | | | |
|---|---|---|---|---|
| 2020/0051500 | A1 | 2/2020 | Lin et al. | |
| 2020/0090583 | A1 | 3/2020 | Cai | |
| 2021/0107383 | A1 | 4/2021 | Qian et al. | |
| 2021/0134224 | A1 | 5/2021 | He et al. | |
| 2021/0335201 | A1 | 10/2021 | Yuan et al. | |
| 2021/0407386 | A1* | 12/2021 | Li ........................ | G09G 3/3291 |
| 2021/0407390 | A1* | 12/2021 | Li ........................ | G09G 3/3266 |
| 2022/0114958 | A1 | 4/2022 | Feng et al. | |
| 2022/0122522 | A1 | 4/2022 | Li et al. | |
| 2022/0180810 | A1* | 6/2022 | Zhang .................. | G09G 3/3233 |
| 2022/0189401 | A1 | 6/2022 | Dong et al. | |

FOREIGN PATENT DOCUMENTS

| | | | |
|---|---|---|---|
| CN | 109285500 | A | 1/2019 |
| CN | 110648629 | A | 1/2020 |
| CN | 112150967 | A | 12/2020 |
| CN | 112397026 | A | 2/2021 |
| CN | 113629127 | A | 11/2021 |
| CN | 114120881 | A | 3/2022 |
| CN | 114207703 | A | 3/2022 |
| WO | 2010134263 | A1 | 11/2010 |
| WO | 2021143765 | A1 | 7/2021 |

* cited by examiner

PIXEL CIRCUIT, DRIVING METHOD THEREOF, DISPLAY SUBSTRATE AND DISPLAY APPARATUS

CROSS-REFERENCE TO RELATED APPLICATION

This application is a national stage application of PCT Application No. PCT/CN2022/096074, which is filed on May 30, 2022 and entitled "Pixel Circuit, Driving Method Thereof, Display Substrate and Display Apparatus", the content of which should be regarded as being incorporated herein by reference.

TECHNICAL FIELD

The present disclosure relates to, but is not limited to, the field of display technology, and in particular to a pixel circuit and a driving method thereof, a display substrate and a display apparatus.

BACKGROUND

An Organic Light Emitting Diode (OLED for short) and a Quantum dot Light Emitting Diode (QLED for short) are active light emitting display devices and have advantages such as self-luminescence, a wide viewing angle, a high contrast ratio, low power consumption, extremely high response speed, lightness and thinness, flexibility, and low cost. With constant development of display technologies, a flexible display apparatus that uses an OLED or a QLED as a light emitting device and performs signal control by a Thin Film Transistor (TFT for short) has become a mainstream product in the field of display at present.

SUMMARY

The following is a summary of subject matter described herein in detail. The summary is not intended to limit the protection scope of claims.

In a first aspect, the present disclosure provides a pixel circuit disposed in a display substrate, the display substrate includes: a display stage and a non-display stage, the pixel circuit is configured to drive a light emitting element to emit light in the display stage, and includes: a first control sub-circuit, a second control sub-circuit, a third control sub-circuit, a fourth control sub-circuit, a light emitting control sub-circuit, and a driving sub-circuit.

The first control sub-circuit is electrically connected with a first power supply terminal, a second scanning signal terminal, a first reset signal terminal, a second reset signal terminal, a first initial signal terminal, a second initial signal terminal, a first node, a third node and a fourth node, respectively, and is configured to provide the signal of the first initial signal terminal or the third node to the first node under control of the first reset signal terminal and the second scanning signal terminal, and provide the signal of the second initial signal terminal to the fourth node under control of the second reset signal terminal.

The second control sub-circuit is electrically connected with a first scanning signal terminal, a third reset signal terminal, a third initial signal terminal, a data signal terminal and a second node, respectively, and is configured to provide signals of the third initial signal terminal or the data signal terminal to the second node under control of the third reset signal terminal and the first scanning signal terminal.

The third control sub-circuit is electrically connected with the third reset signal terminal, a control signal terminal and the third node respectively, and is configured to provide a first signal to the third node in the display stage and provide a second signal to the third node or acquire a signal of the third node in the non-display stage under control of the third reset signal terminal.

The driving sub-circuit is electrically connected with the first node, the second node and the third node, respectively, and is configured to provide driving current to the third node under control of the first node and the second node.

The light emitting control sub-circuit is electrically connected with a light emitting signal terminal, the first power supply terminal, the second node, the third node and the fourth node respectively, and is configured to provide the signal of the first power supply terminal to the second node and the signal of the third node to the fourth node under control of the light emitting signal terminal.

The light emitting element is electrically connected with the fourth node and the second power supply terminal respectively.

The voltage value of the first signal is less than the voltage value of the signal of the third initial signal terminal, and the voltage value of the second signal is greater than the voltage value of the signal of the third initial signal terminal.

In some possible implementation modes, in the display stage, when the signal of the first reset signal terminal is an effective level signal, the signal of the third reset signal terminal is an effective level signal, and the signals of the first scanning signal terminal, the second scanning signal terminal and the light emitting signal terminal are ineffective level signals.

When the first scanning signal terminal is an effective level signal, the signal of the second scanning signal terminal is an effective level signal, and the signals of the first reset signal terminal, the third reset signal terminal and the light emitting signal terminal are ineffective level signals.

Voltage values of the signals of the first initial signal terminal, the second initial signal terminal and the third initial signal terminal are constant.

In some possible implementation modes, in the display stage, the occurrence time of the signal of the second reset signal terminal being an effective level signal is before the occurrence time of the signal of the first reset signal terminal being an effective level signal, alternatively, the occurrence time of the signal of the second reset signal terminal being an effective level signal is within the occurrence time of the signal of the third reset signal terminal being an effective level signal, alternatively, the occurrence time of the signal of the second reset signal terminal being an effective level signal is within the occurrence time of the signal of the first scanning signal terminal being an effective level signal, alternatively, the occurrence time of the signal of the second reset signal terminal being an effective level signal is after the occurrence time of the signal of the first scanning signal terminal being an effective level signal.

In some possible implementation modes, the signal of the second reset signal terminal is the same as the signal of the third reset signal terminal when the occurrence time of the signal of the second reset signal terminal being an effective level signal is within the occurrence time of the signal of the third scanning signal terminal being an effective level signal.

The signal of the second reset signal terminal is the same as the signal of the first scanning signal terminal, when the occurrence time of the signal of the second reset signal terminal being an effective level signal is within the occurrence time of the signal of the first scanning signal terminal being an effective level signal.

In some possible implementation modes, the first control sub-circuit includes: a first reset sub-circuit, a second reset sub-circuit, a compensation sub-circuit, and a storage sub-circuit.

The first reset sub-circuit is electrically connected with the first reset signal terminal, the first initial signal terminal and the first node respectively, and is configured to provide the signal of the first initial signal terminal to the first node under control of the first reset signal terminal.

The second reset sub-circuit is electrically connected with the second reset signal terminal, the second initial signal terminal and the fourth node respectively, and is configured to provide the signal of the second initial signal terminal to the fourth node under control of the second reset signal terminal.

The compensation sub-circuit is electrically connected with the first node, the third node and the second scanning signal terminal respectively, and is configured to provide the signal of the third node to the first node under control of the second scanning signal terminal.

The storage sub-circuit is electrically connected with the first power supply terminal and the first node, respectively, and is configured to store the voltage difference between the signal of the first power supply terminal and the signal of the first node.

In some possible implementation modes, the second control sub-circuit includes: a third reset sub-circuit and a write sub-circuit.

The third reset sub-circuit is electrically connected with the third reset signal terminal, the third initial signal terminal and the second node respectively, and is configured to provide the signal of the third initial signal terminal to the second node under control of the third reset signal terminal.

The write sub-circuit is electrically connected with the first scanning signal terminal, the data signal terminal and the second node, respectively, and is configured to provide the signal of the data signal terminal to the second node under control of the first scanning signal terminal.

In some possible implementation modes, the first reset sub-circuit includes: a first transistor, the second reset sub-circuit includes: a seventh transistor, the compensation sub-circuit includes: a second transistor, and the storage sub-circuit includes: a capacitor, the capacitor includes: a first plate and a second plate.

A control electrode of the first transistor is electrically connected with the first reset signal terminal, a first electrode of the first transistor is electrically connected with the first initial signal terminal, and a second electrode of the first transistor is electrically connected with the first node.

A control electrode of the second transistor is electrically connected with the second scanning signal terminal, a first electrode of the second transistor is electrically connected with the first node, and a second electrode of the second transistor is electrically connected with the third node.

A control electrode of the seventh transistor is electrically connected with the second reset signal terminal, a first electrode of the seventh transistor is electrically connected with the second initial signal terminal, and a second electrode of the seventh transistor is electrically connected with the fourth node.

The first plate of the capacitor is electrically connected with the first node, and the second plate of the capacitor is electrically connected with the first power supply terminal.

In some possible implementation modes, the write sub-circuit includes: a fourth transistor, and the third reset sub-circuit includes: an eighth transistor.

A control electrode of the fourth transistor is electrically connected with the first scanning signal terminal, a first electrode of the fourth transistor is electrically connected with the data signal terminal, and a second electrode of the fourth transistor is electrically connected with the second node.

A control electrode of the eighth transistor is electrically connected with the third reset signal terminal, a first electrode of the eighth transistor is electrically connected with the third initial signal terminal, and a second electrode of the eighth transistor is electrically connected with the second node.

In some possible implementation modes, the third control sub-circuit includes: a ninth transistor.

A control electrode of the ninth transistor is electrically connected with the third reset signal terminal, a first electrode of the ninth transistor is electrically connected with the control signal terminal, and a second electrode of the ninth transistor is electrically connected with the third node.

In some possible implementation modes, the first control sub-circuit includes: a first transistor, a second transistor, a seventh transistor, and a capacitor, the capacitor including: a first plate and a second plate; the second control sub-circuit includes a fourth transistor and an eighth transistor; the third control sub-circuit includes a ninth transistor, the driving sub-circuit includes a third transistor, and the light emitting control sub-circuit includes a fifth transistor and a sixth transistor.

A control electrode of the first transistor is electrically connected with the first reset signal terminal, a first electrode of the first transistor is electrically connected with the first initial signal terminal, and a second electrode of the first transistor is electrically connected with the first node.

A control electrode of the second transistor is electrically connected with the second scanning signal terminal, a first electrode of the second transistor is electrically connected with the first node, and a second electrode of the second transistor is electrically connected with the third node.

A control electrode of the third transistor is electrically connected with the first node, a first electrode of the third transistor is electrically connected with the second node, and a second electrode of the third transistor is electrically connected with the third node.

A control electrode of the fourth transistor is electrically connected with the first scanning signal terminal, a first electrode of the fourth transistor is electrically connected with the data signal terminal, and a second electrode of the fourth transistor is electrically connected with the second node.

A control electrode of the fifth transistor is electrically connected with the light emitting signal terminal, a first electrode of the fifth transistor is electrically connected with the first power supply terminal, and a second electrode of the fifth transistor is electrically connected with the second node.

A control electrode of the sixth transistor is electrically connected with the light emitting signal terminal, a first electrode of the sixth transistor is electrically connected with the third node, and a second electrode of the sixth transistor is electrically connected with the fourth node.

A control electrode of the seventh transistor is electrically connected with the second reset signal terminal, a first electrode of the seventh transistor is electrically connected with the second initial signal terminal, and a second electrode of the seventh transistor is electrically connected with the fourth node.

A control electrode of the eighth transistor is electrically connected with a third reset signal terminal, a first electrode of the eighth transistor is electrically connected with the third initial signal terminal, and a second electrode of the eighth transistor is electrically connected with the second node.

A control electrode of the ninth transistor is electrically connected with the third reset signal terminal, a first electrode of the ninth transistor is electrically connected with the control signal terminal, and a second electrode of the ninth transistor is electrically connected with the third node.

The first plate of the capacitor is electrically connected with the first node, and the second plate of the capacitor is electrically connected with the first power supply terminal.

In some possible implementation modes, the first transistor and the second transistor are of opposite transistor types to the third transistor to the ninth transistor.

The first transistor and the second transistor are oxide transistors and are N-type transistors.

In a second aspect, the present disclosure also provides a display substrate including: a base substrate, and a circuit structure layer and a light emitting structure layer sequentially disposed on the base substrate, the light emitting structure layer includes: a light emitting element, the circuit structure layer includes: pixel circuits arranged in an array described above.

In some possible implementation modes, when the occurrence time of the signal of the second reset signal terminal being an effective level signal is before the occurrence time of the signal of the first reset signal terminal being an effective level signal, the signals of the second reset signal terminals of the pixel circuits of an i-th row are the same as the signals of the first scanning signal terminals of the pixel circuits of an i−1th row.

When the occurrence time of the signal of the second reset signal terminal being an effective level signal is after the occurrence time of the signal of the first scanning signal terminal being an effective level signal, the signals of the second reset signal terminals of the pixel circuits of the i-th row are the same as the signals of the first scanning signal terminals of the pixel circuits of the i+1th row.

In some possible implementation modes, the circuit structure layer further includes: a plurality of first reset signal lines, a plurality of second reset signal lines, a plurality of third reset signal lines, a plurality of first scanning signal lines, a plurality of second scanning signal lines, a plurality of first initial signal lines, a plurality of second initial signal lines, a plurality of third initial signal lines, a plurality of light emitting signal lines and a plurality of control signal lines extending in a first direction and arranged in a second direction, and a plurality of first power supply lines and a plurality of data signal lines extending along the second direction and arranged along the first direction, the first direction intersects the second direction.

The first reset signal terminal of the pixel circuit is electrically connected with the first reset signal line, the second reset signal terminal is connected with the second reset signal line, the third reset signal terminal is electrically connected with the third reset signal line, the first scanning signal terminal is electrically connected with the first scanning signal line, the second scanning signal terminal is electrically connected with the second scanning signal line, the light emitting signal terminal is electrically connected with the light emitting signal line, the first initial signal terminal is electrically connected with the first initial signal line, the second initial signal terminal is electrically connected with the second initial signal line, the second initial signal terminal is electrically connected with the second initial signal line, the control signal terminal is electrically connected with the control signal line, the first power supply terminal is electrically connected with the first power supply line, and the data signal terminal is electrically connected with the data signal line.

In some possible implementation modes, the display substrate also includes a first chip connected with the control signal line and a second chip connected with the data signal line.

The first chip is configured to provide a first signal to the control signal line in a display stage, provide a second signal to the control signal line or acquire the signal of the control signal line in a non-display stage, and further configured to obtain a threshold voltage of the third transistor according to the signal of the control signal line, generate a control signal according to the threshold voltage of the third transistor, and transmit the control signal to the second chip.

The second chip provides a signal to the data signal line according to the control signal.

In some possible implementation modes, pixel structures of adjacent pixel circuits located in a same row are symmetrical with respect to a virtual straight line extending in the second direction.

Adjacent pixel circuits located on a same row as the pixel circuit include a first adjacent pixel circuit and a second adjacent pixel circuit.

In some possible implementation modes, the pixel circuit includes: a first transistor to a ninth transistor, and a control electrode of the first transistor and a control electrode of the second transistor each include: a first control electrode and a second control electrode.

The first reset signal line includes a first sub-reset signal line and a second sub-reset signal line which are provided in different layers and connected with each other, the first sub-reset signal line and the first control electrode of the first transistor are provided in a same layer, and the second sub-reset signal line and the second control electrode of the first transistor are provided in a same layer.

The second scanning signal line includes a first sub-scanning signal line and a second sub-scanning signal line which are provided in different layers and connected with each other, the first sub-scanning signal line and the first control electrode of the second transistor are provided in a same layer, and the second sub-scanning signal line and the second control electrode of the second transistor are provided in a same layer.

In some possible implementation modes, the pixel circuit further includes a capacitor, the capacitor includes: a first plate and a second plate, the circuit structure layer includes a first insulating layer, a first semiconductor layer, a second insulating layer, a first conductive layer, a third insulating layer, a second conductive layer, a fourth insulating layer, a second semiconductor layer, a fifth insulating layer, a third conductive layer, a sixth insulating layer, a fourth conductive layer, a seventh insulating layer, a first planarization layer and a fifth conductive layer which are sequentially stacked on the base substrate.

The first semiconductor layer includes an active layer of a third transistor to an active layer of a ninth transistor located in at least one pixel circuit.

The first conductive layer includes: a first scanning signal line, a light emitting signal line, and a first plate of a capacitor, a control electrode of a third transistor to a control electrode of a ninth transistor located in at least one pixel circuit.

The second conductive layer includes a first initial signal line, a first sub-reset signal line, a first sub-scanning signal line, a control signal line, and a second plate of a capacitor, a first control electrode of a first transistor and a first control electrode of a second transistor located in at least one pixel circuit.

The second semiconductor layer includes an active layer of a first transistor, an active layer of a second transistor and an active connection part located in at least one pixel circuit; the active connection part is configured to connect the active layer of the first transistor and the active layer of the second transistor.

The third conductive layer includes a second sub-reset signal line, a second sub-scanning signal line, a third reset signal line and a third initial signal line, and a second control electrode of a first transistor and a second control electrode of a second transistor located in at least one pixel circuit.

The fourth conductive layer includes: a second initial signal line and a first electrode and a second electrode of a first transistor, a first electrode and a second electrode of the second transistor, a first electrode of the fourth transistor, a first electrode of the fifth transistor, a second electrode of the sixth transistor, a first electrode and a second electrode of the seventh transistor, a first electrode of the eighth transistor, a first electrode of the ninth transistor and a first connection electrode located in at least one pixel circuit; the first connection electrode is configured to connect a control electrode of the eighth transistor, a control electrode of the ninth transistor and the third reset signal line.

The fifth conductive layer includes a first power supply line, a data signal line, and a second connection electrode located in at least one pixel circuit, the second connection electrode is configured to connect a second electrode of the sixth transistor and the light emitting element.

In some possible implementation modes, the circuit structure layer further includes: a light shielding layer positioned on a side of the first insulating layer close to the base substrate, the light shielding layer includes: light shielding parts and light shielding connection parts arranged in an array and disposed at intervals; the light shielding connection part is configured to connect adjacent light shielding parts.

The orthographic projection of the light shielding part on the base substrate overlaps at least a part the orthographic projection of the active layer of the third transistor on the base substrate.

In some possible implementation modes, a control electrode of the eighth transistor and a control electrode of the ninth transistor are of an integrally formed structure.

The first scanning signal line and the light emitting signal line connected to the pixel circuit are respectively located on two sides of the first plate of the capacitor of the pixel circuit, and the integrally formed structure of the control electrode of the eighth transistor and the control electrode of the ninth transistor is located between the first plate of the capacitor and the light emitting signal line connected to the pixel circuit.

In some possible implementation modes, the first control electrode of the first transistor and the first sub-reset signal line are of an integrally formed structure, and the first control electrode of the second transistor and the first sub-scanning signal line are of an integrally formed structure.

A first initial signal line, a first sub-reset signal line and a first sub-scanning signal line connected to the pixel circuit extend in a first direction and are located on the same side of the second plate of the capacitor of the pixel circuit, the first sub-reset signal line is located on a side of the first initial signal line close to the second plate of the capacitor of the pixel circuit, and the first sub-scanning signal line is located on a side of the first sub-reset signal line close to the second plate of the capacitor of the pixel circuit; the control signal line is located on a side of the second plate of the capacitor of the pixel circuit away from the first sub-scanning signal line.

The orthographic projection of the first scanning signal line on the base substrate is located between the orthographic projection of the first sub-reset signal line on the base substrate and the orthographic projection of the first sub-scanning signal line on the base substrate.

The orthographic projection of the integrally formed structure of a control electrode of the eighth transistor and a control electrode of the ninth transistor on the base substrate is located between the orthographic projection of the second plate of the capacitor on the base substrate and the orthographic projection of the control signal line on the base substrate.

The orthographic projection of the control signal line on the base substrate is located between the orthographic projection of the light emitting signal line on the base substrate and the orthographic projection of the integrally formed structure of the control electrode of the eighth transistor and the control electrode of the ninth transistor on the base substrate.

The second plate of the capacitor of the pixel circuit is electrically connected with the second plate of the capacitor of the first adjacent pixel circuit.

In some possible implementation modes, an active layer of the first transistor and an active layer of the second transistor are respectively located on two sides of the active connection part.

The orthographic projection of the active layer of the first transistor on the base substrate overlaps the orthographic projection of the first initial signal line on the base substrate.

The orthographic projection of the active layer of the second transistor on the base substrate overlaps the orthographic projection of the first sub-scanning signal line on the base substrate.

The orthographic projection of the active connection part on the base substrate at least overlaps a part of the orthographic projection of the first scanning signal line on the base substrate.

In some possible implementation modes, a second control electrode of the first transistor and the second sub-reset signal line are of an integrally formed structure, and a second control electrode of the second transistor and the second sub-scanning signal line are of an integrally formed structure.

The second sub-scanning signal line is located between the second sub-reset signal line and the third reset signal line, and the third initial signal line is located on a side of the third reset signal line away from the second sub-reset signal line.

The orthographic projection of the second sub-reset signal line on the base substrate at least overlaps a part of the orthographic projection of the first sub-reset signal line on the base substrate and is located between the orthographic projection of the first initial signal line on the base substrate and the orthographic projection of the first scanning signal line on the base substrate.

The orthographic projection of the second sub-scanning signal line on the base substrate at least overlaps a part of the orthographic projection of the first sub-scanning signal line on the base substrate and is located between the orthographic projection of the first scanning signal line on the base substrate and the orthographic projection of the second plate of the capacitor on the base substrate.

The orthographic projection of the third reset signal line on the base substrate is located between the orthographic projection of the second plate of the capacitor on the base substrate and the orthographic projection of the integrally formed structure of the control electrode of the eighth transistor and the control electrode of the ninth transistor on the base substrate.

The orthographic projection of the third initial signal line on the base substrate is located on a side of the orthographic projection of the control signal line on the base substrate away from the orthographic projection of the second plate of the capacitor on the base substrate, and overlaps a part of the orthographic projections of the light emitting signal line and the control signal line on the base substrate.

In some possible implementation modes, the sixth insulating layer is opened with a plurality of via patterns, the plurality of via patterns include: a first via to a seventh via opened on the second insulating layer to the sixth insulating layer, an eighth via and ninth via opened on the third to sixth insulating layers, a tenth via to a twelfth via opened on the fourth to sixth insulating layers, a thirteenth via to a fifteenth via opened on the fifth and sixth insulating layers, and a sixteenth via and a seventeenth via opened on the sixth insulating layer.

The third via exposes the active layer of the fifth transistor, the tenth via exposes the first initial signal line, and the eleventh via exposes the second plate of the capacitor; a virtual straight line extending in the second direction passes through the third via and the eleventh via.

The third via of the pixel circuit and the third via of the first adjacent pixel circuit are a same via.

The eleventh via of the pixel circuit and the eleventh via of the first adjacent pixel circuit are a same via.

The tenth via of the pixel circuit and the tenth via of the second adjacent pixel circuit are a same via.

In some possible implementation modes, the first electrode of the fifth transistor of the pixel circuit and the first electrode of the fifth transistor of the first adjacent pixel circuit are a same electrode.

The orthographic projection of the second initial signal line on the base substrate overlaps a part of the orthographic projections of the first reset signal line and the first scanning signal line on the base substrate.

The orthographic projection of the integrally formed structure of the second electrode of the first transistor and the second electrode of the second transistor on the base substrate at least overlaps a part of the orthographic projections of the active connection part, the second scanning signal line and the second plate of the capacitor on the base substrate.

The orthographic projection of the first electrode of the fifth transistor on the base substrate overlaps the orthographic projections of the second plate of the capacitor, the third reset signal line, the control signal line, the light emitting signal line and the third initial signal line on the base substrate.

The orthographic projection of the first connection electrode on the base substrate at least overlaps a part of the orthographic projections of the third reset signal line and the control electrode of the eighth transistor on the base substrate.

The orthographic projection of the first electrode of the eighth transistor on the base substrate overlaps a part of the orthographic projections of the control signal line, the light emitting signal line and the third initial signal line on the base substrate.

The orthographic projection of the first electrode of the ninth transistor on the base substrate overlaps a part of the orthographic projection of the control signal line on the base substrate.

In some possible implementation modes, the data signal line and the first power supply line connected to the pixel circuit are located on a same side of the second connection electrode.

The first power supply line includes: a power supply body part and a power supply connection part connected with each other, wherein, the power supply connection part is located on a side of the power supply body part away from the data signal line.

The power supply connection part of the first power supply line connected to the pixel circuit is connected with the power supply connection part of the first power supply line connected to the second adjacent pixel circuit.

The orthographic projection of the power supply connection part on the base substrate overlaps a part of the orthographic projections of the active connection part, the second scanning signal line, the first scanning signal line and the second initial signal line on the base substrate.

In a third aspect, the present disclosure also provides a display apparatus, which includes the display substrate described above.

In a fourth aspect, the present disclosure also provides a driving method of a pixel circuit, which is configured to drive the pixel circuit described above, the method including:

The first control sub-circuit provides the signal of the first initial signal terminal or the third node to the first node under control of the first reset signal terminal and the second scanning signal terminal, and provides the signal of the second initial signal terminal to the fourth node under control of the second reset signal terminal.

The second control sub-circuit provides the signal of the third initial signal terminal or the data signal terminal to the second node under control of the third reset signal terminal and the first scanning signal terminal.

The third control sub-circuit provides a first signal to the third node in the display stage and a second signal to the third node or obtains a signal of the third node in the non-display stage under control of the third reset signal terminal.

The driving sub-circuit provides driving current to the third node under control of the first node and the second node.

The light emitting control sub-circuit provides the signal of the first power supply terminal to the second node and the signal of the third node to the fourth node under control of the light emitting signal terminal.

Other aspects may be understood upon reading and understanding the drawings and detailed description.

BRIEF DESCRIPTION OF DRAWINGS

The accompanying drawings are used for providing understanding of technical solutions of the present disclosure, and form a part of the specification. They are used for explaining the technical solutions of the present disclosure together with the embodiments of the present disclosure, but do not form a limitation on the technical solutions of the present disclosure.

DETAILED DESCRIPTION

Figure 1:
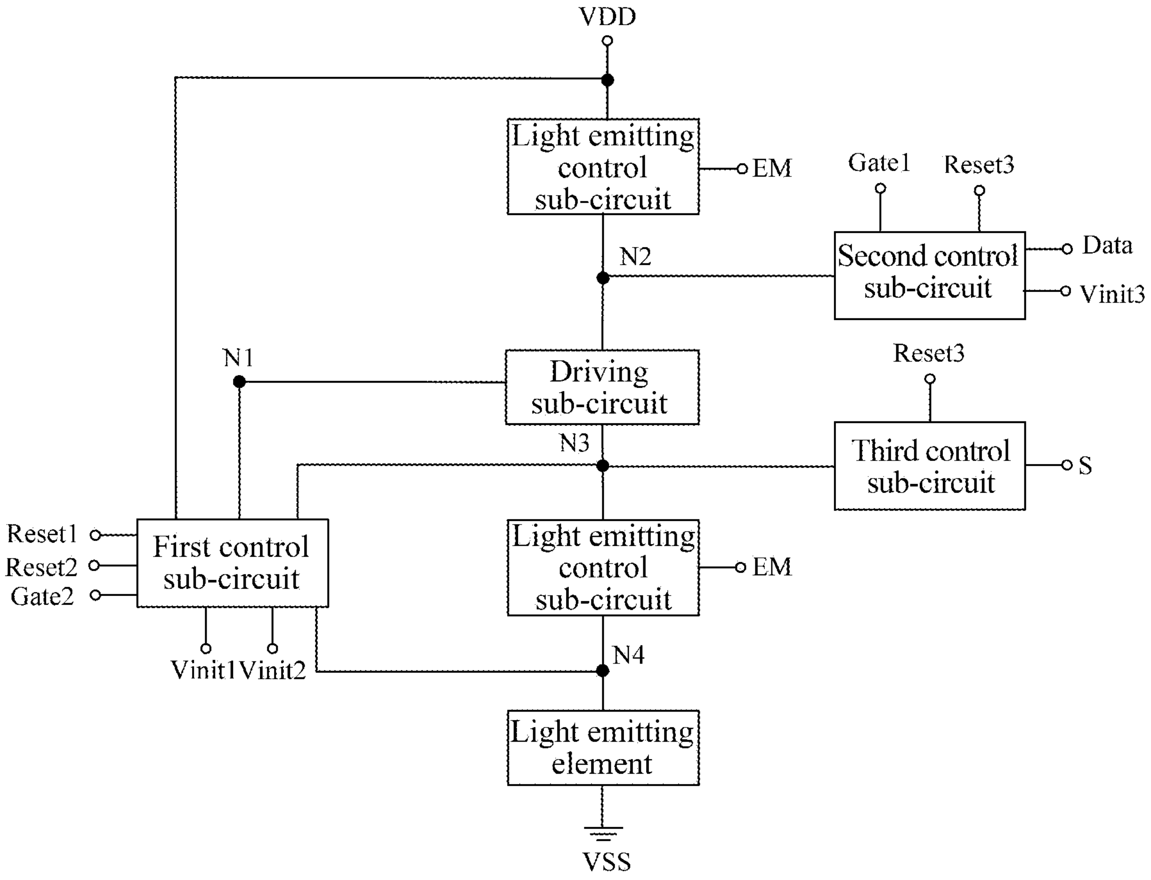
FIG. 1 is a schematic diagram of a structure of a pixel circuit provided by an embodiment of the present disclosure.

To make objectives, technical solutions, and advantages of the present disclosure clearer, the embodiments of the present disclosure will be described in detail with reference to the accompanying drawings. It is to be noted that implementations may be implemented in a plurality of different forms. Those of ordinary skills in the art may easily understand such a fact that implementations and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other without conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to usual designs.

In the drawings, a size of each constituent element, a thickness of a layer, or a region is exaggerated sometimes for clarity. Therefore, one implementation mode of the present disclosure is not necessarily limited to the sizes, and shapes and sizes of various components in the drawings do not reflect actual scales. In addition, the drawings schematically illustrate ideal examples, and one implementation of the present disclosure is not limited to the shapes, numerical values, or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. A connection may be a fixed connection, a detachable connection, or an integral connection. It may be a mechanical connection or an electrical connection. It may be a direct mutual connection, or an indirect connection through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connection" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulating film" may be replaced with an "insulation layer" sometimes.

In the present disclosure, "about" refers to that a boundary is defined not so strictly and numerical values within process and measurement error ranges are allowed.

Low Temperature Poly-Silicon (LTPS for short) technology is used in a display substrate. The LTPS technology has advantages such as high resolution, a high response speed, high brightness, and a high aperture ratio. Although it is welcomed by the market, the LTPS technology also has some defects, such as a relatively high production cost and relatively large power consumption. At this time, a technology solution of Low Temperature Polycrystalline Oxide (LTPO for short) came into being. Compared with the LTPS technology, in the LTPO technology a leakage current is smaller, pixel point response is faster, and an additional layer of oxide is added to a display substrate, which reduces energy consumption required for exciting pixel points, thus reducing power consumption during displaying of a screen. In display products using LTPO technology, the aging degree of driving transistors in different pixel circuits are different, and the display substrate cannot monitor the threshold voltage of driving transistors, which reduces the display effect, service life and reliability of the display substrate.

FIG. 1 is a schematic diagram of a structure of a pixel circuit provided by an embodiment of the present disclosure. As shown in FIG. 1, a pixel circuit provided by an embodiment of the present disclosure is disposed in a display substrate, the display substrate includes a display stage and a non-display stage, the pixel circuit is configured to drive a light emitting element to emit light in the display stage, and includes a first control sub-circuit, a second control sub-circuit, a third control sub-circuit, a fourth control sub-circuit, a light emitting control sub-circuit, and a driving sub-circuit.

As shown in FIG. 1, the first control sub-circuit is electrically connected with the first power supply terminal VDD, the second scanning signal terminal Gate2, the first reset signal terminal Reset1, the second reset signal terminal Reset2, the first initial signal terminal Vinit1, the second initial signal terminal Vinit2, the first node N1, the third node N3 and the fourth node N4, respectively, and is configured to provide the signal of the first initial signal terminal Vinit1 or the third node N3 to the first node N1 under control of the first reset signal terminal Reset1 and the second scanning signal terminal Gate2, provide the signal of the second initial signal terminal Vinit2 to the fourth node N4 under control of the second reset signal terminal Reset2; the second control sub-circuit is electrically connected with the first scanning signal terminal Gate1, the third reset signal terminal Reset3, the third initial signal terminal Vinit3, the data signal terminal Data and the second node N2, respectively, and is configured to provide the signal of the third initial signal terminal Vinit3 or the data signal terminal Data to the second node N2 under control of the third reset signal terminal Reset3 and the first scanning signal terminal Gate1; the third control sub-circuit is electrically connected with the third reset signal terminal Reset3, the control signal terminal S and the third node N3, respectively, and is configured to provide a first signal to the third node N3 in the display stage and a second signal to the third node N3 in the non-display stage or to obtain a signal of the third node N3 under control of the third reset signal terminal Reset3; the driving sub-circuit is electrically connected with the first node N1, the second node N2 and the third node N3, respectively, and is configured to provide a driving current to the third node N3 under control of the first node N1 and the second node N2; the light emitting control sub-circuit is electrically connected with the light emitting signal terminal EM, the first power supply terminal VDD, the second node N2, the third node N3 and the fourth node N4, respectively, and is configured to provide the signal of the first power supply terminal VDD to the second node N2 and the signal of the third node N3 to the fourth node N4 under control of the light emitting signal terminal EM.

As shown in FIG. 1, the light emitting element is electrically connected with the fourth node N4 and the second power supply terminal VSS, respectively.

In an exemplary embodiment, the voltage value of the signal of the first initial signal terminal Vinit1 is constant and is a DC signal, and the voltage value of the signal of the first initial signal terminal Vinit1 may be −3V.

In an exemplary embodiment, the voltage value of the signal of the second initial signal terminal Vinit2 is constant and is a DC signal, and the voltage value of the signal of the second initial signal terminal Vinit2 may be 0V.

In an exemplary embodiment, the voltage value of the signal of the third initial signal terminal Vinit3 is constant and is a DC signal, and the voltage value of the signal of the third initial signal terminal Vinit3 may be 5V.

In an exemplary embodiment, the voltage value of the first signal is less than the voltage value of the signal of the third initial signal terminal Vinit3.

In an exemplary embodiment, the voltage value of the first signal may be constant, the constant voltage value of the first signal may make the aging degree of the third node of the pixel circuit consistent, and the voltage value of the first signal may be 0V.

In an exemplary embodiment, the voltage value of the second signal is greater than the voltage value of the signal of the third initial signal terminal Vinit3 and the voltage value of the second signal may be 6V. The voltage value of the second signal is greater than the voltage value of the signal of the third initial signal terminal Vinit3, so that the voltage value of the third node is greater than the voltage value of the second node in the non-display stage, and the current flow direction of the driving sub-circuit can be improved.

In an exemplary embodiment, the light emitting element may is electrically connected with the fourth node N4 and the second power supply terminal VSS, respectively.

In an exemplary embodiment, the non-display stage may include a power-on stage, a power-off stage and a blank stage between the display stages.

In an exemplary embodiment, the first power supply terminal VDD continuously provides a high-level signal, and the second power supply terminal VSS continuously provides a low-level signal.

In an exemplary embodiment, a DC signal may be a signal with a magnitude and direction that do not vary with time. For example, the first signal may be a DC signal with a constant voltage value.

In an exemplary embodiment, the threshold voltage of the driving sub-circuit can be obtained according to the signal of the third node acquired by the control signal terminal, and the signal of the data signal terminal can be controlled according to the threshold voltage of the driving sub-circuit, so that the external compensation for the pixel circuit can be realized, and the display effect of the display substrate can be improved.

In an exemplary embodiment, the light emitting element may be an Organic light emitting Diode (OLED), including a first electrode (anode), an organic light emitting layer, and a second electrode (cathode) that are stacked. Exemplarily, an anode of the organic light emitting diode is electrically connected with the fourth node N4, and a cathode of the organic light emitting diode is electrically connected with the second power supply terminal VSS.

In an exemplary embodiment, the organic emitting layer may include a Hole Injection Layer (HIL for short), a Hole Transport Layer (HTL for short), an Electron Block Layer (EBL for short), an Emitting Layer (EML for short), a Hole Block Layer (HBL for short), an Electron Transport Layer (ETL for short), and an Electron Injection Layer (EIL for short) that are stacked. In an exemplary implementation mode, hole injection layers of all sub-pixels may be a common layer connected together, electron injection layers of all the sub-pixels may be a common layer connected together, hole transport layers of all the sub-pixels may be a common layer connected together, electron transport layers of all the sub-pixels may be a common layer connected together, hole block layers of all the sub-pixels may be a common layer connected together, emitting layers of adjacent sub-pixels may be overlapped slightly or may be isolated from each other, and electron block layers of adjacent sub-pixels may be overlapped slightly or may be isolated from each other.

In some exemplary embodiments, in the display stage, when the signal of the first reset signal terminal Reset1 is an effective level signal, the signal of the third reset signal terminal Reset3 is an effective level signal, and the signals of the first scanning signal terminal Gate1, the second scanning signal terminal Gate2 and the light emitting signal terminal are ineffective level signals.

In some exemplary embodiments, when the first scanning signal terminal Gate1 is an effective level signal, the signal of the second scanning signal terminal Gate2 is an effective level signal, and the signals of the first reset signal terminal Reset1, the third reset signal terminal Reset3 and the light emitting signal terminal are ineffective level signals.

In some exemplary embodiments, in the display stage, the occurrence time of the signal of the second reset signal terminal Reset2 being an effective level signal is before the occurrence time of the signal of the first reset signal terminal Reset1 being an effective level signal, alternatively, the occurrence time of the signal of the second reset signal terminal Reset2 being an effective level signal is within the occurrence time of the signal of the third reset signal terminal Reset3 being an effective level signal, alternatively, the occurrence time of the signal of the second reset signal terminal Reset2 being an effective level signal is within the occurrence time of the signal of the first scanning signal terminal Gate1 being an effective level signal, or the occurrence time of the signal of the second reset signal terminal Reset2 being an effective level signal is after the occurrence time of the signal of the first scanning signal terminal Gate1 being an effective level signal.

In some exemplary embodiments, the signal of the second reset signal terminal Reset2 is the same as the signal of the third reset signal terminal Reset3 when the occurrence time of the signal of the second reset signal terminal Reset2 being an effective level signal is within the occurrence time of the signal of the third reset signal terminal Reset3 being an effective level signal.

In some exemplary embodiments, the signal of the second reset signal terminal Reset2 is the same as the signal of the first scanning signal terminal Gate1 when the occurrence time of the signal of the second reset signal terminal Reset2 being an effective level signal is within the occurrence time of the signal of the first scanning signal terminal Gate1 being an effective level signal.

In an exemplary embodiment, signal lines connected with signal terminals with the same signal may be the same signal line, or may also be different signal lines.

A pixel circuit provided by an embodiment of the present disclosure is disposed in a display substrate, the display substrate includes a display stage and a non-display stage, the pixel circuit is configured to drive a light emitting element to emit light in the display stage, and includes a first control sub-circuit, a second control sub-circuit, a third control sub-circuit, a fourth control sub-circuit, a light emitting control sub-circuit, and a driving sub-circuit; the first control sub-circuit is electrically connected with a first power supply terminal, a second scanning signal terminal, a first reset signal terminal, a second reset signal terminal, a first initial signal terminal, a second initial signal terminal, a first node, a third node and a fourth node, respectively, and is configured to provide the signal of the first initial signal terminal or the third node to the first node under control of the first reset signal terminal and the second scanning signal terminal, and provide the signal of the second initial signal terminal to the fourth node under control of the second reset signal terminal; the second control sub-circuit is electrically connected with a first scanning signal terminal, a third reset signal terminal, a third initial signal terminal, a data signal terminal and a second node, respectively, and is configured to provide signals of the third initial signal terminal or the data signal terminal to the second node under control of the third reset signal terminal and the first scanning signal terminal; the third control sub-circuit is electrically connected with the third reset signal terminal, a control signal terminal and the third node respectively, and is configured to provide a first signal to the third node in the display stage and provide a second signal to the third node or acquire a signal of the third node in the non-display stage under control of the third reset signal terminal; the driving sub-circuit is electrically connected with the first node, the second node and the third node, respectively, and is configured to provide driving current to the third node under control of the first node and the second node; the light emitting control sub-circuit is electrically connected with a light emitting signal terminal, the first power supply terminal, the second node, the third node and the fourth node respectively, and is configured to provide the signal of the first power supply terminal to the second node and the signal of the third node to the fourth node under control of the light emitting signal terminal; the light emitting element is electrically connected with the fourth node and the second power supply terminal respectively; the voltage value of the first signal is less than the voltage value of the signal of the third initial signal terminal, and the voltage value of the second signal is greater than the voltage value of the signal of the third initial signal terminal. By providing a third control sub-circuit in the present disclosure, the third control sub-circuit can provide a first signal with a constant voltage value to the third node in the display stage and provide a second signal to the third node or acquire the signal of the third node the non-display stage, so that the aging degree of the driving sub-circuit can be consistent, and the threshold voltage of the driving sub-circuit can be monitored. Accordingly, the external compensation for the pixel circuit is realized, and the display effect, service life and reliability of the display substrate are improved.

Figure 2:
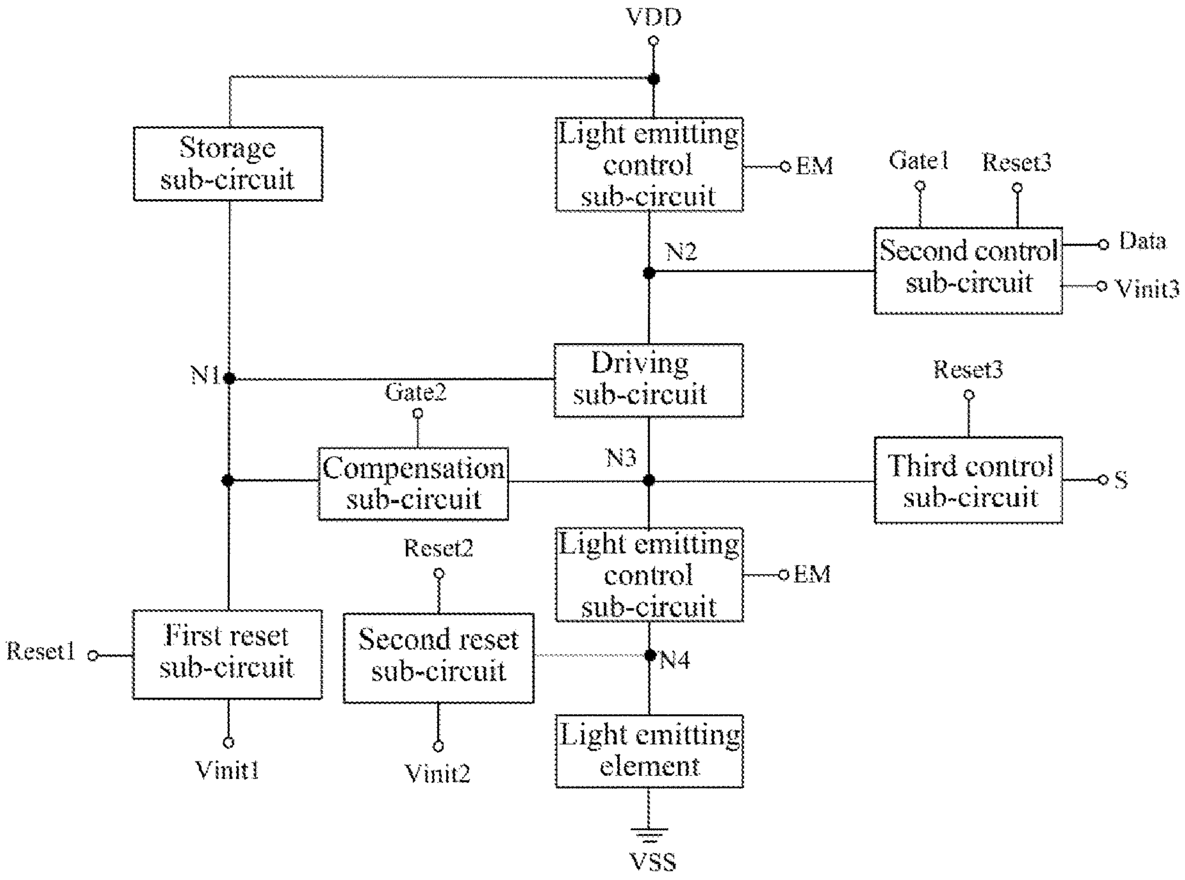
FIG. 2 is a schematic diagram of a structure of a first control sub-circuit provided by an exemplary embodiment.

FIG. 2 is a schematic diagram of a structure of a first control sub-circuit provided by an exemplary embodiment. As shown in FIG. 2, in an exemplary embodiment, the first control sub-circuit may include a first reset sub-circuit, a second reset sub-circuit, a compensation sub-circuit and a storage sub-circuit.

As shown in FIG. 2, the first reset sub-circuit is electrically connected with the first reset signal terminal Reset1, the first initial signal terminal Vinit1 and the first node N1, respectively, and is configured to provide the signal of the first initial signal terminal Vinit1 to the first node N1 under control of the first reset signal terminal Reset1; the second reset sub-circuit is electrically connected with the second reset signal terminal Reset2, the second initial signal terminal Vinit2 and the fourth node N4, respectively, and is configured to provide the signal of the second initial signal terminal Vinit2 to the fourth node N4 under control of the second reset signal terminal Reset2; the compensation sub-circuit is electrically connected with the first node N1, the third node N3 and the second scanning signal terminal Gate2, respectively, and is configured to provide the signal of the third node N3 to the first node N1 under control of the second scanning signal terminal Gate2; the storage sub-circuit is electrically connected with the first power supply terminal VDD and the first node N1, respectively, and is configured to store the voltage difference between the signal of the first power supply terminal VDD and the signal of the first node N1.

Figure 3:
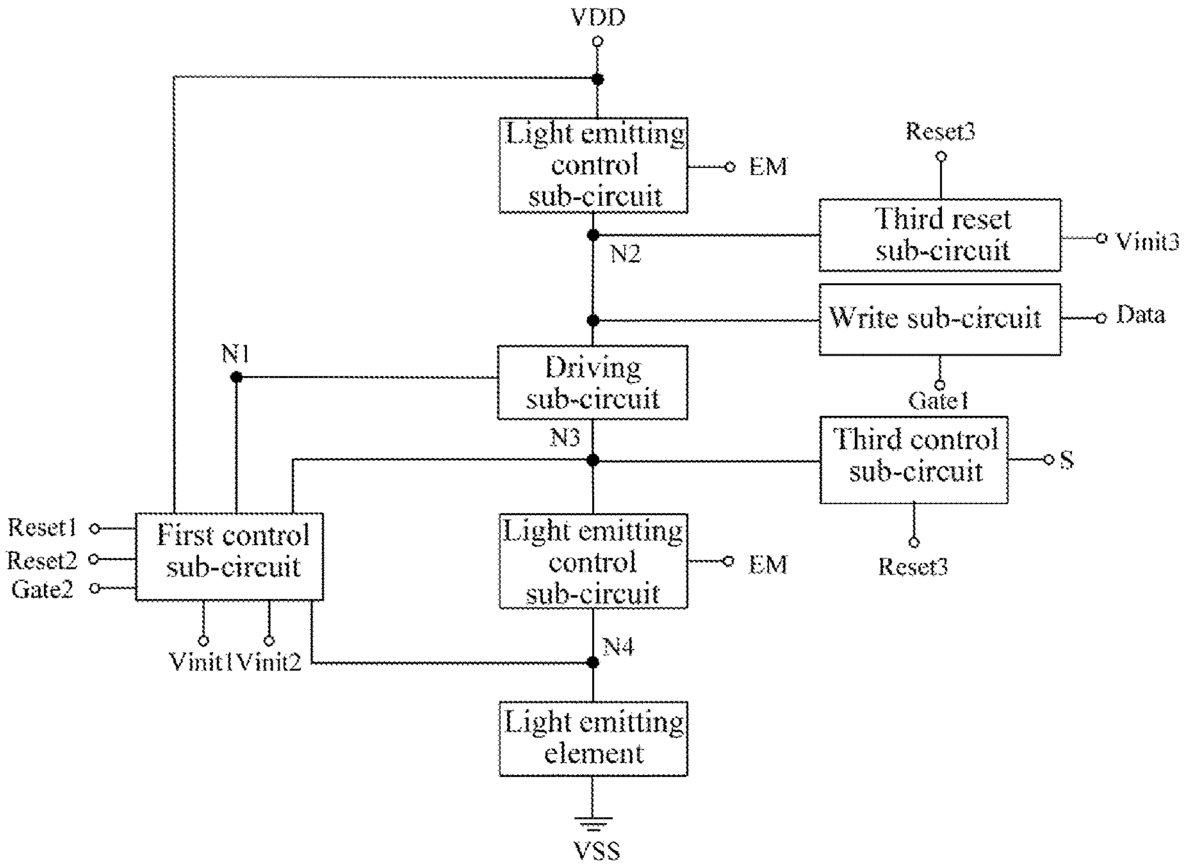
FIG. 3 is a schematic diagram of a structure of a second control sub-circuit provided by an exemplary embodiment.

FIG. 3 is a schematic diagram of a structure of a second control sub-circuit provided by an exemplary embodiment. As shown in FIG. 3, in an exemplary embodiment, the second control sub-circuit may include a third reset sub-circuit and a write sub-circuit.

As shown in FIG. 3, the third reset sub-circuit is electrically connected with the third reset signal terminal Reset3, the third initial signal terminal Vinit3 and the second node N2, respectively, and is configured to provide the signal of the third initial signal terminal Vinit3 to the second node N2 under control of the third reset signal terminal Reset3; the write sub-circuit is electrically connected with the first scanning signal terminal Gate1, the data signal terminal Data and the second node N2, respectively, and is configured to provide the signal of the data signal terminal Data to the second node N2 under control of the first scanning signal terminal Gate1.

Figure 4:
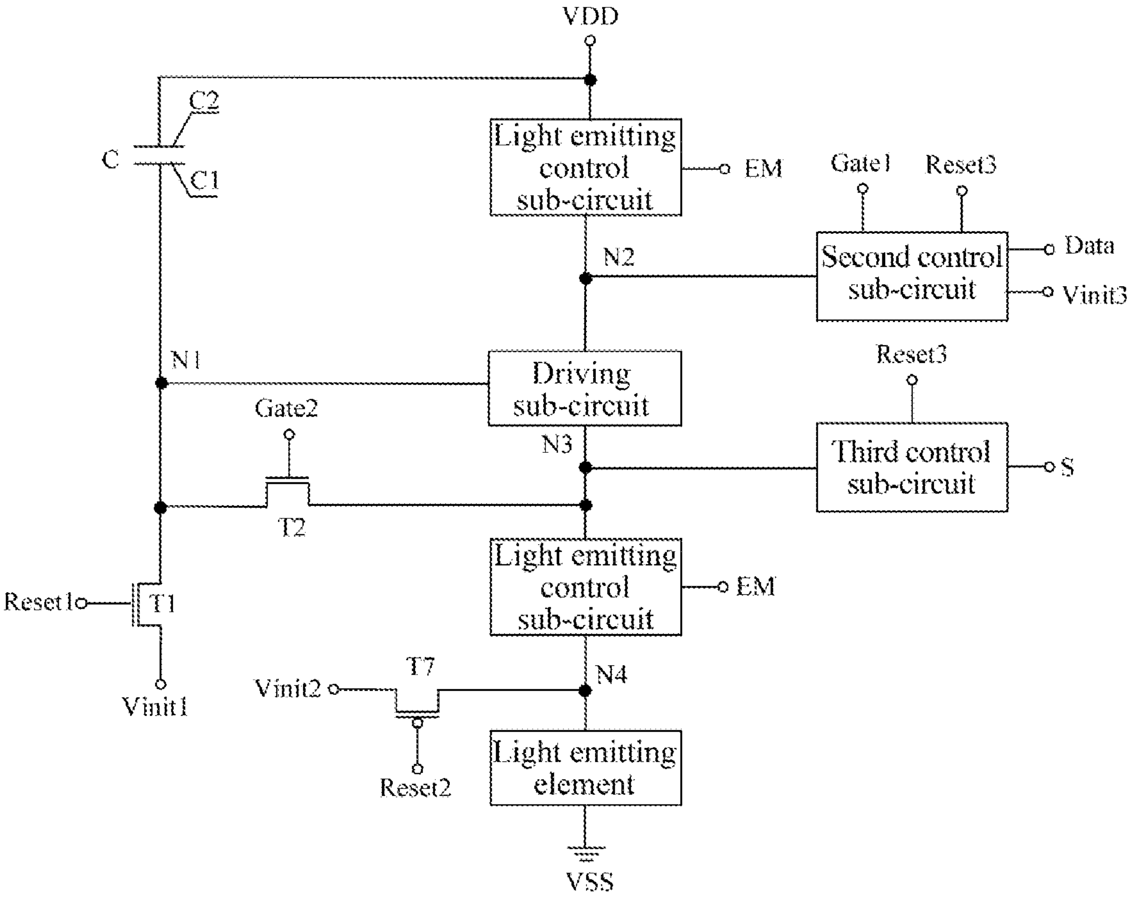
FIG. 4 is an equivalent circuit diagram of a first control sub-circuit provided by an exemplary embodiment.

FIG. 4 is an equivalent circuit diagram of a first control sub-circuit provided by an exemplary embodiment. As shown in FIG. 4, in an exemplary embodiment, the first reset sub-circuit may include a first transistor T1, the second reset sub-circuit includes a seventh transistor T7, the compensation sub-circuit includes a second transistor T2, and the storage sub-circuit includes a capacitor C, the capacitor C including a first plate C1 and a second plate C2.

As shown in FIG. 4, a control electrode of the first transistor T1 is electrically connected with the first reset signal terminal Reset1, a first electrode of the first transistor T1 is electrically connected with the first initial signal terminal Vinit1, and a second electrode of the first transistor T1 is electrically connected with the first node N1; a control electrode of the second transistor T2 is electrically connected with the second scanning signal terminal Gate2, a first electrode of the second transistor T2 is electrically connected with the first node N1, and a second electrode of the second transistor T2 is electrically connected with the third node N3; a control electrode of the seventh transistor T7 is electrically connected with the second reset signal terminal Reset2, a first electrode of the seventh transistor T7 is electrically connected with the second initial signal terminal Vinit2, and a second electrode of the seventh transistor T7 is electrically connected with the fourth node N4; the first plate C1 of the capacitor C is electrically connected with the first node N1, and the second plate C2 of the capacitor C is electrically connected with the first power supply terminal VDD.

An exemplary configuration of a first control sub-circuit is shown in FIG. 4. It will be readily understood by those skilled in the art that the implementation mode of the first control sub-circuit is not limited thereto.

Figure 5:
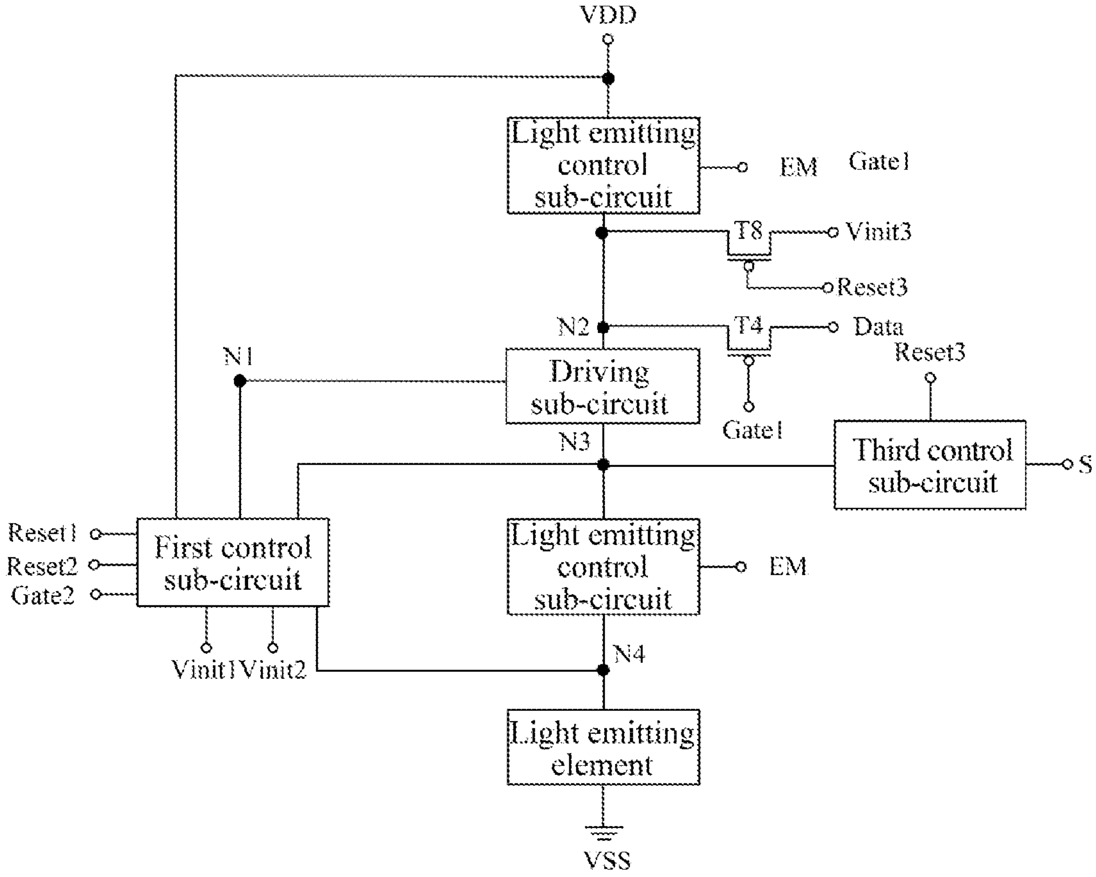
FIG. 5 is an equivalent circuit diagram of a second control sub-circuit provided by an exemplary embodiment.

FIG. 5 is an equivalent circuit diagram of a second control sub-circuit provided by an exemplary embodiment. As shown in FIG. 5, in an exemplary embodiment, the write sub-circuit may include a fourth transistor T4 and the third reset sub-circuit may include an eighth transistor T8.

As shown in FIG. 5, a control electrode of the fourth transistor T4 is electrically connected with the first scanning signal terminal Gate1, a first electrode of the fourth transistor T4 is electrically connected with the data signal terminal Data, and a second electrode of the fourth transistor T4 is electrically connected with the second node N2; a control electrode of the eighth transistor T8 is electrically connected with the third reset signal terminal Reset3, a first electrode of the eighth transistor T8 is electrically connected with the third initial signal terminal Vinit3, and a second electrode of the eighth transistor T8 is electrically connected with the second node N2.

An exemplary configuration of a second control sub-circuit is shown in FIG. 5. It will be readily understood by those skilled in the art that the implementation mode of the second control sub-circuit is not limited thereto.

Figure 6:
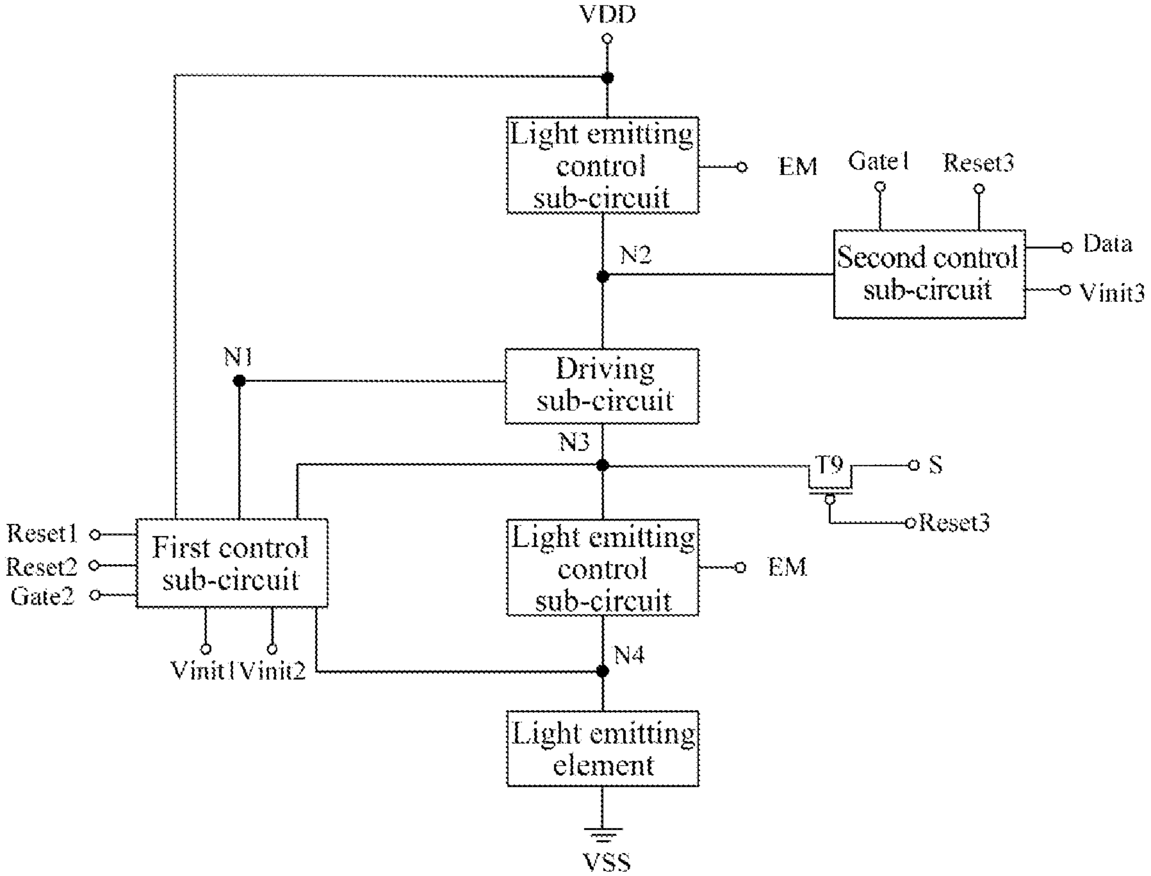
FIG. 6 is an equivalent circuit diagram of a third control sub-circuit provided by an exemplary embodiment.

FIG. 6 is an equivalent circuit diagram of a third control sub-circuit provided by an exemplary embodiment. As shown in FIG. 6, in an exemplary embodiment, the third control sub-circuit may include a ninth transistor T9.

As shown in FIG. 6, a control electrode of the ninth transistor T9 is electrically connected with the third reset signal terminal Reset3, a first electrode of the ninth transistor T9 is electrically connected with the control signal terminal S, and a second electrode of the ninth transistor T9 is electrically connected with the third node N3.

An exemplary configuration of a third control sub-circuit is shown in FIG. 6. It will be readily understood by those skilled in the art that the implementation mode of the third control sub-circuit is not limited thereto.

Figure 7:
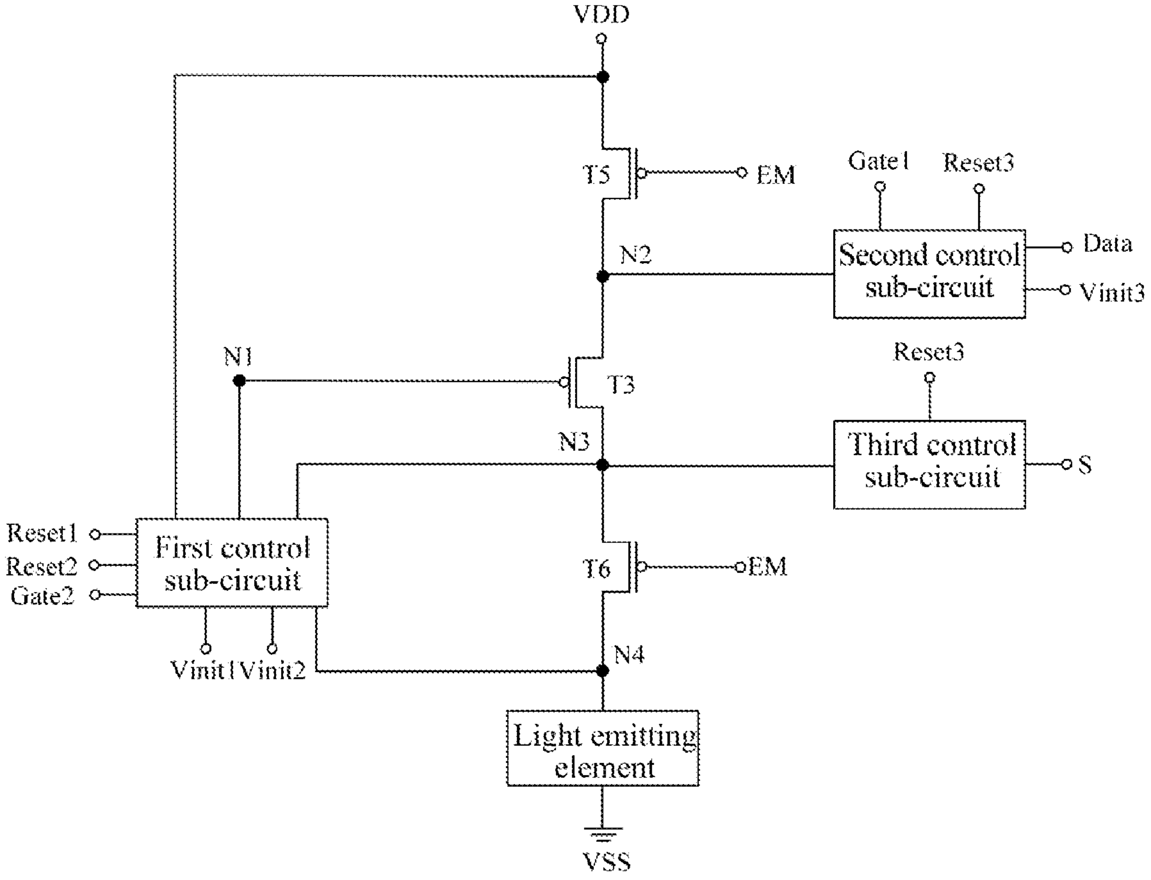
FIG. 7 is an equivalent circuit diagram of a light emitting control sub-circuit and a driving sub-circuit provided by an exemplary embodiment.

FIG. 7 is an equivalent circuit diagram of a light emitting control sub-circuit and a driving sub-circuit provided by an exemplary embodiment. As shown in FIG. 7, in an exemplary embodiment, the driving sub-circuit may include a third transistor T3 and the light emitting control sub-circuit may include a fifth transistor T5 and a sixth transistor T6.

As shown in FIG. 7, a control electrode of the third transistor T3 is electrically connected with the first node N1, a first electrode of the third transistor T3 is electrically connected with the second node N2, and a second electrode of the third transistor T3 is electrically connected with the third node N3; a control electrode of the fifth transistor T5 is electrically connected with the light emitting signal terminal EM, a first electrode of the fifth transistor T5 is electrically connected with the first power supply terminal VDD, and a second electrode of the fifth transistor T5 is electrically connected with the second node N2; a control electrode of the sixth transistor T6 is electrically connected with the light emitting signal terminal EM, a first electrode of the sixth transistor T6 is electrically connected with the third node N3, and a second electrode of the sixth transistor T6 is electrically connected with the fourth node N4.

An exemplary configuration of a light emitting control sub-circuit and a driving sub-circuit is shown in FIG. 7. It will be readily understood by those skilled in the art that the implementation mode of the light emitting control sub-circuit and the driving sub-circuit is not limited thereto.

Figure 8:
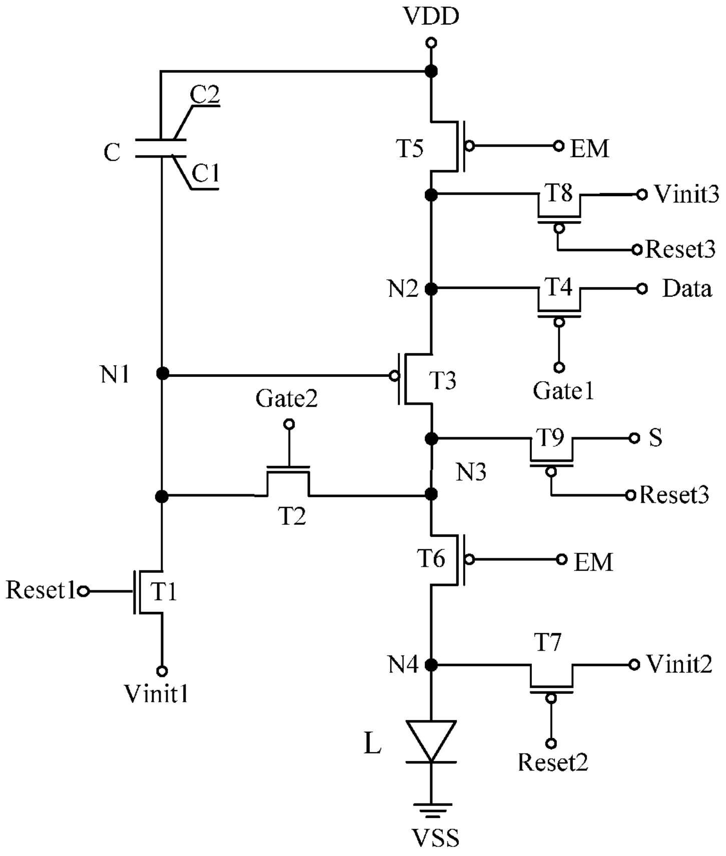
FIG. 8 is a diagram of an equivalent circuit of a pixel circuit provided by an exemplary embodiment.

FIG. 8 is a diagram of an equivalent circuit of a pixel circuit provided by an exemplary embodiment. As shown in FIG. 8, in an exemplary embodiment, the first control sub-circuit includes a first transistor T1, a second transistor T2, a seventh transistor T7, and the capacitor C including a first plate C1 and a second plate C2; the second control sub-circuit includes a fourth transistor T4 and an eighth transistor T8; the third control sub-circuit includes a ninth transistor T9, the driving sub-circuit includes a third transistor T3, and the light emitting control sub-circuit includes a fifth transistor T5 and a sixth transistor T6.

As shown in FIG. 8, a control electrode of the first transistor T1 is electrically connected with the first reset signal terminal Reset1, a first electrode of the first transistor T1 is electrically connected with the first initial signal terminal Vinit1, and a second electrode of the first transistor T1 is electrically connected with the first node N1; a control electrode of the second transistor T2 is electrically connected with the second scanning signal terminal Gate2, a first electrode of the second transistor T2 is electrically connected with the first node N1, and a second electrode of the second transistor T2 is electrically connected with the third node N3; a control electrode of the third transistor T3 is electrically connected with the first node N1, a first electrode of the third transistor T3 is electrically connected with the second node N2, and a second electrode of the third transistor T3 is electrically connected with the third node N3; a control electrode of the fourth transistor T4 is electrically connected with the first scanning signal terminal Gate1, a first electrode of the fourth transistor T4 is electrically connected with the data signal terminal Data, and a second electrode of the fourth transistor T4 is electrically connected with the second node N2; a control electrode of the fifth transistor T5 is electrically connected with the light emitting signal terminal EM, a first electrode of the fifth transistor T5 is electrically connected with the first power supply terminal VDD, and a second electrode of the fifth transistor T5 is electrically connected with the second node N2; a control electrode of the sixth transistor T6 is electrically connected with the light emitting signal terminal EM, a first electrode of the sixth transistor T6 is electrically connected with the third node N3, and a second electrode of the sixth transistor T6 is electrically connected with the fourth node N4; a control electrode of the seventh transistor T7 is electrically connected with the second reset signal terminal Reset2, a first electrode of the seventh transistor T7 is electrically connected with the second initial signal terminal Vinit2, and a second electrode of the seventh transistor T7 is electrically connected with the fourth node N4; a control electrode of the eighth transistor T8 is electrically connected with the third reset signal terminal Reset3, a first electrode of the eighth transistor T8 is electrically connected with the third initial signal terminal Vinit3, and a second electrode of the eighth transistor T8 is electrically connected with the second node N2; a control electrode of the ninth transistor T9 is electrically connected with the third reset signal terminal Reset3, a first electrode of the ninth transistor T9 is electrically connected with the control signal terminal S, and a second electrode of the ninth transistor T9 is electrically connected with the third node N3; a first plate C1 of the capacitor C is electrically connected with the first node N1, and a second plate C2 of the capacitor C is electrically connected with the first power supply terminal VDD.

In an exemplary embodiment, the third transistor T3 may be referred to as a driving transistor, and the third transistor T3 determines a driving current flowing between the first power supply terminal VDD and the second power supply terminal VSS according to a potential difference between its control electrode and the first electrode.

In an exemplary embodiment, the fifth transistor T5 and the sixth transistor T6 may be referred to as light emitting transistors. When the signal of the light emitting signal terminal EM is an effective level signal, the fifth transistor T5 and the sixth transistor T6 cause the light emitting element to emit light by forming a driving current path between the first power supply terminal VDD and the second power supply terminal VSS.

In an exemplary embodiment, some of the first to ninth transistors T1 to T9 may be oxide transistors, and some of the transistors may be low temperature polysilicon transistors. Oxide transistor can reduce leakage current, improve the performance of the pixel circuit, and reduce the power consumption of the pixel circuit.

In some exemplary embodiments, the first transistor T1 and the second transistor T2 are of opposite transistor types to the third transistor T3 to the ninth transistor T9. Exemplarily, the first transistor T1 and the second transistor T2 may be N-type transistors, and the third transistors T3 to the ninth transistors T9 may be P-type transistors.

In an exemplary embodiment, the first transistor T1 and the second transistor T2 may be oxide transistors, and the third transistor T3 to the ninth transistor T9 may be low temperature polysilicon transistors.

In the present disclosure, the working process of the pixel circuit in the non-display stage may include a reverse bias stage and a threshold voltage acquisition stage.

In the reverse bias stage, the signal of the first reset signal terminal Reset1 is an effective level signal, the signal of the first initial signal terminal Vinit1 is provided to the first node N1, the signal of the third reset signal terminal Reset3 is an effective level signal, the signal of the third initial signal terminal Vinit3 is provided to the second node N2, and a second signal provided by the control signal terminal S is provided to the third node N3. Since the voltage value of the second signal is greater than the signal of the third initial signal terminal Vinit3, the third transistor T3 is turned on in reverse.

By setting the third transistor T3 to be turned on in reverse in the reverse bias stage, the present disclosure can improve the aging problem due to the long-term forward conduction of the third transistor, prolong the service life of the third transistor, and improve the service life and reliability of the display substrate.

In the threshold voltage acquisition stage, the signal of the third reset signal terminal Reset3 is an effective level signal, and the control signal terminal S acquires the signal of the third node N3 to obtain the threshold voltage of the third transistor T3.

By acquiring the threshold voltage of the third transistor T3 in the threshold voltage acquisition stage, the present disclosure can obtain the threshold voltage offset condition of the third transistor, and adjust the signal of the data signal terminal in real time according to the threshold voltage offset condition of the third transistor, so that the external compensation of the pixel circuit can be realized, the service life of the pixel circuit can be prolonged, and the display effect and reliability of the display substrate can be improved.

Figure 9:
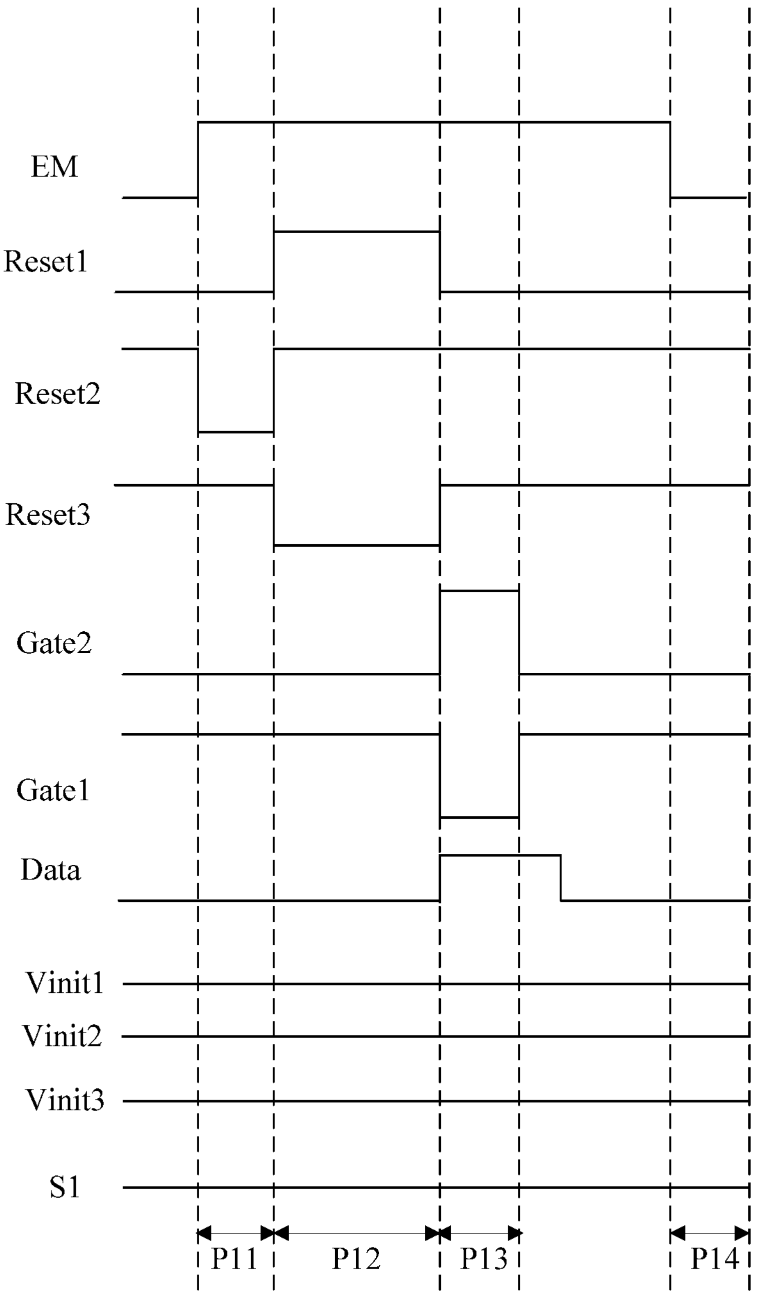
FIG. 9 is a working timing diagram I of the pixel circuit provided in FIG. 8.
Figure 10:
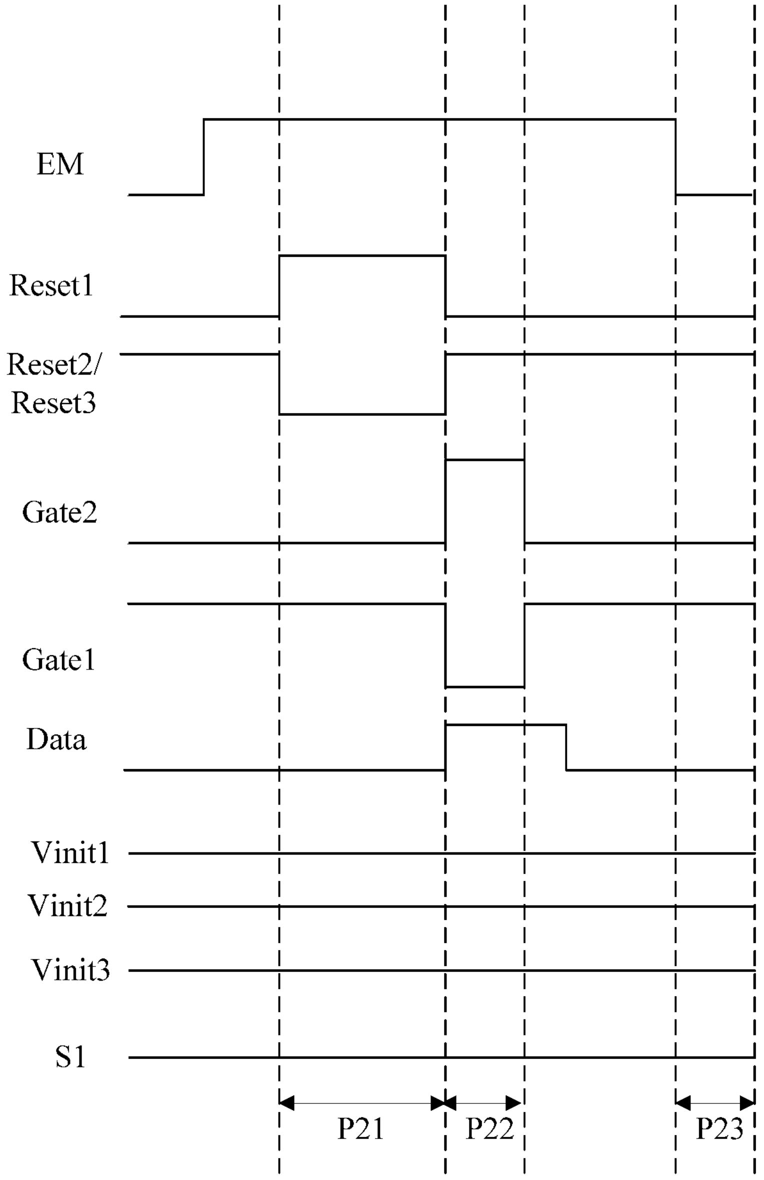
FIG. 10 is a working timing diagram II of the pixel circuit provided in FIG. 8.
Figure 11:
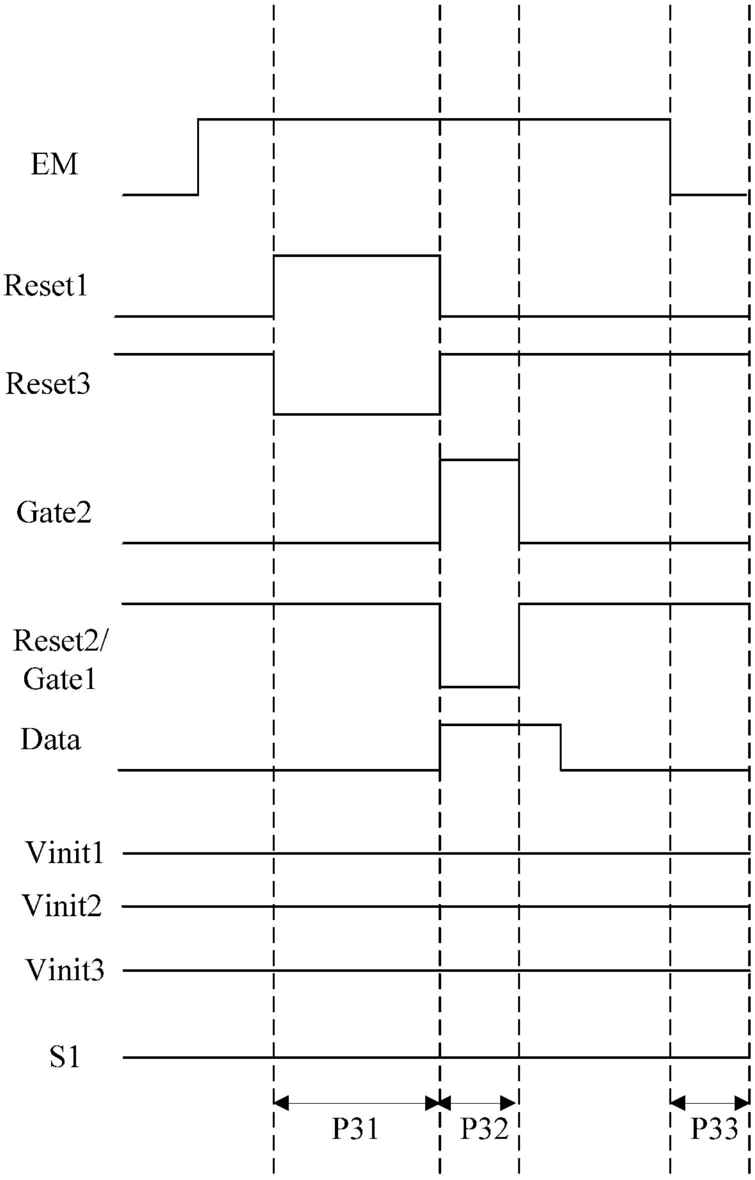
FIG. 11 is a working timing diagram III of the pixel circuit provided in FIG. 8.
Figure 12:
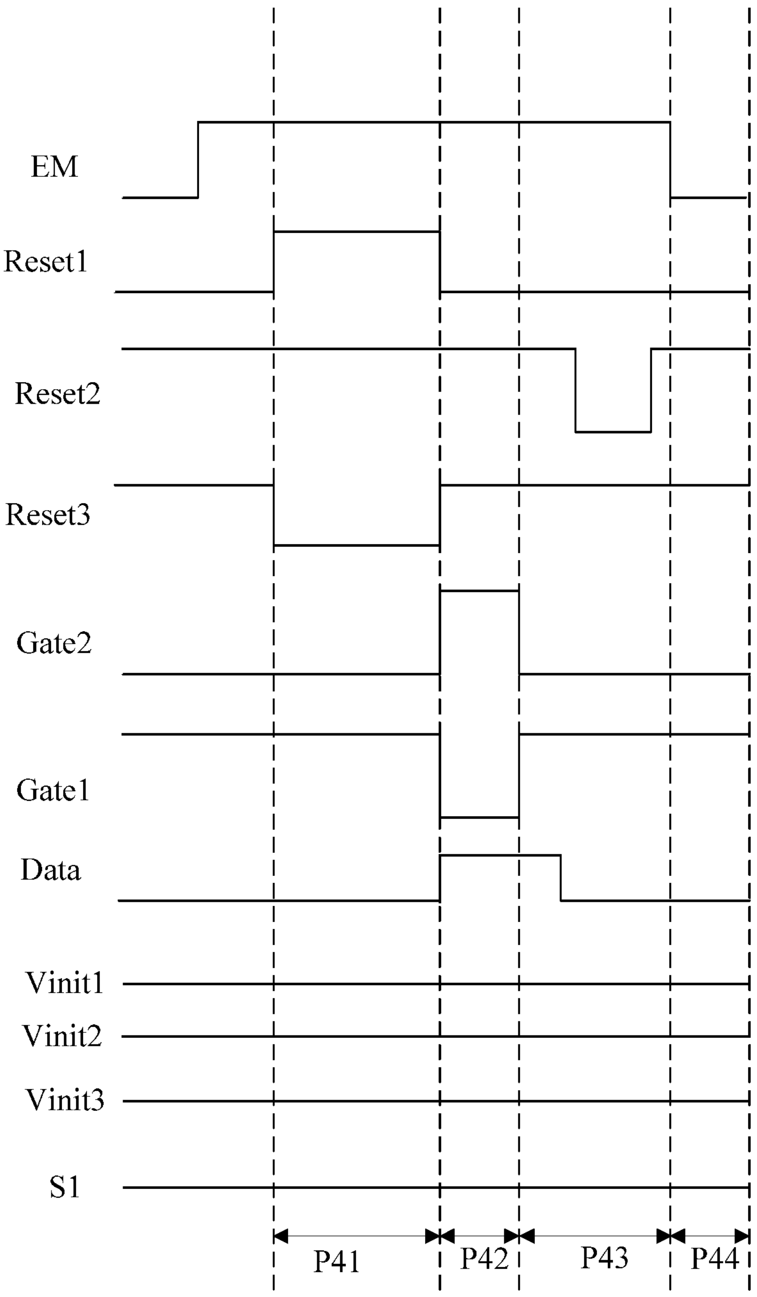
FIG. 12 is a working timing diagram IV of the pixel circuit provided in FIG. 8.

An exemplary embodiment of the present disclosure is described below with reference to the working process of the pixel circuit illustrated in FIG. 8 during the display stage. FIG. 8 is illustrated by taking a case that the first transistor T1 and the second transistor T2 are N-type transistors and the third transistor T3 to the ninth transistor T9 are P-type transistors as an example. The pixel circuit in FIG. 6 includes a first transistor T1 to a ninth transistor T9, a capacitor C and twelve signal terminals (a data signal terminal Data, a first scanning signal terminal Gate1, a second scanning signal terminal Gate2, a first reset signal terminal Reset1, a second reset signal terminal Reset2, a third reset signal terminal Reset3, a first initial signal terminal Vinit1, a second initial signal terminal Vinit2, a third initial signal terminal Vinit3, a control signal terminal S, a light emitting signal terminal EM and a first power supply terminal VDD). FIG. 9 is a working timing diagram I of the pixel circuit provided in FIG. 8, FIG. 10 is a working timing diagram II of the pixel circuit provided in FIG. 8, FIG. 11 is a working timing diagram III of the pixel circuit provided in FIG. 8, and FIG. 12 is a working timing diagram IV of the pixel circuit provided in FIG. 8. FIG. 9 is illustrated by taking a case that the occurrence time of the signal of the second reset signal terminal Reset2 being an effective level signal is before the occurrence time of the signal of the first reset signal terminal Reset1 being an effective level signal an example, FIG. 10 is illustrated by taking a case that the occurrence time of the signal of the second reset signal terminal Reset2 being an effective level signal within the occurrence time of the signal of the third reset signal terminal Reset3 being an effective level signal an example, FIG. 11 is illustrated by taking a case that the occurrence time of the signal of the second reset signal terminal Reset2 being an effective level signal is within the occurrence time of the signal of the first scanning signal terminal Gate1 being an effective level signal an example, and FIG. 12 is illustrated by taking a case that the occurrence time of the signal of the second reset signal terminal Reset2 being an effective level signal is after the occurrence time of the signal of the first scanning signal terminal Gate1 being an effective level signal an example.

In an exemplary embodiment, as shown in FIGS. 9 to 12, the control signal terminal S provides a first signal 51 with a constant voltage value in the display stage.

In conjunction with FIGS. 8 and 9, the working process of the pixel circuit may include following stages.

In a first stage P11, referred to as a first initialization stage, the signal of the second reset signal terminal Reset2 is a low-level signal, the seventh transistor T7 is turned on, and the signal of the second initial signal terminal Vinit2 is written into the fourth node N4 through the turned-on seventh transistor T7, so as to initialize (reset) the anode of the light emitting element L, empty the pre-stored voltage inside it and complete the initialization.

In a second stage P12, referred as a second initialization stage, the signal of the first reset signal terminal Reset1 is a high-level signal, the first transistor T1 is turned on, and the signal of the first initial signal terminal Vinit1 is written into the first node N1 through the turned-on first transistor T1, so as to initialize (reset) the first node N1, empty the pre-stored voltage inside it and complete the initialization. The signal of the third reset signal terminal Reset3 is a low-level signal, the eighth transistor T8 and the ninth transistor T9 are turned on, and the signal of the third initial signal terminal Vinit3 is written into the second node N2 through the turned-on eighth transistor T8, so as to initialize (reset) the second node N2, empty the pre-stored voltage inside it and complete the initialization. The first signal of the control signal terminal S is written into the third node N3 through the turned-on ninth transistor T9, so as to initialize (reset) the second node the third node N3, and empty the pre-stored voltage inside it and complete the initialization.

In a third stage P13, referred to as a data writing stage or a threshold compensation stage, the first scanning signal terminal Gate1 is a low-level signal, and the data signal terminal Data outputs a data voltage. In this stage, since the signal of the first node N1 is a low-level signal, the third transistor T3 is turned on. The signal of the first scanning signal terminal Gate1 is a low-level signal, the fourth transistor T4 is turned on, the signal of the second scanning signal terminal Gate2 is a high-level signal, the second transistor T2 is turned on, the data voltage outputted from the data signal terminal Data is provided to the first node N1 through the turned-on fourth transistor T4, the second node N2, the turned-on third transistor T3, the third node N3 and the turned-on second transistor T2, the difference between the data voltage outputted from the data signal terminal Data and the threshold voltage of the third transistor T3 is charged into the capacitor C until the voltage of the first node N1 is $Vd-|Vth|$, where Vd is the data voltage outputted from the data signal terminal Data and Vth is the threshold voltage of the third transistor T3.

In a fourth stage P14, referred to as a light emitting stage, the signal of the light emitting signal terminal EM is a low-level signal, the fifth transistor T5 and the sixth transistor T6 are turned on, and the power supply voltage output from the first power supply terminal VDD provides a driving voltage to a first electrode of the light emitting element L through the turned-on fifth transistor T5, the third transistor T3 and the sixth transistor T6 to drive the light emitting element L to emit light.

In a drive process of the pixel circuit, a driving current flowing through the third transistor T3 (a drive transistor) is determined by a voltage difference between a control electrode and a first electrode of the third transistor T3. Since the voltage of the first node N1 is Vd−|Vth|, the driving current of the third transistor T3 is as follows:

$$I=K^*(Vgs-Vth)^2=K^*[(Vdd-Vd+|Vth|)-Vth]^2=K^*[(Vdd-Vd]^2$$

Among them, I is the driving current flowing through the third transistor T3, that is, the driving current for driving an OLED, K is a constant, Vgs is the voltage difference between the control electrode and a first electrode of the third transistor T3, Vth is the threshold voltage of the third transistor T3, Vd is the data voltage output by the data signal terminal Data, and Vdd is the power supply voltage output by the first power supply terminal VDD.

In conjunction with FIGS. 8 and 10, in the working timing of the pixel circuit provided in FIG. 9 and the working timing of the pixel circuit provided in FIG. 10, the same is that the working process of the second stage P22 provided in FIG. 10 is consistent with the working process of the third stage P13 provided in FIG. 9, and the working process of the third stage P23 provided in FIG. 10 is consistent with the working process of the fourth stage P14 provided in FIG. 9, except that the first stage P21 provided in FIG. 10.

In the first stage P21, referred to as an initialization stage, the signal of the first reset signal terminal Reset1 is a high-level signal, the first transistor T1 is turned on, and the signal of the first initial signal terminal Vinit1 is written into the first node N1 through the turned-on first transistor T1, so as to initialize (reset) the first node N1, empty the pre-stored voltage inside it and complete the initialization. The signal of the second reset signal terminal Reset2 is a low-level signal, the seventh transistor T7 is turned on, and the signal of the second initial signal terminal Vinit2 is written into the fourth node N4 through the turned-on seventh transistor T7, so as to initialize (reset) the anode of the light emitting element L, empty the pre-stored voltage inside it and complete the initialization. The signal of the third reset signal terminal Reset3 is a low-level signal, the eighth transistor T8 and the ninth transistor T9 are turned on, and the signal of the third initial signal terminal Vinit3 is written into the second node N2 through the turned-on eighth transistor T8, so as to initialize (reset) the second node N2, empty the pre-stored voltage inside it and complete the initialization. The first signal of the control signal terminal S is written into the third node N3 through the turned-on ninth transistor T9, so as to initialize (reset) the third node N3, empty the pre-stored voltage inside it and complete the initialization.

In conjunction with FIGS. 8 and 11, in the working timing of the pixel circuit provided in FIG. 9 and the working timing of the pixel circuit provided in FIG. 11, the same is that the working process of the first stage P31 provided in FIG. 11 is consistent with the working process of the second stage P12 provided in FIG. 9, and the working process of the third stage P33 provided in FIG. 11 is consistent with the working process of the fourth stage P14 provided in FIG. 9, except that the second stage P32 provided in FIG. 10.

In the second stage P32, referred to as a data writing stage or threshold compensation stage, the first scanning signal terminal Gate1 is a low-level signal, and the data signal terminal Data outputs a data voltage. In this stage, since the first node N1 is a low-level signal, the third transistor T3 is turned on. The signal of the first scanning signal terminal Gate1 is a low-level signal, the fourth transistor T4 is turned on, the signal of the second scanning signal terminal Gate2 is a high-level signal, the second transistor T2 is turned on, the data voltage outputted from the data signal terminal Data is provided to the first node N1 through the turned-on fourth transistor T4, the second node N2, the turned-on third transistor T3, the third node N3 and the turned-on second transistor T2, the difference between the data voltage output by the data signal terminal Data and the threshold voltage of the third transistor T3 is charged into the capacitor C, until the voltage of the first node N1 is Vd−|Vth|, Vd is the data voltage output by data signal terminal Data, Vth is the threshold voltage of the third transistor T3, the signal of the second reset signal terminal Reset2 is a low-level signal, the seventh transistor T7 is turned on, and the signal of the second initial signal terminal Vinit2 is written into the fourth node N4 through the turned-on seventh transistor T7, so as to initialize (reset) the anode of the light emitting element L, empty the pre-stored voltage inside it and complete the initialization.

In conjunction with FIGS. 8 and 12, in the working timing of the pixel circuit provided in FIG. 9 and the working timing of the pixel circuit provided in FIG. 12, the same is that the working process of the first stage P41 provided in FIG. 12 is consistent with the working process of the second stage P12 provided in FIG. 9, the working process of the second stage P42 provided in FIG. 12 is consistent with the working process of the third stage P13 provided in FIG. 9, and the working process of the fourth stage P44 provided in FIG. 12 is consistent with the working process of the fourth stage P14 provided in FIG. 9, except that the third stage P43 provided in FIG. 12.

In the third stage P43, referred to as the second initialization stage, the signal of the second reset signal terminal Reset2 is a low-level signal, the seventh transistor T7 is turned on, and the signal of the second initial signal terminal Vinit2 is written into the fourth node N4 through the turned-on seventh transistor T7, so as to initialize (reset) the anode of the light emitting element L, empty the pre-stored voltage inside it and complete the initialization.

In the present disclosure, by resetting the first node N1, the second node N2 and the third node N3 in the display stage, the voltage between the electrodes of the driving transistor in the pixel circuit is always consistent every time in the initialization stage, the driving transistor is in a fixed bias turn-on state in the initialization stage, then enters the data writing and compensation stage, so that all electrodes of the driving transistor are guaranteed to have consistent aging effects, the problem of short-term afterimage or medium-term afterimage caused by hysteresis effect due to inconsistent aging states of the driving transistor can be solved, the display effect of the display substrate is improved, and the service life and reliability of the display substrate can be improved.

Figure 13A:
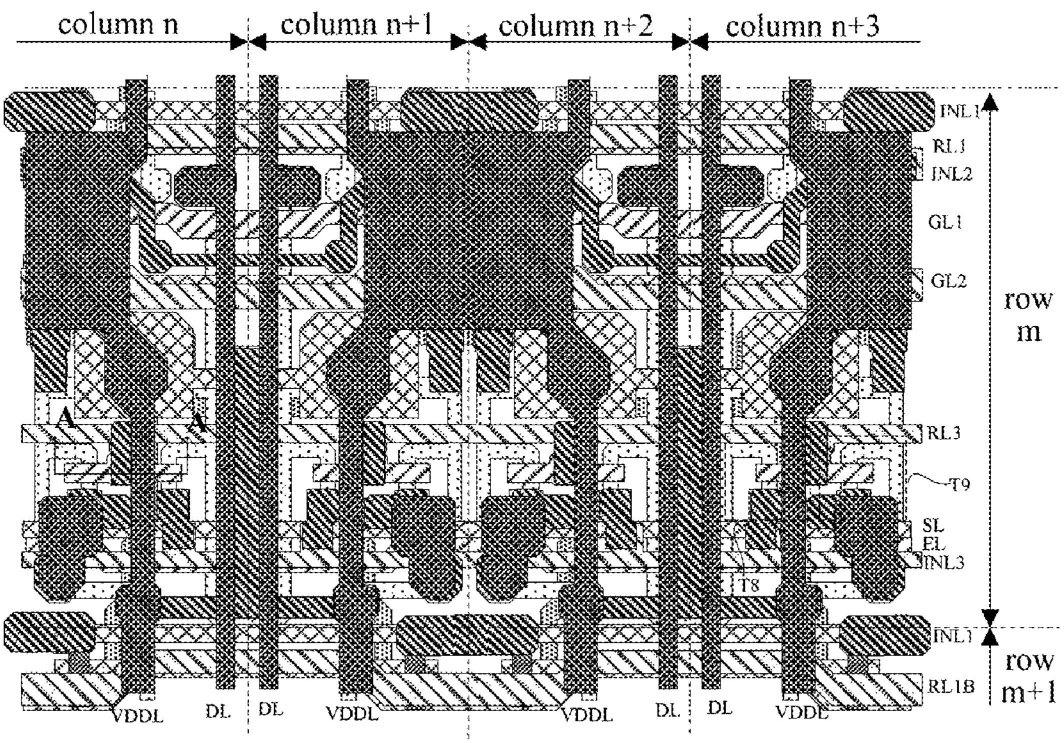
FIG. 13A is a schematic diagram of a structure of a display substrate according to an embodiment of the present disclosure.

FIG. 13A is a schematic diagram of a structure of a display substrate according to an embodiment of the present disclosure. As shown in FIGS. 13A, an embodiment of the present disclosure also provides a display substrate including a base substrate and a circuit structure layer and a light emitting structure layer provided on the base substrate sequentially, the light emitting structure layer includes a light emitting element, and the circuit structure layer includes a pixel circuit arranged in an array. FIG. 13 is illustrated by taking a pixel circuit with one row and four columns as an example.

The pixel circuit is the pixel circuit according to any one of the foregoing embodiments, and the implementation principle and implementation effects are similar, which will not be repeated here.

In an exemplary embodiment, the display substrate may be a Low Temperature Polycrystalline Oxide (LTPO) display substrate.

In an exemplary embodiment, the base substrate may be a rigid base substrate or a flexible base substrate, wherein the rigid base substrate may be but is not limited to one or more of glass and conductive foil; the flexible base substrate may be, but is not limited to, one or more of polyethylene terephthalate, ethylene terephthalate, polyetheretherketone, polystyrene, polycarbonate, polyarylate, polyarylate, polyimide, polyvinyl chloride, polyethylene, textile fiber.

In an exemplary embodiment, the light emitting structure layer includes an anode layer, a pixel definition layer, an organic structure layer, and a cathode layer that are sequentially stacked on the base substrate; the anode layer includes an anode, the organic structure layer includes an organic light emitting layer, and the cathode layer includes a cathode.

In an exemplary embodiment, the light emitting element may include a first light emitting element, a second light emitting element, a third light emitting element, and a fourth light emitting element, the first light emitting element emits red light, the second light emitting element emits blue light, and the third and fourth light emitting elements emit green light; the area of the anode of the second light emitting element is greater than the area of the anode of the first light emitting element, and the anode of the third light emitting element is symmetrical with the anode of the fourth light emitting element about a virtual straight line extending in the first direction.

In an exemplary embodiment, when the occurrence time of the signal of the second reset signal terminal being an effective level signal is before the occurrence time of the signal of the first reset signal terminal being an effective level signal, the signals of the second reset signal terminals of the pixel circuits of an i-th row are the same as the signals of the first scanning signal terminals of the pixel circuits of an i−1th row. When the occurrence time of the signal of the second reset signal terminal being an effective level signal is after the occurrence time of the signal of the first scanning signal terminal being an effective level signal, the signals of the second reset signal terminals of the pixel circuits of the i-th row are the same as the signals of the first scanning signal terminals of the pixel circuits of the i+1th row.

In an exemplary embodiment, as shown in FIG. 13A, the circuit structure layer further includes: a plurality of first reset signal lines RL1, a plurality of second reset signal lines RL2, a plurality of third reset signal lines RL3, a plurality of first scanning signal lines GL1, a plurality of second scanning signal lines GL2, a plurality of first initial signal lines INL1, a plurality of second initial signal lines INL2, a plurality of third initial signal lines INL3, a plurality of light emitting signal lines EL and a plurality of control signal lines SL extending in a first direction and arranged in a second direction, a plurality of first power supply lines VDDL and a plurality of data signal lines DL extending in the second direction and arranged in the first direction, and the first direction intersects the second direction. Here, the first reset signal terminal of the pixel circuit is electrically connected with the first reset signal line, the second reset signal terminal is connected with the second reset signal line, the third reset signal terminal is electrically connected with the third reset signal line, the first scanning signal terminal is electrically connected with the first scanning signal line, the second scanning signal terminal is electrically connected with the second scanning signal line, the light emitting signal terminal is electrically connected with the light emitting signal line, the first initial signal terminal is electrically connected with the first initial signal line, the second initial signal terminal is electrically connected with the second initial signal line, the second initial signal terminal is electrically connected with the second initial signal line, the control signal terminal is electrically connected with the control signal line, the first power supply terminal is electrically connected with the first power supply line, and the data signal terminal is electrically connected with the data signal line.

In an exemplary embodiment, a first chip connected with the control signal line and a second chip connected with the data signal line are also included. Here, the first chip is configured to provide a first signal to the control signal line in a display stage, provide a second signal to the control signal line or acquire the signal of the control signal line in a non-display stage, and is further configured to obtain the threshold voltage of the third transistor according to the signal of the control signal line, generate a control signal according to the threshold voltage of the third transistor, and transmit the control signal to the second chip; the second chip provides a signal to the data signal line according to the control signal to externally compensate the pixel circuit.

In an exemplary embodiment, the signal of the control signal line may be a current I flowing through the control signal line.

In an exemplary embodiment, the first chip obtains the threshold voltage Vth of the third transistor according to the signal of the control signal line using the formula $I=\mu*W*Cox*(Vgs-Vth)^2/2L$. Here, μ is the mobility of the third transistor, Vgs is the voltage difference between a control electrode and a first electrode of the third transistor, L is the length of the channel region of the third transistor, W is the width of the channel region of the third transistor, and Cox is the gate oxygen capacitance per unit area of the third transistor.

In an exemplary embodiment, as shown in FIG. 13A, pixel structures of adjacent pixel circuits located in a same row are symmetrical with respect to a virtual straight line extending in the second direction. Adjacent pixel circuits located on a same row as the pixel circuit include a first adjacent pixel circuit and a second adjacent pixel circuit.

In an exemplary embodiment, the pixel circuit includes a first transistor to a ninth transistor, and a control electrode of the first transistor and a control electrode of the second transistor each include a first control electrode and a second control electrode.

In an exemplary embodiment, the first reset signal line may include a first sub-reset signal line and a second sub-reset signal line which are provided in different layers and connected with each other, the first sub-reset signal line is disposed in a same layer as the first control electrode of the first transistor, and the second sub-reset signal line is disposed in a same layer as the second control electrode of the first transistor. The second scanning signal line may include a first sub-scanning signal line and a second sub-scanning signal line which are provided in different layers and connected with each other, wherein the first sub-scanning signal line is provided in a same layer as the first control electrode of the second transistor, and the second sub-scanning signal line is provided in a same layer as the second control electrode of the second transistor.

In an exemplary embodiment, the pixel circuit may further include a capacitor including a first plate and a second plate.

Figure 13B:
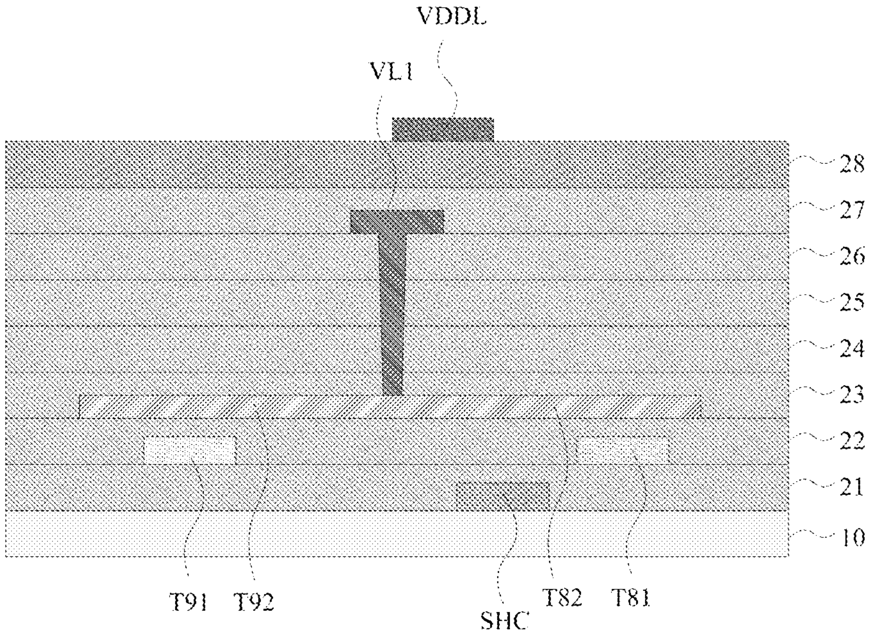
FIG. 13B is a sectional view taken along an A-A direction in FIG. 13A.

In an exemplary embodiment, FIG. 13B is a sectional view taken along an A-A direction in FIG. 13A, as shown in FIGS. 13A and 13B, the circuit structure layer may include a first insulating layer 21, a first semiconductor layer, a second insulating layer 22, a first conductive layer, a third insulating layer 23, a second conductive layer, a fourth insulating layer 24, a second semiconductor layer, a fifth insulating layer 25, a third conductive layer, a sixth insulating layer 26, a fourth conductive layer, a seventh insulating layer 27, a first planarization layer 28, and a fifth conductive layer that are sequentially stacked on the base substrate 10;

The first semiconductor layer may include: an active layer of a third transistor to an active layer T91 of a ninth transistor located in at least one pixel circuit;

The first conductive layer may include: a first scanning signal line, a light emitting signal line, and a first plate of a capacitor and a control electrode of a third transistor to a control electrode of a ninth transistor located in at least one pixel circuit;

The second conductive layer may include a first initial signal line, a first sub-reset signal line, a first sub-scanning signal line, a control signal line, and a second plate of a capacitor, a first control electrode of a first transistor and a first control electrode of a second transistor located in at least one pixel circuit;

The second semiconductor layer may include an active layer of a first transistor, an active layer of a second transistor and an active connection part located in at least one pixel circuit; the active connection part is configured to connect the active layer of the first transistor and the active layer of the second transistor;

The third conductive layer may include a second sub-reset signal line, a second sub-scanning signal line, a third reset signal line and a third initial signal line, and a second control electrode of a first transistor and a second control electrode of a second transistor located in at least one pixel circuit;

The fourth conductive layer may include: a second initial signal line and a first electrode and a second electrode of a first transistor, a first electrode and a second electrode of the second transistor, a first electrode of the fourth transistor, a first electrode of the fifth transistor, a second electrode of the sixth transistor, a first electrode and a second electrode of the seventh transistor, a first electrode of the eighth transistor, a first electrode of the ninth transistor and a first connection electrode VL1 located in at least one pixel circuit; the first connection electrode is configured to connect a control electrode T82 of the eighth transistor, a control electrode T92 of the ninth transistor, and the third reset signal line;

The fifth conductive layer may include a first power supply line VDDL, a data signal line, and a second connection electrode located in at least one pixel circuit, the second connection electrode is configured to connect a second electrode of the sixth transistor and the light emitting element.

In an exemplary embodiment, the circuit structure layer may further include a light shielding layer located on a side of the first insulating layer 21 close to the base substrate, and the light shielding layer includes light shielding parts and light shielding connection parts SHC arranged in an array and disposed at intervals. The light shielding connection part is configured to connect adjacent light shielding parts; the orthographic projection of the light shielding part on the base substrate at least overlaps a part of the orthographic projection of the active layer of the third transistor on the base substrate.

In an exemplary embodiment, the control electrode T82 of the eighth transistor and the control electrode T92 of the ninth transistor are of an integrally formed structure; the first scanning signal line and the light emitting signal line connected to the pixel circuit are respectively provided on two sides of the first plate of the capacitor of the pixel circuit, and the integrally formed structure of the control electrode of the eighth transistor and the control electrode of the ninth transistor is located between the first plate of the capacitor and the light emitting signal line connected to the pixel circuit.

In an exemplary embodiment, a first control electrode of the first transistor and the first sub-reset signal line are of an integrally formed structure, and a second control electrode of the second transistor and a first sub-scanning signal line are of an integrally formed structure; a first initial signal line, a first sub-reset signal line and a first sub-scanning signal line connected to the pixel circuit extend in a first direction and are located on the same side of the second plate of the capacitor of the pixel circuit, the first sub-reset signal line is located on a side of the first initial signal line close to the second plate of the capacitor of the pixel circuit, and the first sub-scanning signal line is located on a side of the first sub-reset signal line close to the second plate of the capacitor of the pixel circuit; the control signal line is located on a side of the second plate of the capacitor of the pixel circuit away from the first sub-scanning signal line.

In an exemplary embodiment, the orthographic projection of the first scanning signal line on the base substrate is located between the orthographic projection of the first sub-reset signal line on the base substrate and the orthographic projection of the first sub-scanning signal line on the base substrate; the orthographic projection of the integrally formed structure of the control electrode of the eighth transistor and the control electrode of the ninth transistor on the base substrate is located between the orthographic projection of the second plate of the capacitor on the base substrate and the orthographic projection of the control signal line on the base substrate; the orthographic projection of the control signal line on the base substrate is located between the orthographic projection of the light emitting signal line on the base substrate and the orthographic projection of the integrally formed structure of the control electrode of the eighth transistor and the control electrode of the ninth transistor on the base substrate; the second plate of the capacitor of the pixel circuit is electrically connected with the second plate of the capacitor of the first adjacent pixel circuit.

In an exemplary embodiment, the active layer of the first transistor and the active layer of the second transistor are respectively located on two sides of the active connection part; the orthographic projection of the active layer of the first transistor on the base substrate overlaps the orthographic projection of the first initial signal line on the base substrate; the orthographic projection of the active layer of the second transistor on the base substrate overlaps the orthographic projection of the first sub-scanning signal line on the base substrate; the orthographic projection of the active connection part on the base substrate at least overlaps a part of the orthographic projection of the first scanning signal line on the base substrate.

In an exemplary embodiment, the second control electrode of the first transistor and the second sub-reset signal line are of an integrally formed structure, and the first control electrode of the second transistor and the second sub-scanning signal line are of an integrally formed structure; the second sub-scanning signal line is located between the second sub-reset signal line and the third reset signal line, and the third initial signal line is located on a side of the third reset signal line away from the second sub-reset signal line; the orthographic projection of the second sub-reset signal line on the base substrate at least overlaps a part of the orthographic projection of the first sub-reset signal line on the base substrate and is located between the orthographic projection of the first initial signal line on the base substrate and the orthographic projection of the first scanning signal line on the base substrate; the orthographic projection of the second sub-scanning signal line on the base substrate at least overlaps a part of the orthographic projection of the first sub-scanning signal line on the base substrate and is located between the orthographic projection of the first scanning signal line on the base substrate and the orthographic projection of the second plate of the capacitor on the base substrate; the orthographic projection of the third reset signal line on the base substrate is located between the orthographic projection of the second plate of the capacitor on the base substrate and the orthographic projection of the integrally formed structure of the control electrode of the eighth transistor and the control electrode of the ninth transistor on the base substrate; the orthographic projection of the third initial signal line on the base substrate is located on a side of the orthographic projection of the control signal line on the base substrate away from the orthographic projection of the second plate of the capacitor on the base substrate, and overlaps a part of the orthographic projections of the light emitting signal line and the control signal line on the base substrate.

In an exemplary embodiment, the sixth insulating layer may be opened with a plurality of via patterns, the plurality of via patterns include: a first via to a seventh via opened on the second insulating layer to the sixth insulating layer, an eighth via and a ninth via opened on the third to sixth insulating layers, a tenth via to a twelfth via opened on the fourth to sixth insulating layers, a thirteenth via to a fifteenth via opened on the fifth and sixth insulating layers, and a sixteenth via and a seventeenth via opened on the sixth insulating layer; the third via exposes the active layer of the fifth transistor, the tenth via exposes the first initial signal line, and the eleventh via exposes the second plate of the capacitor; a virtual straight line extending in the second direction passes through the third via and the eleventh via; the third via of the pixel circuit and the third via of the first adjacent pixel circuit are a same via; the eleventh via of the pixel circuit and the eleventh via of the first adjacent pixel circuit are a same via; the tenth via of the pixel circuit and the tenth via of the second adjacent pixel circuit are a same via.

In an exemplary embodiment, a first electrode of a fifth transistor of the pixel circuit is the same electrode as a first electrode of a fifth transistor of the first adjacent pixel circuit; the orthographic projection of the second initial signal line on the base substrate overlaps a part of the orthographic projections of the first reset signal line and the first scanning signal line on the base substrate; the orthographic projection of the integrally formed structure of a second electrode of the first transistor and a second electrode of the second transistor on the base substrate at least overlaps a part of the orthographic projections of the active connection part, the second scanning signal line and the second plate of the capacitor on the base substrate; the orthographic projection of the first electrode of the fifth transistor on the base substrate overlaps the orthographic projections of the second plate of the capacitor, the third reset signal line, the control signal line, the light emitting signal line and the third initial signal line on the base substrate; the orthographic projection of the first connection electrode on the base substrate at least overlaps a part of the orthographic projections of the third reset signal line and the control electrode of the eighth transistor on the base substrate; the orthographic projection of the first electrode of the eighth transistor on the base substrate overlaps a part of the orthographic projections of the control signal line, the light emitting signal line and the third initial signal line on the base substrate; the orthographic projection of the first electrode of the ninth transistor on the base substrate overlaps a part of the orthographic projection of the control signal line on the base substrate.

In an exemplary embodiment, the data signal line and the first power supply line connected to the pixel circuit are located on a same side of the second connection electrode; the first power supply line may include: a power supply body part and a power supply connection part connected with each other, wherein, the power supply connection part is located on a side of the power supply body part away from the data signal line; the power supply connection part of the first power supply line connected to the pixel circuit is connected with the power supply connection part of the first power supply line connected to the second adjacent pixel circuit. The orthographic projection of the power supply connection part on the base substrate overlaps a part of the orthographic projections of the active connection part, the second scanning signal line, the first scanning signal line and the second initial signal line on the base substrate.

The structure of the display substrate will be described below through an example of a manufacturing process of the display substrate. A "patterning process" mentioned in the present disclosure includes film layer deposition, photoresist coating, mask exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. A "thin film" refers to a layer of a thin film prepared from a material on a base substrate using a process of deposition or coating. If no patterning process is needed for the "thin film" in the whole making process, the "thin film" may also be called a "layer". If the patterning process is needed for the "thin film" in the whole making process, the thin film is called a "thin film" before the patterning process and called a "layer" after the patterning process. The "layer" after the patterning process includes at least one "pattern". "A and B are provided in a same layer" in the present disclosure refers to that A and B are simultaneously formed by the same patterning process.

FIGS. 14 to 23B are schematic diagrams of a preparation process of a display substrate provided by an exemplary embodiment. FIGS. 14 to 23B are illustrated by taking a pixel circuit with one row and four columns and the second reset signal and the first scanning signal line being the same signal line as an example. As shown in FIGS. 14 to 23B, a preparation process of a display substrate provided by an exemplary embodiment may include following operations.

Figure 14:
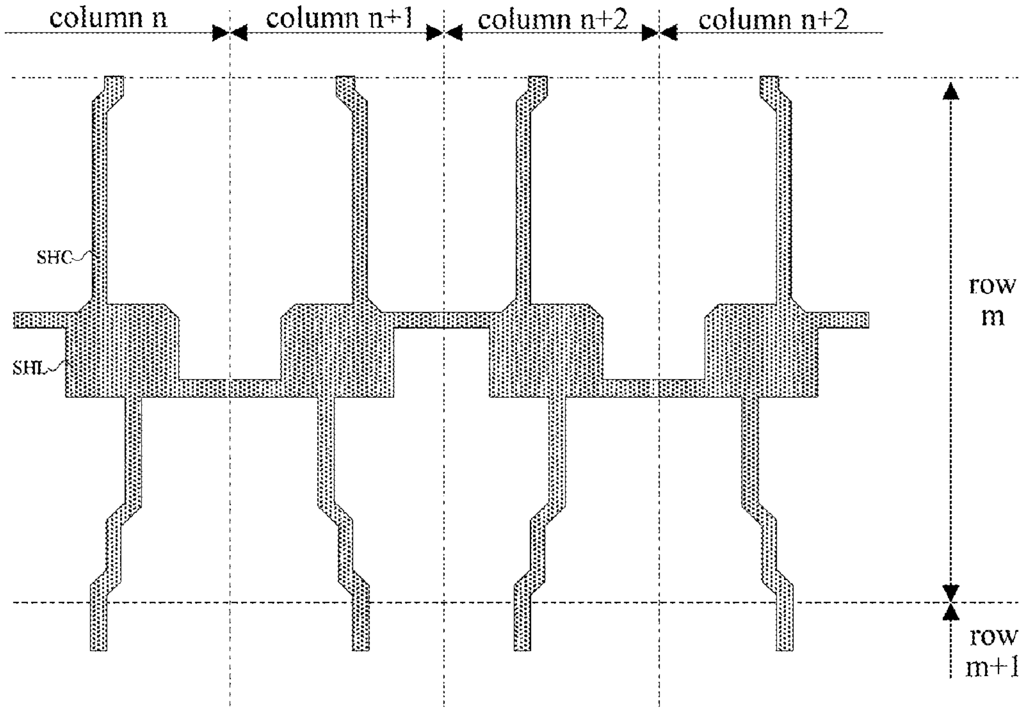
FIG. 14 is a schematic diagram of a light shielding layer pattern.

(1) Forming a light shielding layer pattern on a base substrate, which includes: depositing a light shielding film on the base substrate, and patterning the light shielding film by a patterning process to form the light shielding layer pattern, as shown in FIG. 14, which is a schematic diagram of the light shielding layer pattern.

In an exemplary embodiment, as shown in FIG. 14 the light shielding layer may include light shielding parts SHL and light shielding connection parts SHL arranged in an array and disposed at intervals. The light shielding connection part SHL is configured to connect adjacent light shielding parts SHL.

In an exemplary embodiment, as shown in FIG. 14, the light shielding part SHL may have a square shape.

In an exemplary embodiment, as shown in FIG. 14, the light shielding connection parts SHL connecting adjacent light shielding parts SHL located in a same row extend in the first direction, and the light shielding connection parts SHL connecting adjacent light shielding parts SHL located in a same column extend in the second direction.

Figure 15A:
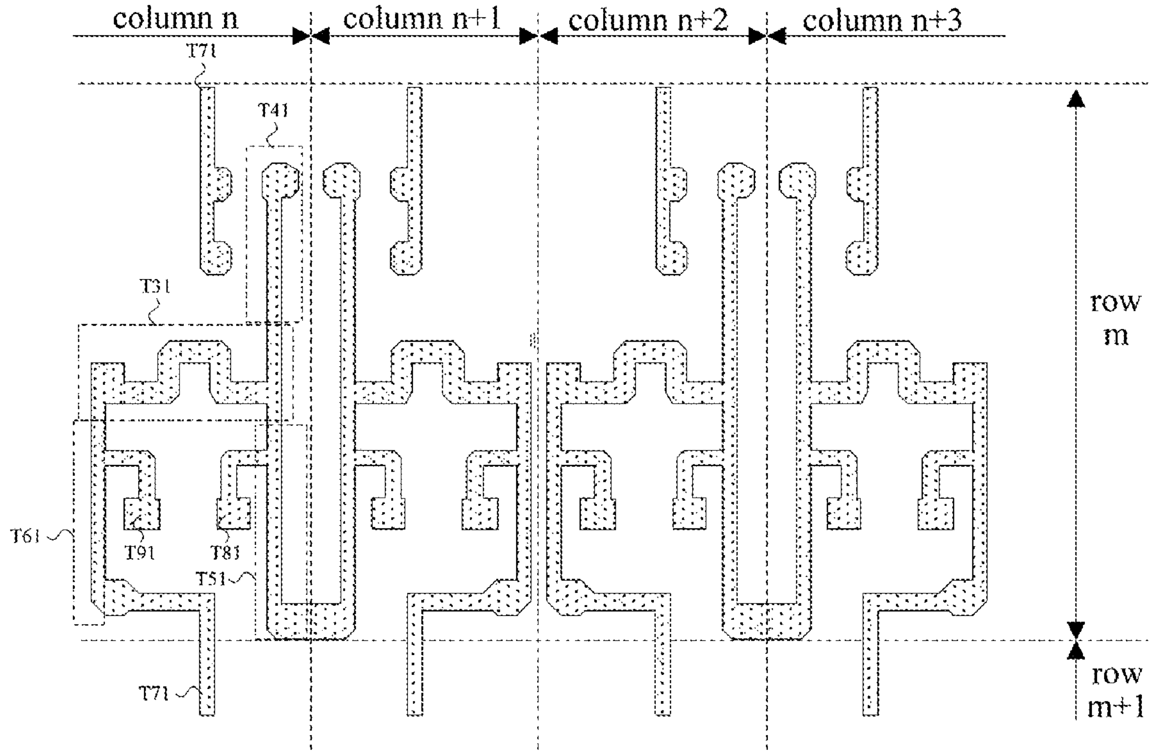
FIG. 15A is a schematic diagram of a first semiconductor layer pattern.
Figure 15B:
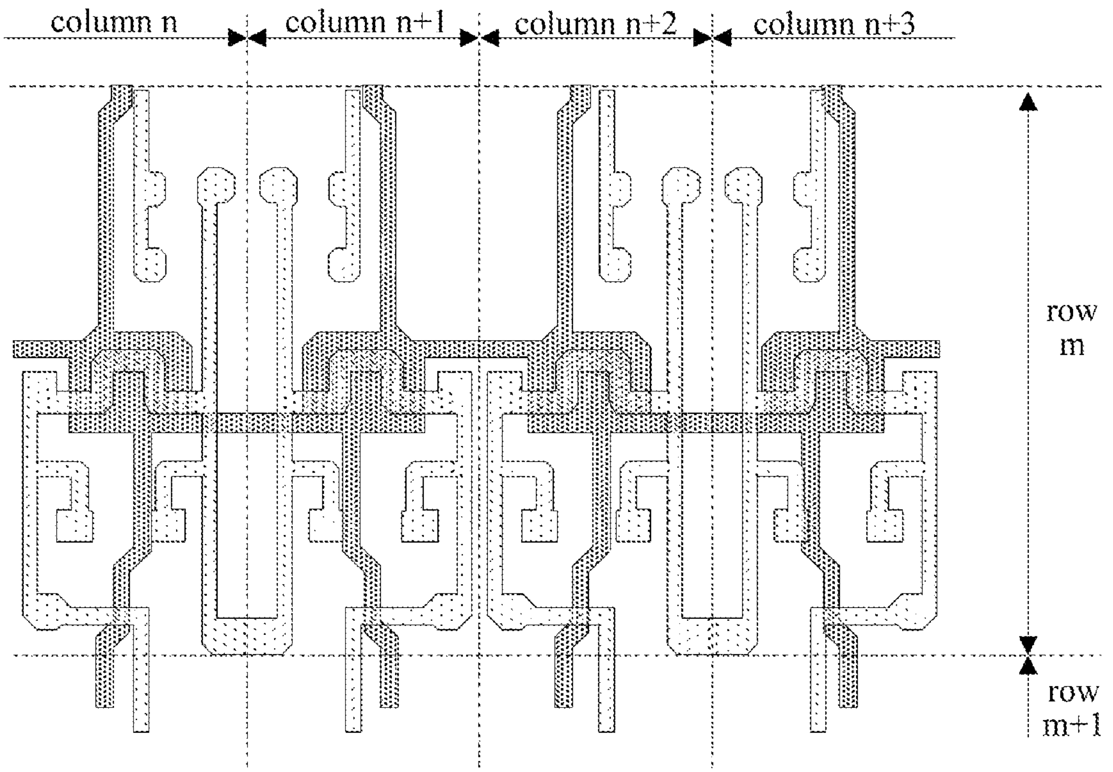
FIG. 15B is a schematic diagram after the first semiconductor layer pattern is formed.

(2) Forming a first semiconductor layer pattern, which includes: depositing a first insulating film and a first semiconductor film on the base substrate on which the aforementioned patterns are formed, and patterning the first insulating film and the first semiconductor film by a patterning process to form a first insulating layer pattern and the first semiconductor layer pattern formed on the first insulating layer pattern, as shown in FIGS. 15A and 15B, wherein FIG. 15A is a schematic diagram of the first semiconductor layer pattern and FIG. 15B is a schematic diagram after the first semiconductor layer pattern is formed.

In an exemplary embodiment, as shown in FIGS. 15A and 15B, the first semiconductor layer may include an active layer T31 of a third transistor, an active layer T41 of a fourth transistor, an active layer T51 of a fifth transistor, an active layer T61 of a sixth transistor, a seventh transistor T71, an active layer T81 of an eighth transistor and an active layer T91 of a ninth transistor located in at least one pixel circuit.

In an exemplary embodiment, the active layer T31 of the third transistor to the active layer T91 of the ninth transistor may be of an integrally formed structure.

In an exemplary embodiment, the active layer T31 of the third transistor may be Ω-shaped.

In an exemplary embodiment, the sides of the active layer of the third transistor include a first side, a second side, a third side, and a fourth side, wherein the first side and the second side are oppositely disposed, and the third side and the fourth side are oppositely disposed. The active layer T41 of the fourth transistor and the active layer T51 of the fifth transistor are located on the first side of the active layer T31 of the third transistor and extend in the second direction. The active layer T61 of the sixth transistor is located on the second side of the active layer T31 of the third transistor and extends in the second direction. The active layer T81 of the eighth transistor is located at the active layer T51 of the fifth transistor and close to the active layer T61 of the sixth transistor, and the active layer T91 of the ninth transistor is located at the active layer T61 of the sixth transistor and close to the active layer T51 of the fifth transistor. The active layer T81 of the eighth transistor and the active layer T91 of the ninth transistor may have an inverted "L" shape.

In an exemplary embodiment, the orthographic projection of the active layer T31 of the third transistor on the base substrate at least overlaps a part of the orthographic projection of the light shielding part on the base substrate.

Figure 16A:
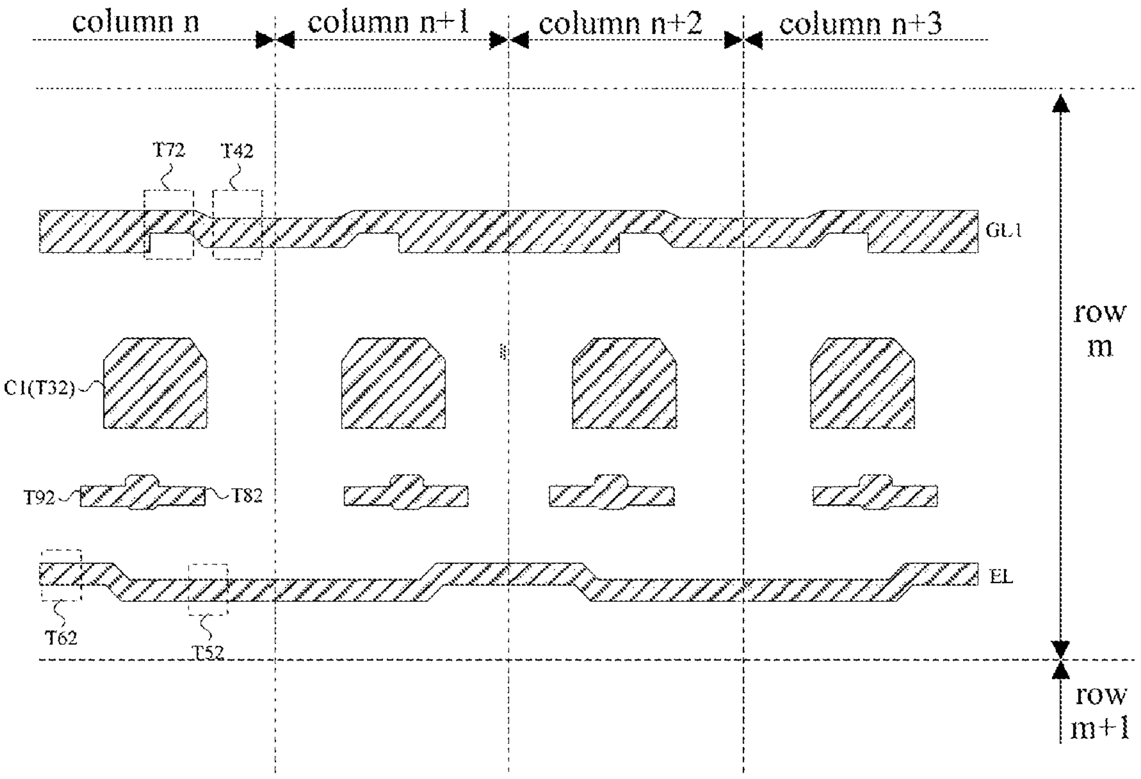
FIG. 16A is a schematic diagram of a first conductive layer pattern.
Figure 16B:
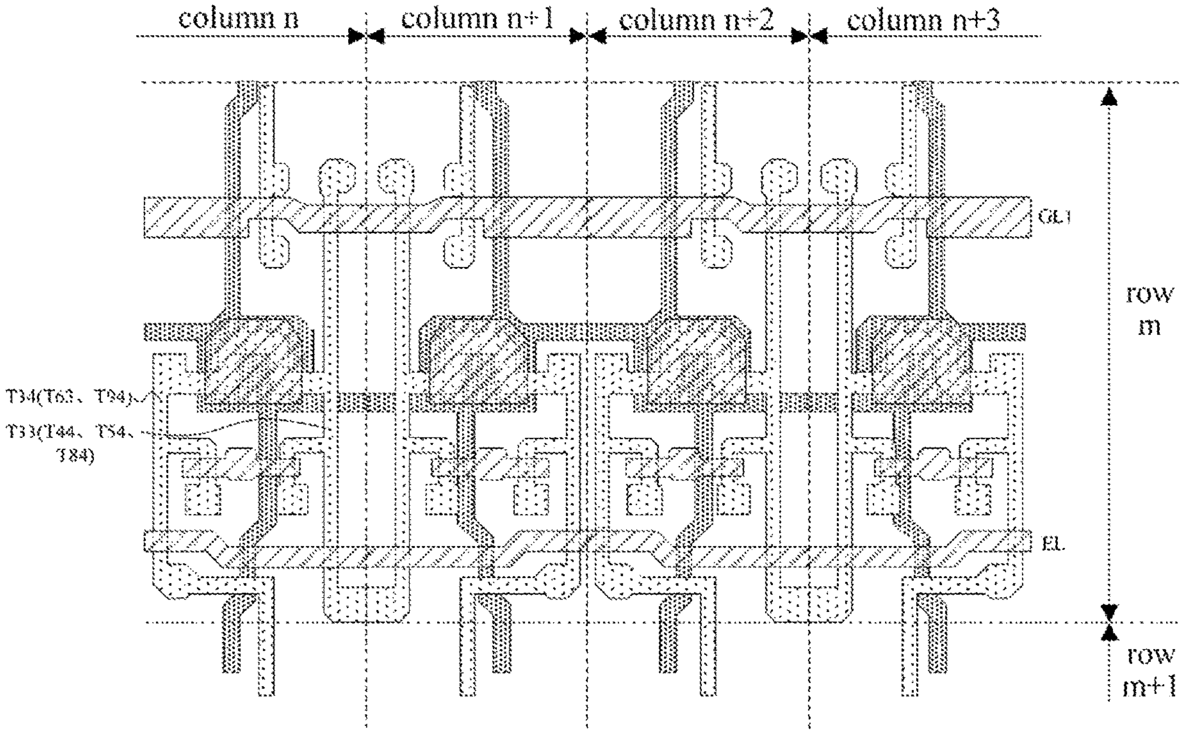
FIG. 16B is a schematic diagram after the first conductive layer pattern is formed.

(3) Forming a first conductive layer pattern, which includes: depositing a second insulating film and a first conductive film sequentially on the base substrate on which the aforementioned patterns are formed, and patterning the second insulating film and the first conductive film by a patterning process to form a second insulating layer pattern and the first conductive layer pattern on the second insulating layer, as shown in FIGS. 16A and 16B, wherein FIG. 16A is a schematic diagram of the first conductive layer pattern and FIG. 16B is a schematic diagram after the first conductive layer pattern is formed.

In an exemplary embodiment, as shown in FIGS. 16A and 16B, the first conductive layer may include: the first scanning signal line GL1, the light emitting signal line EL, and the first plate C1 of the capacitor, the control electrode T32 of the third transistor, the control electrode T42 of the fourth transistor, the control electrode T52 of the fifth transistor, the control electrode T62 of the sixth transistor, the control electrode T72 of the seventh transistor, the control electrode T82 of the eighth transistor, and the control electrode T92 of the ninth transistor located in at least one pixel circuit.

In an exemplary embodiment, as shown in FIGS. 16A and 16B, for any pixel circuit, the control electrode T32 of the third transistor and the first plate C1 of the capacitor are of an integrally formed structure, the control electrode T42 of the fourth transistor, the control electrode T72 of the seventh transistor and the first scanning signal line GL1 connected to the pixel circuit are of an integrally formed structure, the control electrode T52 of the fifth transistor, the control electrode T62 of the sixth transistor and the light emitting signal line EL connected to the pixel circuit are of an integrally formed structure, and the control electrode T82 of the eighth transistor and the control electrode T9 of the ninth transistor are of an integrally formed structure.

In the present disclosure, the control electrode T82 of the eighth transistor and the control electrode T9 of the ninth transistor being of an integrally formed structure can simplify the manufacturing process of the display substrate and improve the reliability of the display substrate.

In an exemplary embodiment, as shown in FIGS. 16A and 16B, the first scanning signal line GL1 and the light emitting signal line EL connected to the pixel circuit extend in the first direction and are respectively located on two sides of the first plate C1 of the capacitor of the pixel circuit.

In an exemplary embodiment, as shown in FIGS. 16A and 16B, the integrally formed structure of the control electrode T82 of the eighth transistor and the control electrode T92 of the ninth transistor extends in the first direction and is located between the first plate C1 of the capacitor and the light emitting signal line EL connected to the pixel circuit.

In an exemplary embodiment, the orthographic projection of the first plate of the capacitor on the base substrate at least overlaps a part of the orthographic projection of the light shielding part on the base substrate.

In an exemplary embodiment, the control electrode T32 of the third transistor is disposed across the active layer of the third transistor, the control electrode T42 of the fourth transistor is disposed across the active layer of the fourth transistor, the control electrode T52 of the fifth transistor is disposed across the active layer of the fifth transistor, the control electrode T62 of the sixth transistor is disposed across the active layer of the sixth transistor, the control electrode T72 of the seventh transistor is disposed across the active layer of the seventh transistor, the control electrode T82 of the eighth transistor is disposed across the active layer of the eighth transistor, and the control electrode T92 of the ninth transistor is disposed across the active layer of the ninth transistor, that is, the extension direction of a control electrode of at least one transistor is perpendicular to the extension direction of the active layer.

In an exemplary embodiment, this process also includes a conductorization processing. The conductorization processing is that after a first conductive layer pattern is formed, using a semiconductor layer in a control electrode masking region of a plurality of transistors (i.e., the region where the semiconductor layer overlaps the control electrode) as the channel region of the transistor, the semiconductor layer in the region not masked by the first conductive layer is processed into a conductorized layer to form a first electrode connection part and a second electrode connection part of the transistor. As shown in FIG. 16B, the first electrode connection part of the active layer of the third transistor may be multiplexed as a first electrode T33 of the third transistor, a second electrode T44 of the fourth transistor, a second electrode T54 of the fifth transistor, and a second electrode T84 of the eighth transistor, the second electrode connection part of the active layer of the third transistor may be multiplexed as a second electrode T34 of the third transistor, a second electrode T64 of the sixth transistor, and a second electrode T94 of the ninth transistor.

Figure 17A:
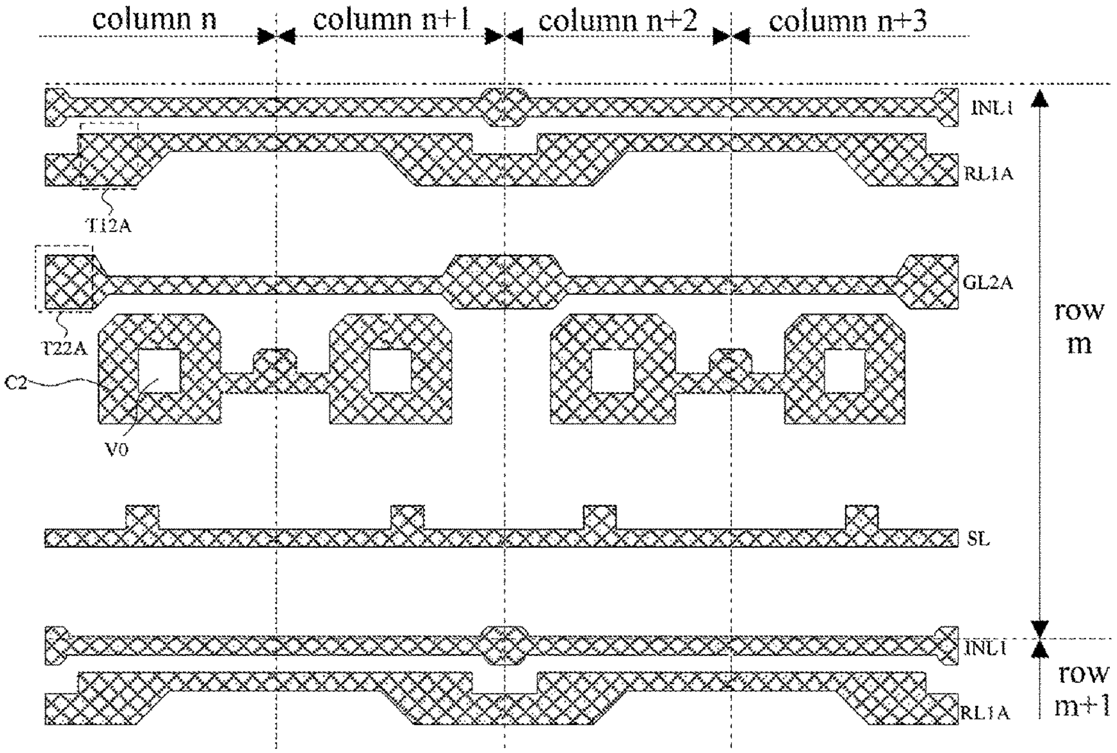
FIG. 17A is a schematic diagram of a second conductive layer pattern.
Figure 17B:
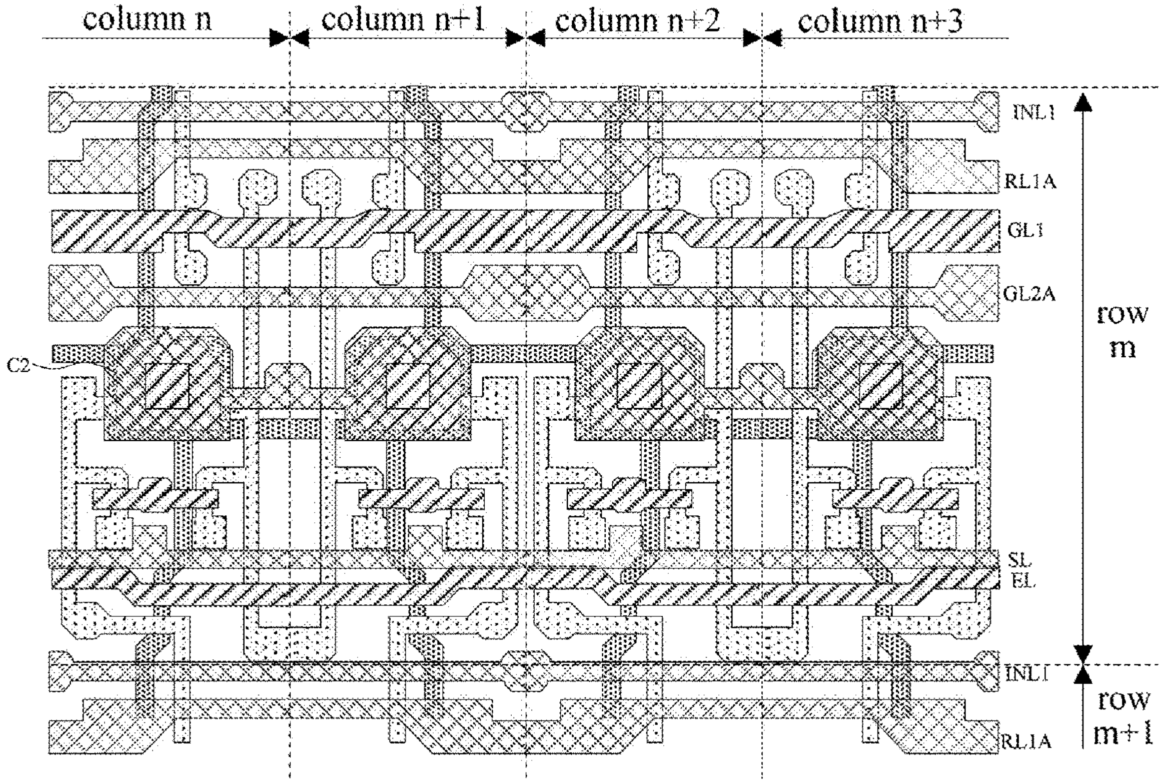
FIG. 17B is a schematic diagram after the second conductive layer pattern is formed.

(4) Forming a second conductive layer pattern, which includes: depositing a third insulating film and a second conductive film sequentially on the base substrate on which the aforementioned patterns are formed, patterning the third insulating film and the second conductive film by a patterning process to form a third insulating layer pattern and the second conductive layer pattern on the second insulating layer, as shown in FIGS. 17A and 17B, in which FIG. 17A is a schematic diagram of the second conductive layer pattern and FIG. 17B is a schematic diagram after the second conductive layer pattern is formed.

In an exemplary embodiment, as shown in FIGS. 17A and 17B, the second conductive layer may include a first initial signal line INL1, a first sub-reset signal line RL1A, a first sub-scanning signal line GL2A, a control signal line SL, and a second plate C2 of a capacitor, a first control electrode T12A of a first transistor, and a first control electrode T22A of a second transistor located in at least one pixel circuit.

In an exemplary embodiment, the first control electrode T12A of the first transistor and the first sub-reset signal line RL1A are of an integrally formed structure, and the first control electrode T22A of the second transistor and the first sub-scanning signal line GL2A are of an integrally formed structure.

In an exemplary embodiment, as shown in FIGS. 17A and 17B, the first initial signal line INL1, the first sub-reset signal line RL1A and the first sub-scanning signal line GL2A connected to the pixel circuit extend in a first direction and are located on a same side of the second plate C2 of the capacitor of the pixel circuit, the first sub-reset signal line RL1A is located on a side of the first initial signal line INL1 close to the second plate C2 of the capacitor of the pixel circuit, and the first sub-scanning signal line GL2A is located on a side of the first sub-reset signal line RL1A close to the second plate C2 of the capacitor of the pixel circuit. The control signal line SL extends in the first direction and is located on a side of the second plate C2 of the capacitor of the pixel circuit away from the first sub-scanning signal line GL2A.

In an exemplary embodiment, the orthographic projection of the second plate C2 of the capacitor of the pixel circuit on the base substrate at least overlaps a part of the orthographic projection of the first plate of the capacitor on the base substrate, and the second plate C2 of the capacitor is provided with an via V0 that exposes the first plate of the capacitor.

In an exemplary embodiment, the orthographic projection of the first scanning signal line GL1 on the base substrate is located between the orthographic projection of the first sub-reset signal line RL1A on the base substrate and the orthographic projection of the first sub-scanning signal line GL2A on the base substrate.

In an exemplary embodiment, the orthographic projection of the integrally formed structure of a control electrode of the eighth transistor and a control electrode of the ninth transistor on the base substrate is located between the orthographic projection of the second plate C2 of the capacitor on the base substrate and the orthographic projection of the control signal line SL on the base substrate.

In an exemplary embodiment, the orthographic projection of the control signal line SL connected to the pixel circuit on the base substrate is located between the orthographic projection of the light emitting signal line EL on the base substrate and the orthographic projection of the integrally formed structure of the control electrode of the eighth transistor and the control electrode of the ninth transistor on the base substrate.

In an exemplary embodiment, the second plate C2 of the capacitor of the pixel circuit is electrically connected with the second plate C2 of the capacitor of the first adjacent pixel circuit.

Figure 18A:
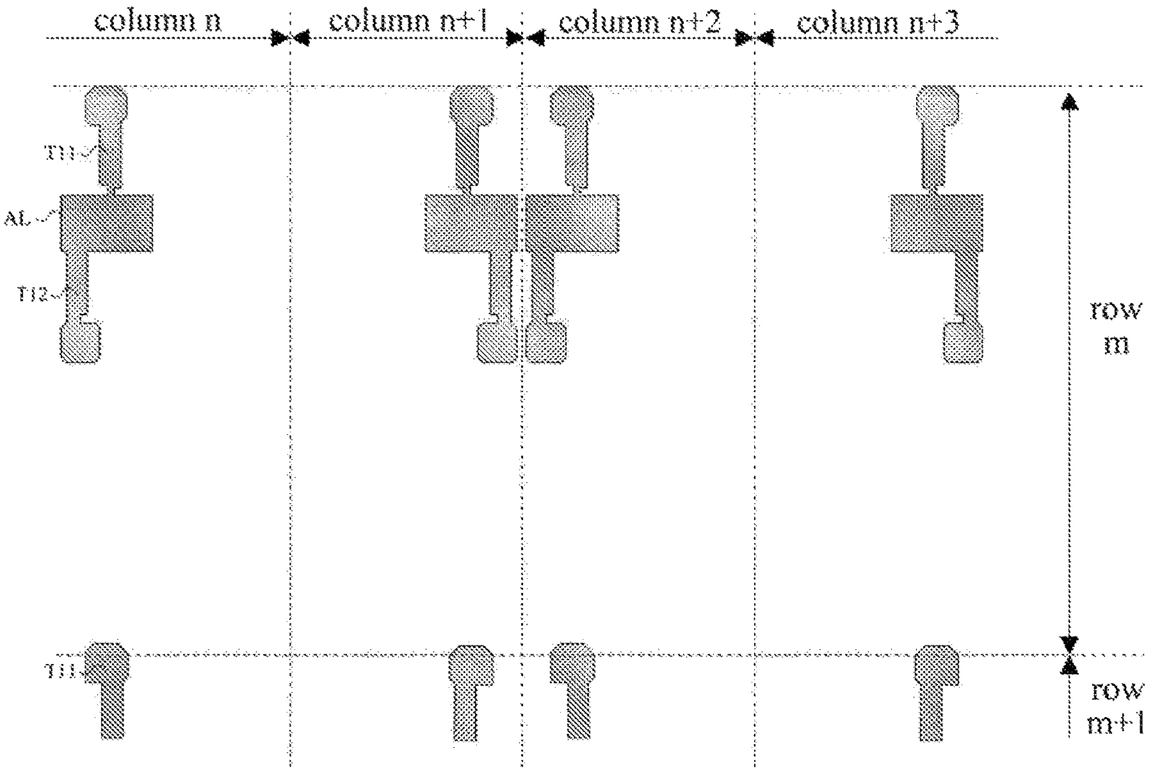
FIG. 18A is a schematic diagram of a second semiconductor layer pattern.
Figure 18B:
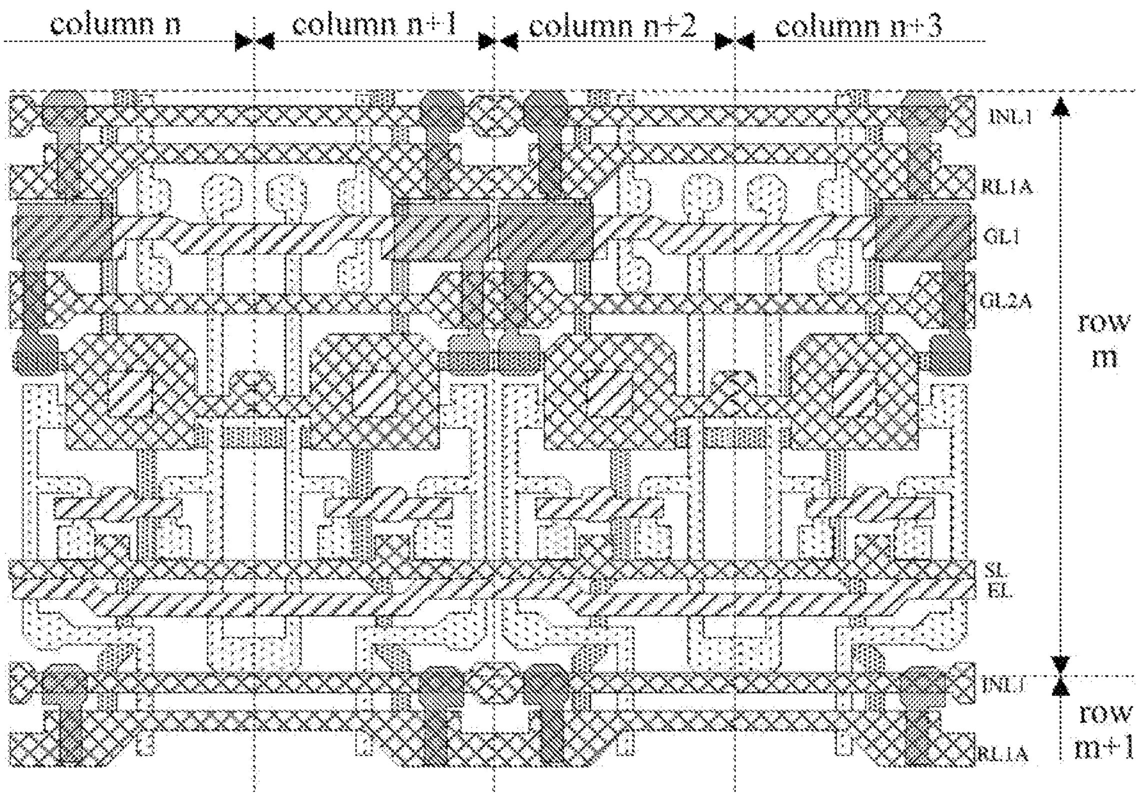
FIG. 18B is a schematic diagram after the second semiconductor layer pattern is formed.

(5) Forming a second semiconductor layer pattern, which includes: depositing a fourth insulating film and a second semiconductor film sequentially on the base substrate on which the aforementioned patterns are formed, patterning the fourth insulating film and the second semiconductor film by a patterning process to form a fourth insulating layer pattern and the second semiconductor layer pattern on the third insulating layer, as shown in FIGS. 18A and 18B, wherein FIG. 18A is a schematic diagram of the second semiconductor layer pattern and FIG. 18B is a schematic diagram after the second semiconductor layer pattern is formed.

In an exemplary embodiment, as shown in FIGS. 18A and 18B, the second semiconductor layer may include an active layer T11 of a first transistor, an active layer T21 of the second transistor, and an active connection part AL located in at least one pixel circuit.

In an exemplary embodiment, as shown in FIGS. 18A and 18B, the active layer T11 of the first transistor, the active layer T21 of the second transistor, and the active connection part AL are of an integrally formed structure.

In an exemplary embodiment, as shown in FIGS. 18A and 18B, the active layer T11 of the first transistor and the active layer T21 of the second transistor extend in the second direction and are respectively located on two sides of the active connection part AL.

In an exemplary embodiment, as shown in FIGS. 18A and 18B, the orthographic projection of the active layer T11 of the first transistor on the base substrate overlaps the orthographic projection of the first initial signal line INL1 on the base substrate. The orthographic projection of the active layer T211 of the second transistor on the base substrate overlaps the orthographic projection of the first sub-scanning signal line GL2A on the base substrate.

In an exemplary embodiment, as shown in FIGS. 18A and 18B, the orthographic projection of the active connection part AL on the base substrate at least overlaps a part of the orthographic projection of the first scanning signal line GL1 on the base substrate, and the active connection part may have a square shape.

In an exemplary embodiment, the active layer T11 of the first transistor is disposed across the first control electrode of the first transistor, and the active layer T21 of the second transistor is disposed across the first control electrode of the second transistor.

Figure 19A:
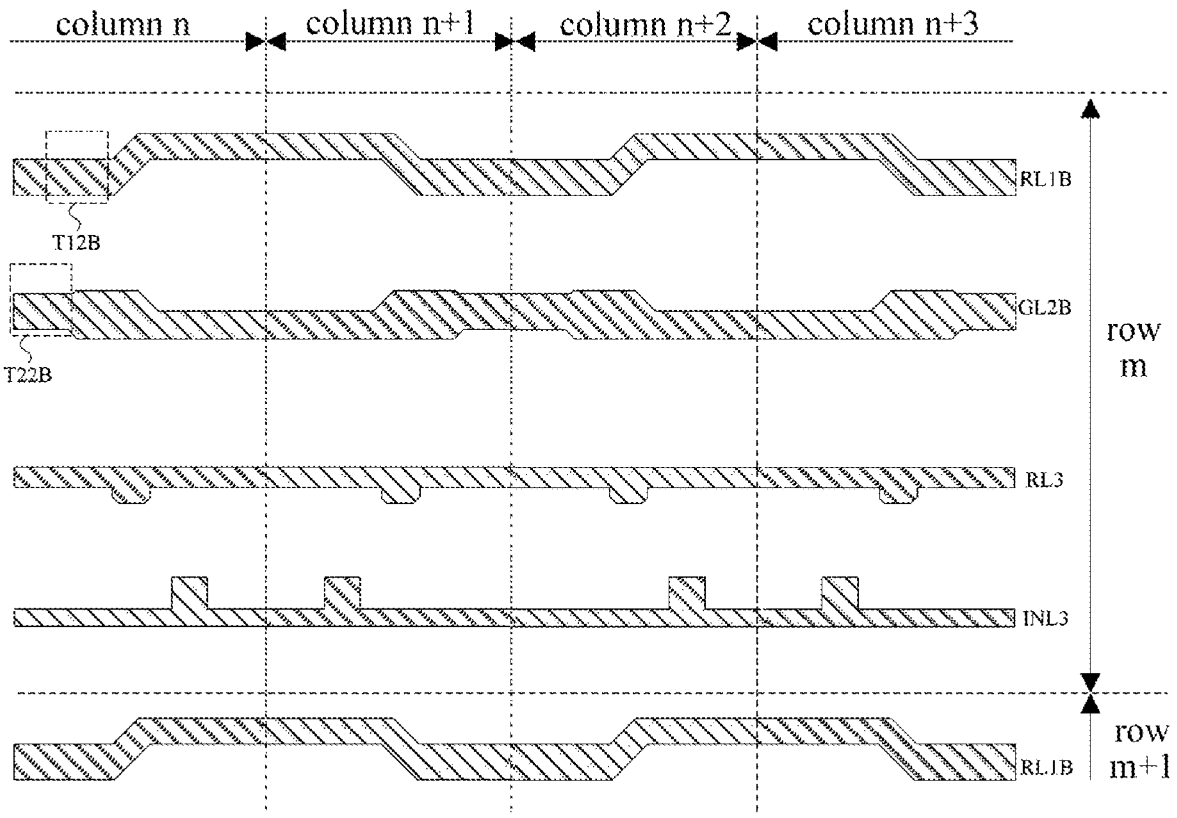
FIG. 19A is a schematic diagram of a third conductive layer pattern.
Figure 19B:
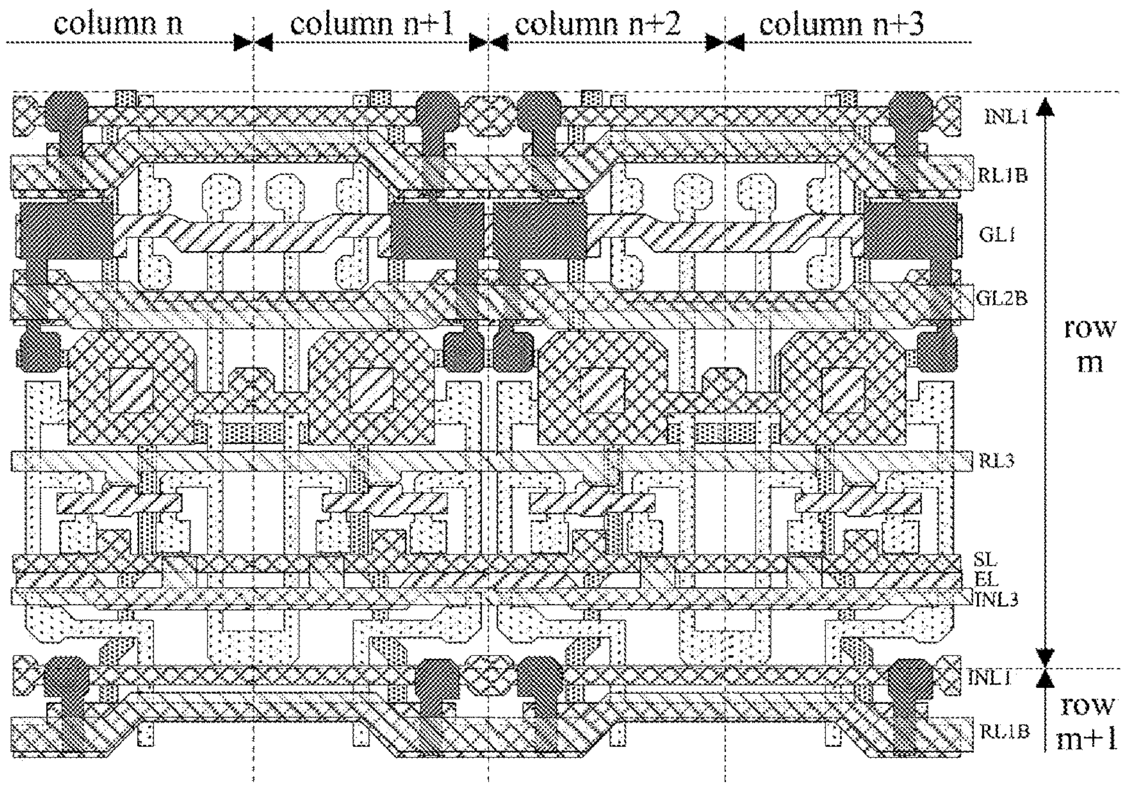
FIG. 19B is a schematic diagram after the third conductive layer pattern is formed.

(6) Forming a third conductive layer, which includes: depositing a fifth insulating film and a third conductive film sequentially on the base substrate on which the aforementioned patterns are formed, patterning the fifth insulating film and the third conductive film by a patterning process to form a fifth insulating layer pattern and the third conductive layer pattern on the fourth insulating layer, as shown in FIGS. 19A and 19B, wherein FIG. 19A is a schematic diagram of the third conductive layer pattern and FIG. 19B is a schematic diagram after the third conductive layer pattern is formed.

In an exemplary embodiment, as shown in FIGS. 19A and 19B, the third conductive layer may include a second sub-reset signal line RL1B, a second sub-scanning signal line GL2B, a third reset signal line RL3, and a third initial signal line INL3, and a second control electrode T12B of the first transistor and a second control electrode T22B of the second transistor located in at least one pixel circuit.

In an exemplary embodiment, the second control electrode T12B of the first transistor and the second sub-reset signal line RL1A are of an integrally formed structure, and the second control electrode T22B of the second transistor and the second sub-scanning signal line GL2A are of an integrally formed structure.

In an exemplary embodiment, as shown in FIGS. 19A and 19B, the second sub-reset signal line RL1B, the second sub-scanning signal line GL2B, the third reset signal line RL3 and the third initial signal line INL3 connected to the pixel circuit all extend in the first direction, the second sub-scanning signal line GL2B is located between the second sub-reset signal line RL1B and the third reset signal line RL3, and the third initial signal line INL3 is located on a side of the third reset signal line RL3 away from the second sub-reset signal line RL1B.

In an exemplary embodiment, as shown in FIGS. 19A and 19B, the orthographic projection of the second sub-reset signal line RL1B on the base substrate at least overlaps a part of the orthographic projection of the first sub-reset signal line on the base substrate and is located between the orthographic projection of the first initial signal line INL1 on the base substrate and the orthographic projection of the first scanning signal line GL1 on the base substrate.

In an exemplary embodiment, as shown in FIGS. 19A and 19B, the orthographic projection of the second sub-scanning signal line GL2B on the base substrate at least overlaps a part of the orthographic projection of the first sub-scanning signal line on the base substrate and is located between the orthographic projection of the first scanning signal line GL1 on the base substrate and the orthographic projection of the second plate of the capacitor on the base substrate.

In an exemplary embodiment, as shown in FIGS. 19A and 19B, the orthographic projection of the third reset signal line RL3 on the base substrate is located between the orthographic projection of the second plate of the capacitor on the base substrate and the orthographic projection of the integrally formed structure of the control electrode of the eighth transistor and the control electrode of the ninth transistor on the base substrate.

In an exemplary embodiment, as shown in FIGS. 19A and 19B, the orthographic projection of the third initial signal line INL3 on the base substrate is located on a side of the orthographic projection of the control signal line SL on the base substrate away from the orthographic projection of the second plate of the capacitor on the base substrate, and overlaps a part of the orthographic projection portions of the light emitting signal line EL and the control signal line SL on the base substrate.

(7) Forming a sixth insulating layer pattern, which includes: depositing a fifth insulating film on the base substrate on which the aforementioned patterns are formed, and patterning the sixth insulating film by a patterning process to form the sixth insulating layer pattern covering the aforementioned patterns. The sixth insulating layer is opened with a plurality of via patterns, as shown in FIG. 20, which is a schematic diagram after the sixth insulating layer pattern is formed.

Figure 20:
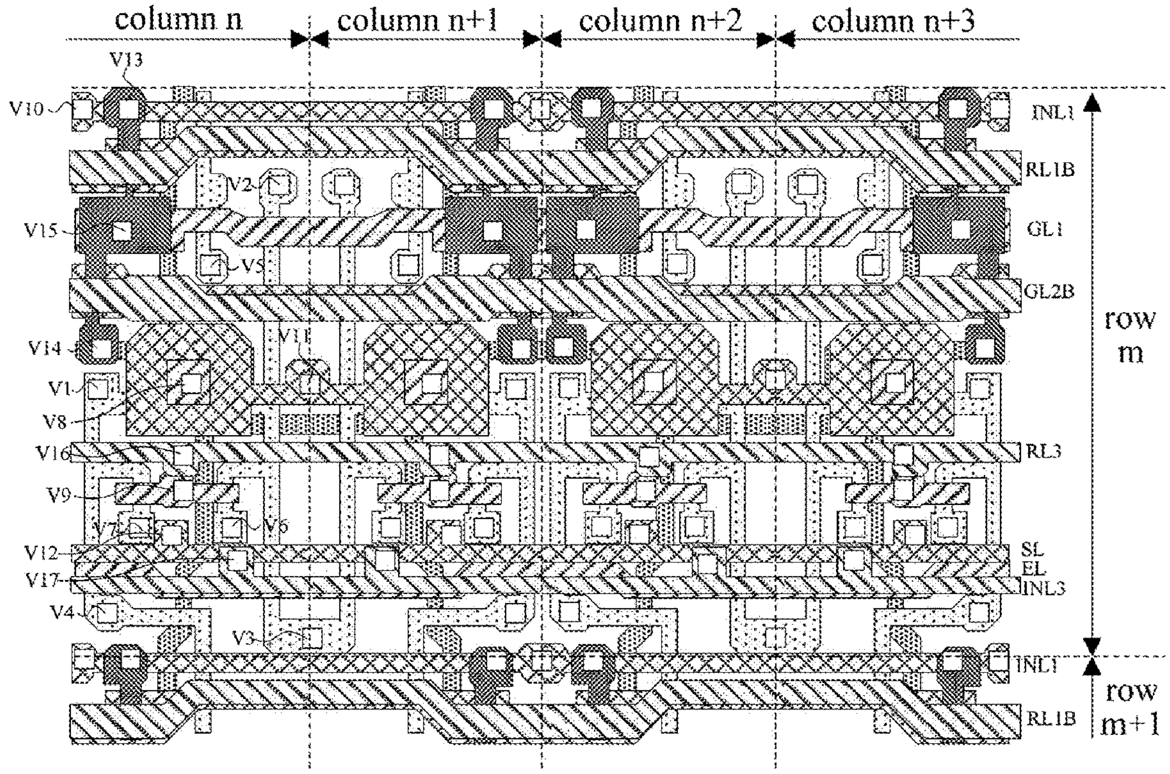
FIG. 20 is a schematic diagram after a sixth insulating layer pattern is formed.

In an exemplary embodiment, as shown in FIG. 20, the plurality of via patterns include: a first via V1 to a seventh via V7 opened on the second to sixth insulating layers, an eighth via V8 and a ninth via V9 are opened on the third to sixth insulating layers, a tenth via V10 to a twelfth via V12 opened on the fourth to sixth insulating layers, a thirteenth via V13 to a fifteenth via V15 opened on the fifth and sixth insulating layers, and a sixteenth via V16 and a seventeenth via V17 opened on the sixth insulating layer. Here, the first via V1 exposes the active layer of the third transistor, the second via V2 exposes the active layer of the fourth transistor, the third via V3 exposes the active layer of the fifth transistor, the fourth via V4 exposes the active layer of the sixth transistor, the fifth via V5 exposes the active layer of the seventh transistor, the sixth via V6 exposes the active layer of the eighth transistor, the seventh via V7 exposes the active layer of the ninth transistor, the eighth via V8 exposes the first plate, the ninth via V9 exposes the integrally formed structure of a control electrode of the eighth transistor and a control electrode of the ninth transistor, the tenth via V10 exposes the first initial signal line, the eleventh via V11 exposes the second plate of the capacitor, the twelfth via V12 exposes the control signal line, the thirteenth via V13 exposes an active layer of the first transistor, the fourteenth via V14 exposes an active layer of the second transistor, the fifteenth via V15 exposes the active connection part, the sixteenth via V16 exposes the third reset signal line, and the seventeenth via V17 exposes the third initial signal line.

In an exemplary embodiment, as shown in FIG. 20, adjacent pixel circuits located on a same row as the pixel circuit include a first adjacent pixel circuit and a second adjacent pixel circuit.

In an exemplary embodiment, as shown in FIG. 20, the third via V3 of the pixel circuit and the third via V3 of the first adjacent pixel circuit are a same via. The third via V3 of the pixel circuit and the third via V3 of the first adjacent pixel circuit being a same via can simplify the preparation process of the display substrate.

In an exemplary embodiment, as shown in FIG. 20 the eleventh via V11 of the pixel circuit and the eleventh via V11 of the first adjacent pixel circuit are a same via. The eleventh via V11 of the pixel circuit and the eleventh via V11 of the first adjacent pixel circuit being a same via can simplify the preparation process of the display substrate.

In an exemplary embodiment, as shown in FIG. 20, the tenth via V10 of the pixel circuit and the tenth via V10 of the second adjacent pixel circuit are a same via. The tenth via V10 of the pixel circuit and the tenth via V10 of the second adjacent pixel circuit being a same via can simplify the preparation process of the display substrate.

In an exemplary embodiment, as shown in FIG. 20, a virtual straight line extending in the second direction passes through the third via V3 and the eleventh via V11.

Figure 21A:
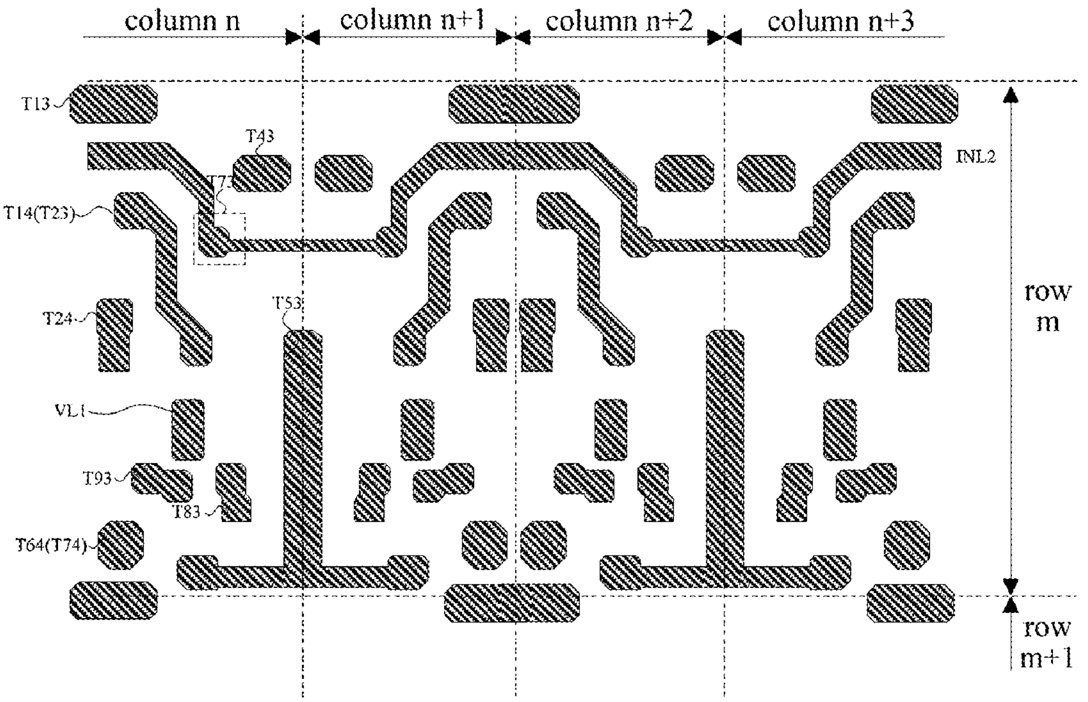
FIG. 21A is a schematic diagram of a fourth conductive layer pattern.
Figure 21B:
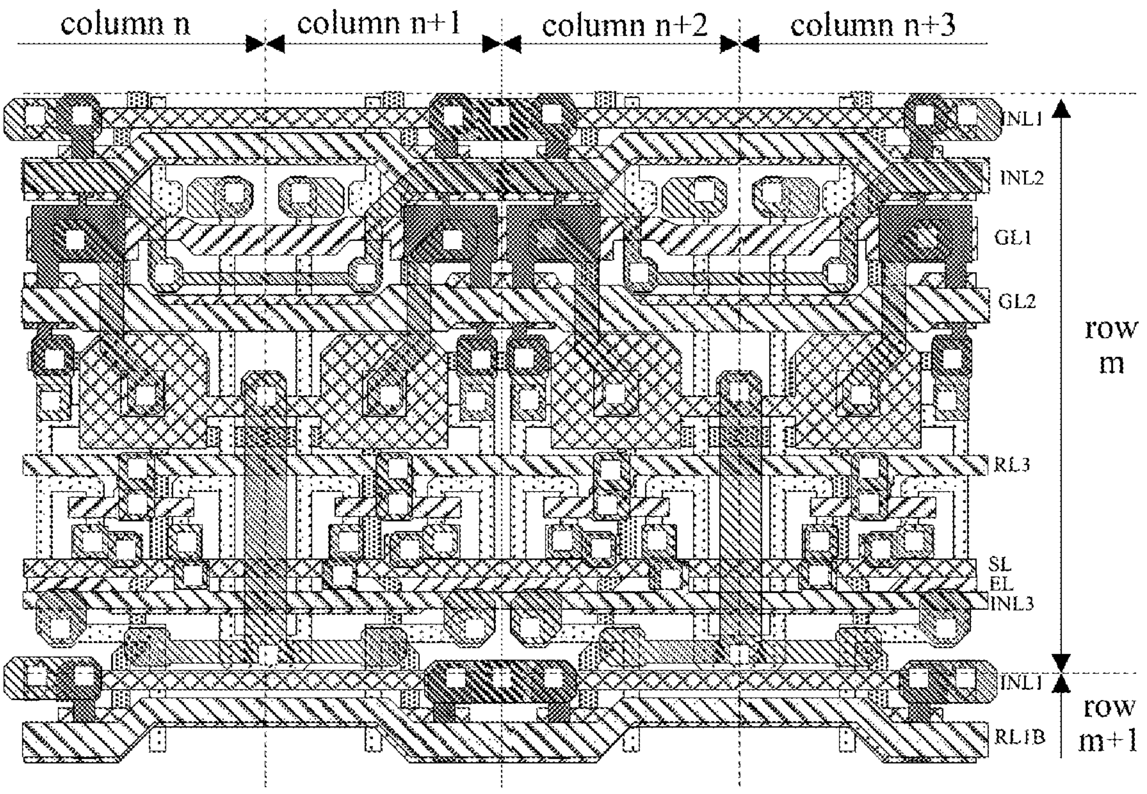
FIG. 21B is a schematic diagram after the fourth conductive layer pattern is formed.

(8) Forming a fourth conductive layer pattern, which includes: depositing a fourth conductive film on the base substrate on which the aforementioned patterns are formed, and patterning the fourth conductive film by a patterning process to form the fourth conductive layer pattern, as shown in FIGS. 21A and 21B, wherein FIG. 21A is a schematic diagram of the fourth conductive layer pattern and FIG. 21B is a schematic diagram after the fourth conductive layer pattern is formed.

In an exemplary embodiment, as shown in FIGS. 21A and 21B, the fourth conductive layer may include: a second initial signal line INL2, and a first electrode T13 and a second electrode T14 of the first transistor, a first electrode T23 and a second electrode T24 of the second transistor, a first electrode T43 of the fourth transistor, a first electrode T53 of the fifth transistor, a second electrode T64 of the sixth transistor, a first electrode T73 and a second electrode T74 of the seventh transistor, a first electrode T83 of the eighth transistor, a first electrode T93 of the ninth transistor and the first connection electrode VL1 located in at least one pixel circuit.

In an exemplary embodiment, as shown in FIGS. 21A and 21B, the first electrode T53 of the fifth transistor of the pixel circuit and the first electrode T53 of the fifth transistor of the first adjacent pixel circuit are a same electrode, and the first electrode T53 of the fifth transistor of the pixel circuit may have an inverted "T" shape.

In an exemplary embodiment, as shown in FIGS. 21A and 21B, the first electrode T73 of the seventh transistor and the second initial signal line INL2 are of an integrally formed structure, the second electrode T14 of the first transistor and the second electrode T24 of the second transistor are of an integrally formed structure, and the second electrode T64 of the sixth transistor and the second electrode T74 of the seventh transistor are of an integrally formed structure.

In an exemplary embodiment, as shown in FIGS. 21A and 21B, the first electrode T13 of the first transistor is connected with an active layer of the first transistor through the thirteenth via and is connected with the first initial signal line through the tenth via, the integrally formed structure of the second electrode T14 of the first transistor and the first electrode T23 of the second transistor is connected with the active connection part through the fifteenth via, and is connected with the first plate of the capacitor through the eighth via. The second electrode T24 of the second transistor is connected with the first electrode of the third transistor through the first via and is connected with the active layer of the second transistor through the fourteenth via. The first electrode T43 of the fourth transistor is connected with the active layer of the fourth transistor through the second via. The first electrode T53 of the fifth transistor is connected with the active layer of the fifth transistor through the third via, and is connected with the second plate through the eleventh via. The integrally formed structure of the second electrode T64 of the sixth transistor and the second electrode T74 of the seventh transistor is connected with the active layer of the sixth transistor through the fourth via. The first electrode T73 of the seventh transistor is connected with the active layer of the seventh transistor through the fifth via. The first electrode T83 of the eighth transistor is connected with the active layer of the eighth transistor through the sixth via and is connected with the third initial signal line through the seventeenth via. The first electrode T93 of the ninth transistor is connected with the active layer of the ninth transistor through the seventh via and is connected with the control signal line through the twelfth via. The first connection electrode VL1 is connected the integrally formed structure with the control electrode of the eighth transistor and the control electrode of the ninth transistor through the ninth via, and is connected with the third reset signal line through the sixteenth via.

In an exemplary embodiment, as shown in FIGS. 21A and 21B, the orthographic projection of the second initial signal line INL2 on the base substrate overlaps a part of the orthographic projections of the first reset signal line and the first scanning signal line on the base substrate.

In an exemplary embodiment, as shown in FIGS. 21A and 21B, the orthographic projection of the integrally formed structure of the second electrode T14 of the first transistor and the second electrode T24 of the second transistor on the base substrate at least overlaps a part of the orthographic projections of the active connection part, the second scanning signal line and the second plate of the capacitor on the base substrate.

In an exemplary embodiment, as shown in FIGS. 21A and 21B, the orthographic projection of the first electrode of the fifth transistor on the base substrate overlaps the orthographic projections of the second plate of the capacitor, the third reset signal line, the control signal line, the light emitting signal line and the third initial signal line on the base substrate.

In an exemplary embodiment, as shown in FIGS. 21A and 21B, the orthographic projection of the first connection electrode VL1 on the base substrate at least overlaps a part of the orthographic projections of the third reset signal line and the control electrode of the eighth transistor on the base substrate.

In an exemplary embodiment, as shown in FIGS. 21A and 21B, the orthographic projection of the first electrode T83 of the eighth transistor on the base substrate overlaps a part of the orthographic projections of the control signal line, the light emitting signal line and the third initial signal line on the base substrate.

In an exemplary embodiment, as shown in FIGS. 21A and 21B, the orthographic projection of the first electrode T93 of the ninth transistor on the base substrate overlaps a part of the orthographic projection of the control signal line on the base substrate.

(9) Forming a first planarization layer pattern, which includes: depositing a seventh insulating film on the base substrate on which the aforementioned patterns are formed, patterning the seventh insulating film by a patterning process to form a seventh insulating layer, coating a first planarization film on the sixth insulating layer, and patterning the first planarization film by a patterning process to form the first planarization layer pattern covering the aforementioned patterns. The first planarization layer is opened with a plurality of via patterns, as shown in FIG. 22, which is a schematic diagram after the first planarization layer pattern is formed.

Figure 22:
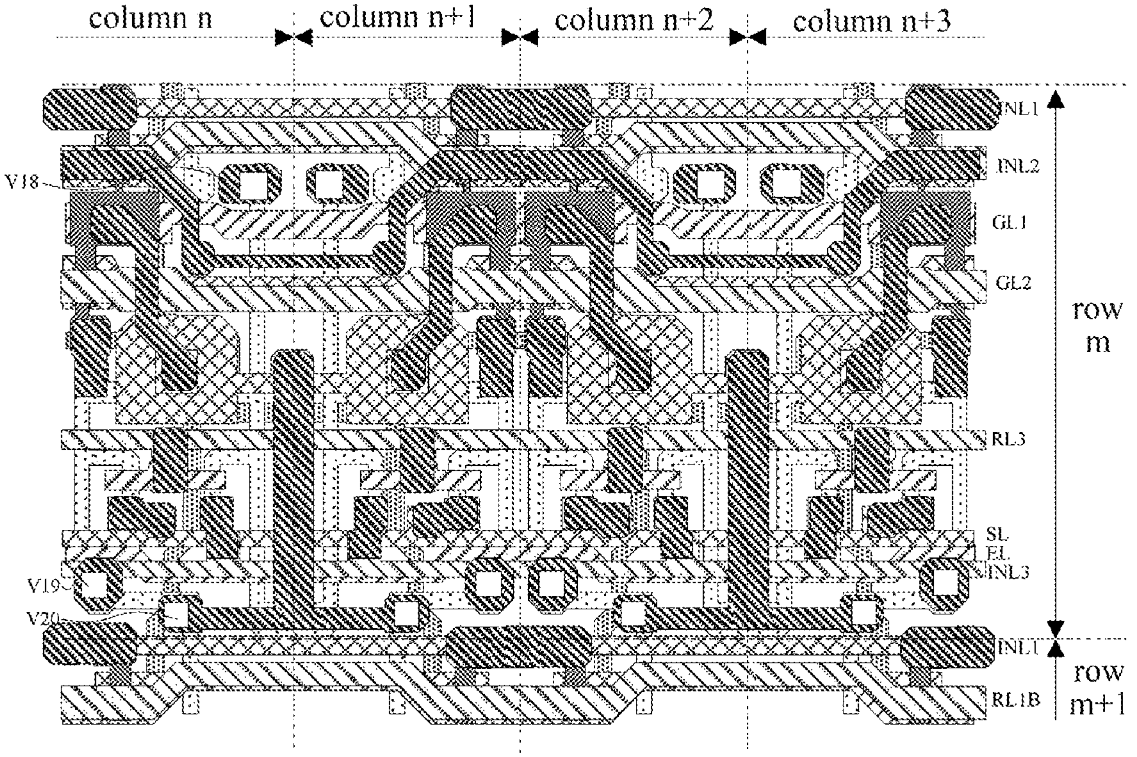
FIG. 22 is a schematic diagram after a first planarization layer pattern is formed.

In an exemplary embodiment, as shown in FIG. 22, the plurality of via patterns include an eighteenth via V18 to a twentieth via V20 opened on the seventh insulating layer and the first planarization layer. The eighteenth via V18 exposes a first electrode of the fourth transistor, the nineteenth via V19 exposes a second electrode of the sixth transistor, and the twentieth via V20 exposes a first electrode of the fifth transistor.

Figure 23A:
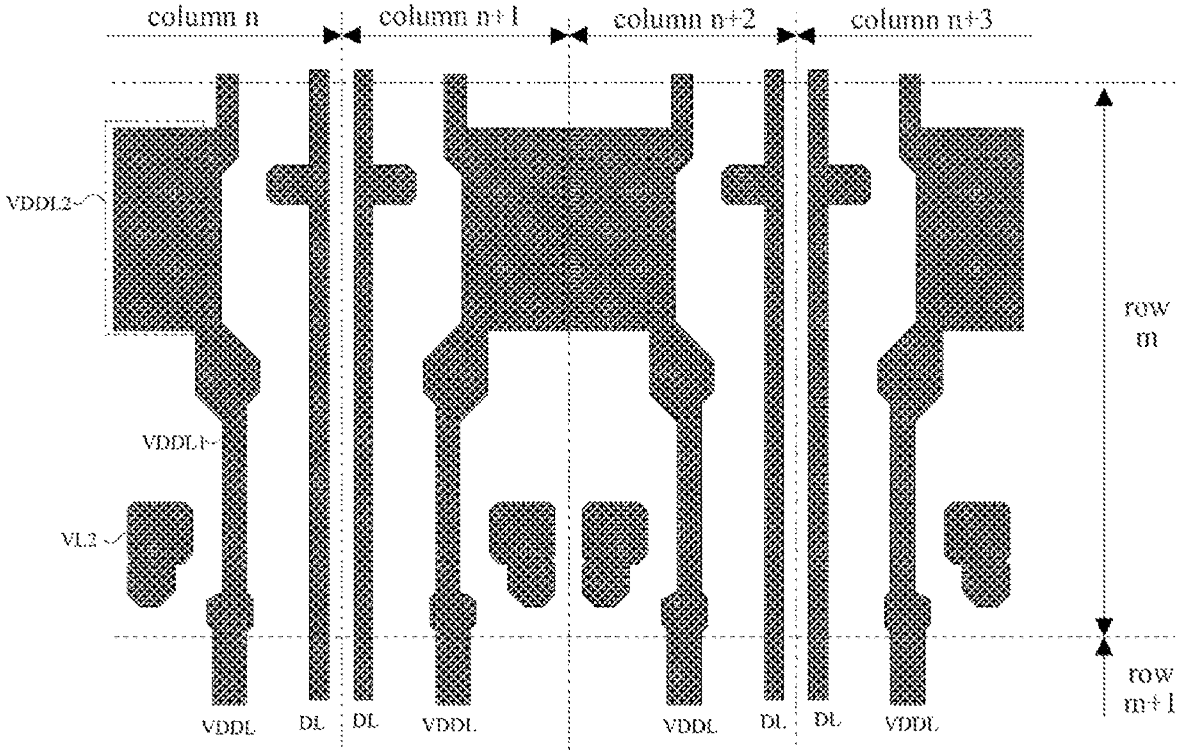
FIG. 23A is a schematic diagram of a fifth conductive layer pattern.
Figure 23B:
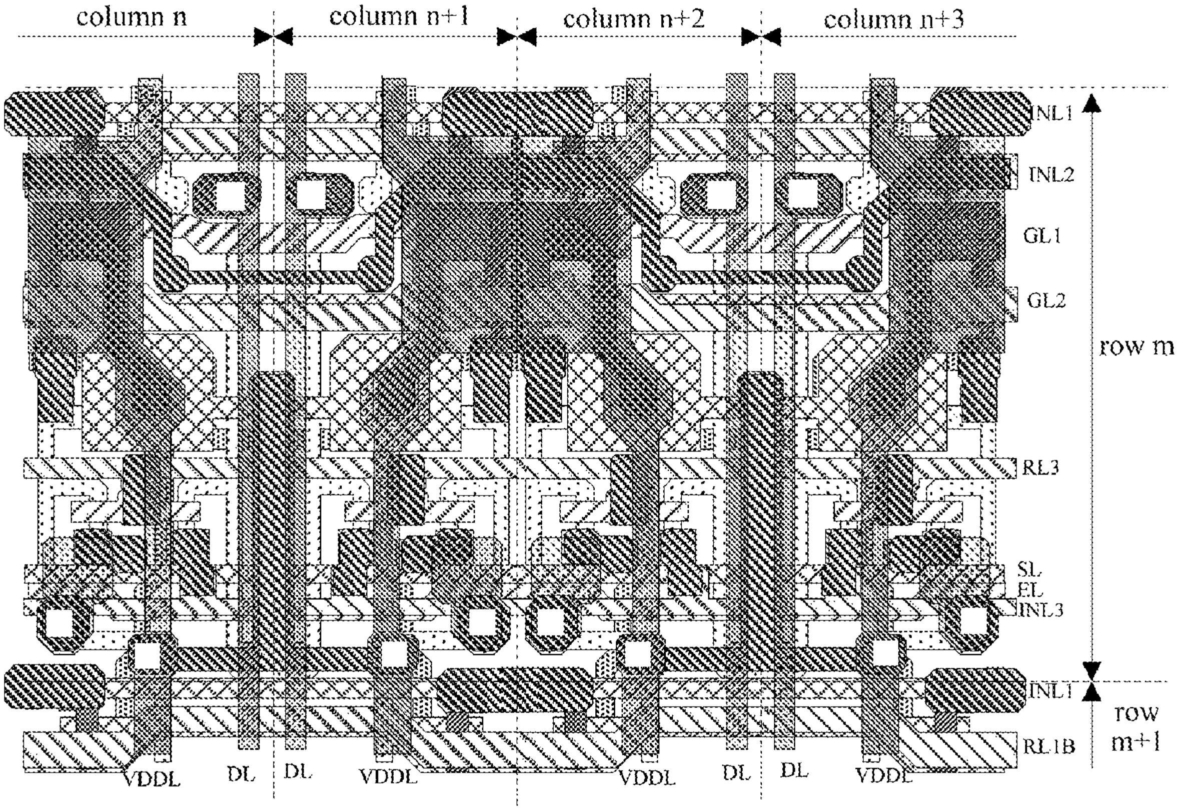
FIG. 23B is a schematic diagram after the fifth conductive layer pattern is formed.

(10) Forming a fifth conductive layer pattern, which includes: depositing a fifth conductive film on the base substrate on which the aforementioned patterns are formed, and patterning the fifth conductive film by a patterning process to form the fifth conductive layer pattern, as shown in FIGS. 23A and 23B, wherein FIG. 23A is a schematic diagram of the fifth conductive layer pattern and FIG. 23B is a schematic diagram after the fifth conductive layer pattern is formed.

In an exemplary embodiment, as shown in FIGS. 23A and 23B, the fifth conductive layer may include a first power supply line VDDL a data signal line DL and a second connection electrode VL2.

In an exemplary embodiment, the data signal line DL and the first power supply line VDDL connected to the pixel circuit are located on a same side of the second connection electrode VL2.

In an exemplary embodiment, the first power supply line VDDL connected to the pixel circuit may include a power supply body part VDDL1 and a power supply connection part VDDL2 connected with each other, wherein the power supply connection part VDDL2 is located on a side of the power supply body part VDDL1 away from the data signal line DL. The power supply connection part of the first power supply line connected to the pixel circuit is connected with the power supply connection part of the first power supply line to which the second adjacent pixel circuit is connected.

In an exemplary embodiment, the power supply body part VDDL1 extends in the second direction.

In an exemplary embodiment, the orthographic projection of the power supply connection VDDL2 on the base substrate overlaps a part of the orthographic projections of the active connection part, the second scanning signal line, the first scanning signal line, and the second initial signal line on the base substrate. The power supply connection part VDDL2 may have a square shape.

In an exemplary embodiment, the data signal line DL connected to the pixel circuit is electrically connected with a first electrode of the fourth transistor through the eighteenth via, the second connection electrode VL2 is electrically connected with a second electrode of the sixth transistor through the nineteenth via, and the first power supply line VDDL connected to the pixel circuit is electrically connected with a first electrode of the fifth transistor through the twentieth via.

(10) Forming a light emitting structure layer, which includes: coating a second planarization film on the base substrate on which the aforementioned patterns are formed, patterning the second planarization film to form a second planarization layer pattern, depositing an anode film on the base substrate on which the aforementioned patterns are formed, patterning the anode film by a patterning process to form an anode layer pattern, depositing a pixel definition film on the base substrate on which the aforementioned patterns are formed, patterning the pixel definition film by a patterning process to form a pixel definition layer pattern exposing the anode layer pattern, coating an organic light emitting material on the base substrate on which the pixel definition layer pattern is formed, patterning the organic light emitting material by a patterning process to form an organic structure layer pattern, depositing a cathode film on the base substrate on which the organic material layer pattern is formed, and patterning the cathode film by a patterning process to form the cathode layer.

In an exemplary embodiment, the organic structure layer may include an organic light emitting layer of a light emitting element.

In an exemplary embodiment, the cathode layer may include cathodes of a plurality of light emitting elements.

In an exemplary embodiment, the first semiconductor layer may be an amorphous silicon layer or a polysilicon layer.

In an example embodiment, the second semiconductor layer may be a metal oxide layer. The metal oxide layer may be made of an oxide containing indium and tin, an oxide containing tungsten and indium, an oxide containing tungsten and indium and zinc, an oxide containing titanium and indium, an oxide containing titanium and indium and tin, an oxide containing indium and zinc, an oxide containing silicon and indium and tin, or an oxide containing indium or gallium and zinc, etc. The metal oxide layer may be a single layer, or a double-layer, or may be a multi-layer.

In an exemplary embodiment, the first conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the first conductive layer may include: molybdenum.

In an exemplary embodiment, the second conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the second conductive layer may include molybdenum.

In an exemplary embodiment, the third conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, a manufacturing material of the third conductive layer may include molybdenum.

In an exemplary embodiment, the fourth conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the third conductive layer may be a three-layer stacked structure formed of titanium, aluminum and titanium.

In an exemplary embodiment, the fifth conductive layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be a three-layer stacked structure formed of titanium, aluminum and titanium.

In an exemplary embodiment, the anode layer may be made of a transparent conductive material, such as any one or more of indium gallium zinc oxide (a-IGZO), zinc nitride oxide (ZnON), and indium zinc tin oxide (IZTO).

In an exemplary embodiment, the cathode layer may be made of a metal material, such as any one or more of argentum (Ag), copper (Cu), aluminum (Al), and molybdenum (Mo), or alloy materials of the above conductive materials, such as an Aluminum Neodymium alloy (AlNd) or a Molybdenum Niobium alloy (MoNb), and may be of a single-layer structure or a multi-layer composite structure, such as Mo/Cu/Mo. Exemplarily, the fourth conductive layer may be of a three-layer stacked structure formed of titanium, aluminum, and titanium.

In an exemplary embodiment, the first insulating layer, the second insulating layer, the third insulating layer, the fourth insulating layer, the fifth insulating layer, the sixth insulating layer, and the seventh insulating layer may be made of any one or more of Silicon Oxide (SiOx), Silicon Nitride (SiNx), and Silicon Oxynitride (SiON), and may be a single layer, a multi-layer, or a composite layer.

In an exemplary embodiment, the first planarization layer and the second planarization layer may be made of an organic material.

The display substrate according to the embodiment of the present disclosure may be applied to display products with any resolution.

The embodiment of the disclosure also provides a driving method of a pixel circuit, which is configured to drive the pixel circuit, and the driving method of the pixel circuit provided by the embodiment of the disclosure may include the following acts.

Act 100: the first control sub-circuit provides the signal of the first initial signal terminal or the third node to the first node under control of the first reset signal terminal and the second scanning signal terminal, and provides the signal of the second initial signal terminal to the fourth node under control of the second reset signal terminal;

Act 200: the second control sub-circuit provides the signal of the third initial signal terminal or the data signal terminal to the second node under control of the third reset signal terminal and the first scanning signal terminal;

Act 300: the third control sub-circuit provides a first signal to the third node in the display stage and a second signal to the third node or obtains a signal of the third node in the non-display stage under control of the third reset signal terminal;

Act 400: the driving sub-circuit provides driving current to the third node under control of the first node and the second node;

Act 500: the light emitting control sub-circuit provides the signal of the first power supply terminal to the second node and the signal of the third node to the fourth node under control of the light emitting signal terminal.

The pixel circuit is the pixel circuit according to any one of the foregoing embodiments, and the implementation principle and implementation effects are similar, which will not be repeated here.

An embodiment of the present disclosure also provides a display apparatus including a display substrate.

The display substrate is the display substrate according to any of the aforementioned embodiments, and has similar implementation principles and implementation effects, which will not be repeated here.

In an exemplary embodiment, the display apparatus may be any product or component with a display function, such as a liquid crystal panel, electronic paper, an OLED panel, an Active-Matrix Organic Light Emitting Diode (AMOLED for short) panel, a mobile phone, a tablet computer, a television, a display, a notebook computer, a digital photo frame, or a navigator.

The accompanying drawings of the present disclosure only involve the structures involved in the embodiments of the present disclosure, and other structures may refer to usual designs.

For the sake of clarity, in the accompanying drawings used for describing the embodiments of the present disclosure, a thickness and dimension of a layer or a micro structure is enlarged. It may be understood that when an element such as a layer, a film, a region, or a substrate is described as being "on" or "under" another element, the element may be "directly" located "on" or "under" the other element, or there may be an intermediate element.

Although the implementation modes disclosed in the present disclosure are as above, the described contents are only implementation modes used for convenience of understanding the present disclosure and are not intended to limit the present disclosure. Any person skilled in the art to which the present disclosure pertains may make any modification and variation in implementation forms and details without departing from the spirit and scope disclosed in the present disclosure. However, the scope of patent protection of the present disclosure is still subject to the scope defined by the appended claims.

The invention claimed is:

1. A pixel circuit disposed in a display substrate, the display substrate comprises: a display stage and a non-display stage, the pixel circuit is configured to drive a light emitting element to emit light in the display stage, and comprises: a first control sub-circuit, a second control sub-circuit, a third control sub-circuit, a fourth control sub-circuit, a light emitting control sub-circuit, and a driving sub-circuit;

the first control sub-circuit is electrically connected with a first power supply terminal, a second scanning signal terminal, a first reset signal terminal, a second reset signal terminal, a first initial signal terminal, a second initial signal terminal, a first node, a third node and a fourth node, respectively, and is configured to provide a signal of the first initial signal terminal or the third node to the first node under control of the first reset signal terminal and the second scanning signal terminal, and provide a signal of the second initial signal terminal to the fourth node under control of the second reset signal terminal;

the second control sub-circuit is electrically connected with a first scanning signal terminal, a third reset signal terminal, a third initial signal terminal, a data signal terminal and a second node, respectively, and is configured to provide a signal of the third initial signal terminal or the data signal terminal to the second node under control of the third reset signal terminal and the first scanning signal terminal;

the third control sub-circuit is electrically connected with the third reset signal terminal, a control signal terminal and the third node respectively, and is configured to provide a first signal to the third node in the display stage and provide a second signal to the third node or acquire a signal of the third node in the non-display stage under control of the third reset signal terminal;

the driving sub-circuit is electrically connected with the first node, the second node and the third node, respectively, and is configured to provide driving current to the third node under control of the first node and the second node;

the light emitting control sub-circuit is electrically connected with a light emitting signal terminal, the first power supply terminal, the second node, the third node and the fourth node respectively, and is configured to provide the signal of the first power supply terminal to the second node and the signal of the third node to the fourth node under control of the light emitting signal terminal;

the light emitting element is electrically connected with the fourth node and a second power supply terminal respectively;

the voltage value of the first signal is less than the voltage value of the signal of the third initial signal terminal, and the voltage value of the second signal is greater than the voltage value of the signal of the third initial signal terminal.

2. The pixel circuit of claim 1, wherein, in the display stage, when the signal of the first reset signal terminal is an effective level signal, the signal of the third reset signal terminal is an effective level signal, and the signals of the first scanning signal terminal, the second scanning signal terminal and the light emitting signal terminal are ineffective level signals;

when the first scanning signal terminal is an effective level signal, the signal of the second scanning signal terminal is an effective level signal, and the signals of the first reset signal terminal, the third reset signal terminal and the light emitting signal terminal are ineffective level signals;

voltage values of the signals of the first initial signal terminal, the second initial signal terminal and the third initial signal terminal are constant.

3. The pixel circuit of claim 2, wherein, in the display stage, the occurrence time of the signal of the second reset signal terminal being an effective level signal is before the occurrence time of the signal of the first reset signal terminal being an effective level signal, or the occurrence time of the signal of the second reset signal terminal being an effective level signal is within the occurrence time of the signal of the third reset signal terminal being an effective level signal, or the occurrence time of the signal of the second reset signal terminal being an effective level signal is within the occurrence time of the signal of the first scanning signal terminal being an effective level signal, or the occurrence time of the signal of the second reset signal terminal being an effective level signal is after the occurrence time of the signal of the first scanning signal terminal being an effective level signal.

4. The pixel circuit of claim 3, wherein the signal of the second reset signal terminal is the same as the signal of the third reset signal terminal when the occurrence time of the signal of the second reset signal terminal being an effective level signal is within the occurrence time of the signal of the third scanning signal terminal being an effective level signal;

the signal of the second reset signal terminal is the same as the signal of the first scanning signal terminal, when the occurrence time of the signal of the second reset signal terminal being an effective level signal is within the occurrence time of the signal of the first scanning signal terminal being an effective level signal.

5. The pixel circuit of claim 1, wherein the first control sub-circuit comprises: a first reset sub-circuit, a second reset sub-circuit, a compensation sub-circuit, and a storage sub-circuit;

the first reset sub-circuit is electrically connected with the first reset signal terminal, the first initial signal terminal and the first node respectively, and is configured to provide the signal of the first initial signal terminal to the first node under control of the first reset signal terminal;

the second reset sub-circuit is electrically connected with the second reset signal terminal, the second initial signal terminal and the fourth node respectively, and is configured to provide the signal of the second initial signal terminal to the fourth node under control of the second reset signal terminal;

the compensation sub-circuit is electrically connected with the first node, the third node and the second scanning signal terminal respectively, and is configured to provide the signal of the third node to the first node under control of the second scanning signal terminal;

the storage sub-circuit is electrically connected with the first power supply terminal and the first node, respectively, and is configured to store the voltage difference between the signal of the first power supply terminal and the signal of the first node.

6. The pixel circuit of claim 5, wherein the first reset sub-circuit comprises: a first transistor, the second reset sub-circuit comprises: a seventh transistor, the compensation sub-circuit comprises: a second transistor, and the storage sub-circuit comprises: a capacitor, the capacitor comprises: a first plate and a second plate;

a control electrode of the first transistor is electrically connected with the first reset signal terminal, a first electrode of the first transistor is electrically connected with the first initial signal terminal, and a second electrode of the first transistor is electrically connected with the first node;

a control electrode of the second transistor is electrically connected with the second scanning signal terminal, a first electrode of the second transistor is electrically connected with the first node, and a second electrode of the second transistor is electrically connected with the third node;

a control electrode of the seventh transistor is electrically connected with the second reset signal terminal, a first electrode of the seventh transistor is electrically connected with the second initial signal terminal, and a second electrode of the seventh transistor is electrically connected with the fourth node;

the first plate of the capacitor is electrically connected with the first node, and the second plate of the capacitor is electrically connected with the first power supply terminal.

7. The pixel circuit of claim 1, wherein the second control sub-circuit comprises: a third reset sub-circuit and a write sub-circuit;

the third reset sub-circuit is electrically connected with the third reset signal terminal, the third initial signal terminal and the second node respectively, and is configured to provide the signal of the third initial signal terminal to the second node under control of the third reset signal terminal;

the write sub-circuit is electrically connected with the first scanning signal terminal, the data signal terminal and the second node, respectively, and is configured to provide the signal of the data signal terminal to the second node under control of the first scanning signal terminal.

8. The pixel circuit of claim 7, wherein the write sub-circuit comprises: a fourth transistor, and the third reset sub-circuit comprises: an eighth transistor;

a control electrode of the fourth transistor is electrically connected with the first scanning signal terminal, a first electrode of the fourth transistor is electrically connected with the data signal terminal, and a second electrode of the fourth transistor is electrically connected with the second node;

a control electrode of the eighth transistor is electrically connected with the third reset signal terminal, a first electrode of the eighth transistor is electrically connected with the third initial signal terminal, and a second electrode of the eighth transistor is electrically connected with the second node.

9. The pixel circuit of claim 1, wherein the third control sub-circuit comprises: a ninth transistor;

a control electrode of the ninth transistor is electrically connected with the third reset signal terminal, a first electrode of the ninth transistor is electrically connected with the control signal terminal, and a second electrode of the ninth transistor is electrically connected with the third node;

the first control sub-circuit comprises: a first transistor, a second transistor, a seventh transistor, and a capacitor, the capacitor comprising: a first plate and a second plate; the second control sub-circuit comprises a fourth transistor and an eighth transistor; the third control sub-circuit comprises a ninth transistor, the driving sub-circuit comprises a third transistor, and the light emitting control sub-circuit comprises a fifth transistor and a sixth transistor;

a control electrode of the first transistor is electrically connected with the first reset signal terminal, a first electrode of the first transistor is electrically connected with the first initial signal terminal, and a second electrode of the first transistor is electrically connected with the first node;

a control electrode of the second transistor is electrically connected with the second scanning signal terminal, a first electrode of the second transistor is electrically connected with the first node, and a second electrode of the second transistor is electrically connected with the third node;

a control electrode of the third transistor is electrically connected with the first node, a first electrode of the third transistor is electrically connected with the second node, and a second electrode of the third transistor is electrically connected with the third node;

a control electrode of the fourth transistor is electrically connected with the first scanning signal terminal, a first electrode of the fourth transistor is electrically connected with the data signal terminal, and a second electrode of the fourth transistor is electrically connected with the second node;

a control electrode of the fifth transistor is electrically connected with the light emitting signal terminal, a first electrode of the fifth transistor is electrically connected with the first power supply terminal, and a second electrode of the fifth transistor is electrically connected with the second node;

a control electrode of the sixth transistor is electrically connected with the light emitting signal terminal, a first electrode of the sixth transistor is electrically connected with the third node, and a second electrode of the sixth transistor is electrically connected with the fourth node;

a control electrode of the seventh transistor is electrically connected with the second reset signal terminal, a first electrode of the seventh transistor is electrically connected with the second initial signal terminal, and a second electrode of the seventh transistor is electrically connected with the fourth node;

a control electrode of the eighth transistor is electrically connected with a third reset signal terminal, a first electrode of the eighth transistor is electrically connected with the third initial signal terminal, and a second electrode of the eighth transistor is electrically connected with the second node;

a control electrode of the ninth transistor is electrically connected with the third reset signal terminal, a first electrode of the ninth transistor is electrically connected with the control signal terminal, and a second electrode of the ninth transistor is electrically connected with the third node;

the first plate of the capacitor is electrically connected with the first node, and the second plate of the capacitor is electrically connected with the first power supply terminal;

wherein the first transistor and the second transistor are of opposite transistor types to the third transistor to the ninth transistor;

the first transistor and the second transistor are oxide transistors and are N-type transistors.

10. A display substrate comprising: a base substrate, and a circuit structure layer and a light emitting structure layer sequentially disposed on the base substrate, the light emitting structure layer comprises: a light emitting element, the circuit structure layer comprises: pixel circuits arranged in an array of claim 1.

11. The display substrate of claim 10, wherein, when the occurrence time of the signal of the second reset signal terminal being an effective level signal is before the occurrence time of the signal of the first reset signal terminal being an effective level signal, the signals of the second reset signal terminals of the pixel circuits of an i-th row are the same as the signals of the first scanning signal terminals of the pixel circuits of an i−1th row;

when the occurrence time of the signal of the second reset signal terminal being an effective level signal is after the occurrence time of the signal of the first scanning signal terminal being an effective level signal, the signals of the second reset signal terminals of the pixel circuits of the i-th row are the same as the signals of the first scanning signal terminals of the pixel circuits of the i+1th row.

12. The display substrate of claim 10, the circuit structure layer further comprises: a plurality of first reset signal lines, a plurality of second reset signal lines, a plurality of third reset signal lines, a plurality of first scanning signal lines, a plurality of second scanning signal lines, a plurality of first initial signal lines, a plurality of second initial signal lines, a plurality of third initial signal lines, a plurality of light emitting signal lines and a plurality of control signal lines extending in a first direction and arranged in a second direction, and a plurality of first power supply lines and a plurality of data signal lines extending along the second direction and arranged along the first direction, the first direction intersects the second direction;

the first reset signal terminal of the pixel circuit is electrically connected with the first reset signal line, the second reset signal terminal is connected with the second reset signal line, the third reset signal terminal is electrically connected with the third reset signal line, the first scanning signal terminal is electrically connected with the first scanning signal line, the second scanning signal terminal is electrically connected with the second scanning signal line, the light emitting signal terminal is electrically connected with the light emitting signal line, the first initial signal terminal is electrically connected with the first initial signal line, the second initial signal terminal is electrically connected with the second initial signal line, the second initial signal terminal is electrically connected with the second initial signal line, the control signal terminal is electrically connected with the control signal line, the first power supply terminal is electrically connected with the first power supply line, and the data signal terminal is electrically connected with the data signal line.

13. The display substrate of claim 12, further comprising: a first chip connected with the control signal line and a second chip connected with the data signal line;

the first chip is configured to provide a first signal to the control signal line in a display stage, provide a second signal to the control signal line or acquire the signal of the control signal line in a non-display stage, and further configured to obtain a threshold voltage of the third transistor according to the signal of the control signal line, generate a control signal according to the threshold voltage of the third transistor, and transmit the control signal to the second chip;

the second chip provides a signal to the data signal line according to the control signal.

14. The display substrate of claim 12, wherein pixel structures of adjacent pixel circuits located in a same row are symmetrical with respect to a virtual straight line extending in the second direction;

adjacent pixel circuits located on a same row as the pixel circuit comprise a first adjacent pixel circuit and a second adjacent pixel circuit.

15. The display substrate of claim 12, wherein the pixel circuit comprises: a first transistor to a ninth transistor, and a control electrode of the first transistor and a control electrode of the second transistor each comprise: a first control electrode and a second control electrode;

the first reset signal line comprises a first sub-reset signal line and a second sub-reset signal line which are provided in different layers and connected with each other, the first sub-reset signal line and the first control electrode of the first transistor are provided in a same layer, and the second sub-reset signal line and the second control electrode of the first transistor are provided in a same layer;

the second scanning signal line comprises a first sub-scanning signal line and a second sub-scanning signal line which are provided in different layers and connected with each other, the first sub-scanning signal line and the first control electrode of the second transistor are provided in a same layer, and the second sub-scanning signal line and the second control electrode of the second transistor are provided in a same layer.

16. The display substrate of claim 15, wherein the pixel circuit further comprises a capacitor, the capacitor comprises: a first plate and a second plate, the circuit structure layer comprises a first insulating layer, a first semiconductor layer, a second insulating layer, a first conductive layer, a third insulating layer, a second conductive layer, a fourth insulating layer, a second semiconductor layer, a fifth insulating layer, a third conductive layer, a sixth insulating layer, a fourth conductive layer, a seventh insulating layer, a first planarization layer and a fifth conductive layer which are sequentially stacked on the base substrate;

the first semiconductor layer comprises an active layer of a third transistor to an active layer of a ninth transistor located in at least one pixel circuit;

the first conductive layer comprises: a first scanning signal line, a light emitting signal line, and a first plate of a capacitor, a control electrode of a third transistor to a control electrode of a ninth transistor located in at least one pixel circuit;

the second conductive layer comprises a first initial signal line, a first sub-reset signal line, a first sub-scanning signal line, a control signal line, and a second plate of a capacitor, a first control electrode of a first transistor and a first control electrode of a second transistor located in at least one pixel circuit;

the second semiconductor layer comprises an active layer of a first transistor, an active layer of a second transistor and an active connection part located in at least one pixel circuit; the active connection part is configured to connect the active layer of the first transistor and the active layer of the second transistor;

the third conductive layer comprises a second sub-reset signal line, a second sub-scanning signal line, a third reset signal line and a third initial signal line, and a second control electrode of a first transistor and a second control electrode of a second transistor located in at least one pixel circuit;

the fourth conductive layer comprises: a second initial signal line and a first electrode and a second electrode of a first transistor, a first electrode and a second electrode of the second transistor, a first electrode of the fourth transistor, a first electrode of the fifth transistor, a second electrode of the sixth transistor, a first electrode and a second electrode of the seventh transistor, a first electrode of the eighth transistor, a first electrode of the ninth transistor and a first connection electrode located in at least one pixel circuit; the first connection electrode is configured to connect a control electrode of the eighth transistor, a control electrode of the ninth transistor and the third reset signal line;

the fifth conductive layer comprises a first power supply line, a data signal line, and a second connection electrode located in at least one pixel circuit, the second connection electrode is configured to connect a second electrode of the sixth transistor and the light emitting element.

17. The display substrate of claim 16, wherein the circuit structure layer further comprises: a light shielding layer positioned on a side of the first insulating layer close to the base substrate, the light shielding layer comprises: light shielding parts and light shielding connection parts arranged in an array and disposed at intervals; the light shielding connection part is configured to connect adjacent light shielding parts;

the orthographic projection of the light shielding part on the base substrate at least overlaps a part of the orthographic projection of the active layer of the third transistor on the base substrate.

18. The display substrate of claim 16, wherein a control electrode of the eighth transistor and a control electrode of the ninth transistor are of an integrally formed structure, the first scanning signal line and the light emitting signal line connected to the pixel circuit are respectively located on two sides of the first plate of the capacitor of the pixel circuit, and the integrally formed structure of the control electrode of the eighth transistor and the control electrode of the ninth transistor is located between the first plate of the capacitor and the light emitting signal line connected to the pixel circuit; and/or the first control electrode of the first transistor and the first sub-reset signal line are of an integrally formed structure, and the first control electrode of the second transistor and the first sub-scanning signal line are of an integrally formed structure, a first initial signal line, a first sub-reset signal line and a first sub-scanning signal line connected to the pixel circuit extend in a first direction and are located on the same side of the second plate of the capacitor of the pixel circuit, the first sub-reset signal line is located on a side of the first initial signal line close to the second plate of the capacitor of the pixel circuit, and the first sub-scanning signal line is located on a side of the first sub-reset signal line close to the second plate of the capacitor of the pixel circuit the control signal line is located on a side of the second plate of the capacitor of the pixel circuit away from the first sub-scanning signal line, the orthographic projection of the first scanning signal line on the base substrate is located between the orthographic projection of the first sub-reset signal line on the base substrate and the orthographic projection of the first sub-scanning signal line on the base substrate, the orthographic projection of the integrally formed structure of a control electrode of the eighth transistor and a control electrode of the ninth transistor on the base substrate is located between the orthographic projection of the second plate of the capacitor on the base substrate and the orthographic projection of the control signal line on the base substrate, the orthographic projection of the control signal line on the base substrate is located between the orthographic projection of the light emitting signal line on the base substrate and the orthographic projection of the integrally formed structure of the control electrode of the eighth transistor and the control electrode of the ninth transistor on the base substrate, the second plate of the capacitor of the pixel circuit is electrically connected with the second plate of the capacitor of the first adjacent pixel circuit; and/or an active layer of the first transistor and an active layer of the second transistor are respectively located on two sides of the active connection part, the orthographic projection of the active layer of the first transistor on the base substrate overlaps the orthographic projection of the first initial signal line on the base substrate, the orthographic projection of the active layer of the second transistor on the base substrate overlaps the orthographic projection of the first sub-scanning signal line on the base substrate, the orthographic projection of the active connection part on the base substrate at least overlaps a part of the orthographic projection of the first scanning signal line on the base substrate; and/or a second control electrode of the first transistor and the second sub-reset signal line are of an integrally formed structure, and a second control electrode of the second transistor and the second sub-scanning signal line are of an integrally formed structure, the second sub-scanning signal line is located between the second sub-reset signal line and the third reset signal line, and the third initial signal line is located on a side of the third reset signal line away from the second sub-reset signal line, the orthographic projection of the second sub-reset signal line on the base substrate at least overlaps a part of the orthographic projection of the first sub-reset signal line on the base substrate and is located between the orthographic projection of the first initial signal line on the base substrate and the orthographic projection of the first scanning signal line on the base substrate, the orthographic projection of the second sub-scanning signal line on the base substrate at least overlaps a part of the orthographic projection of the first sub-scanning signal line on the base substrate and is located between the orthographic projection of the first scanning signal line on the base substrate and the orthographic projection of the second plate of the capacitor on the base substrate, the orthographic projection of the third reset signal line on the base substrate is located between the orthographic projection of the second plate of the capacitor on the base substrate and the orthographic projection of the integrally formed structure of the control electrode of the eighth transistor and the control electrode of the ninth transistor on the base substrate, the orthographic projection of the third initial signal line on the base substrate is located on a side of the orthographic projection of the control signal line on the base substrate away from the orthographic projection of the second plate of the capacitor on the base substrate, and overlaps a part of the orthographic projections of the light emitting signal line and the control signal line on the base substrate; and/or the sixth insulating layer is opened with a plurality of via patterns, the plurality of via patterns comprise: a first via to a seventh via opened on the second insulating layer to the sixth insulating layer, an eighth via and ninth via opened on the third to sixth insulating layers, a tenth via to a twelfth via opened on the fourth to sixth insulating layers, a thirteenth via to a fifteenth via opened on the fifth and sixth insulating layers, and a sixteenth via and a seventeenth via opened on the sixth insulating layer, the third via exposes the active layer of the fifth transistor, the tenth via exposes the first initial signal line, and the eleventh via exposes the second plate of the capacitor; a virtual straight line extending in the second direction passes through the third via and the eleventh via, the third via of the pixel circuit and the third via of the first adjacent pixel circuit are a same via, the eleventh via of the pixel circuit and the eleventh via of the first adjacent pixel circuit are a same via, the tenth via of the pixel circuit and the tenth via of the second adjacent pixel circuit are a same via; and/or the first electrode of the fifth transistor of the pixel circuit and the first electrode of the fifth transistor of the first adjacent pixel circuit are a same electrode, the orthographic projection of the second initial signal line on the base substrate overlaps a part of the orthographic projections of the first reset signal line and the first scanning signal line on the base substrate, the orthographic projection of the integrally formed structure of the second electrode of the first transistor and the second electrode of the second transistor on the base substrate at least overlaps a part of the orthographic projections of the active connection part, the second scanning signal line and the second plate of the capacitor on the base substrate, the orthographic projection of the first electrode of the fifth transistor on the base substrate overlaps the orthographic projections of the second plate of the capacitor, the third reset signal line, the control signal line, the light emitting signal line and the third initial signal line on the base substrate, the orthographic projection of the first connection electrode on the base substrate at least overlaps a part of the orthographic projections of the third reset signal line and the control electrode of the eighth transistor on the base substrate, the orthographic projection of the first electrode of the eighth transistor on the base substrate overlaps a part of the orthographic projections of the control signal line, the light emitting signal line and the third initial signal line on the base substrate, the orthographic projection of the first electrode of the ninth transistor on the base substrate overlaps a part of the orthographic projection of the control signal line on the base substrate; and/or the data signal line and the first power supply line connected to the pixel circuit are located on a same side of the second connection electrode, the first power supply line comprises: a power supply body part and a power supply connection part connected with each other, wherein, the power supply connection part is located on a side of the power supply body part away from the data signal line, the power supply connection part of the first power supply line connected to the pixel circuit is connected with the power supply connection part of the first power supply line connected to the second adjacent pixel circuit, the orthographic projection of the power supply connection part on the base substrate overlaps a part of the orthographic projections of the active connection part, the second scanning signal line, the first scanning signal line and the second initial signal line on the base substrate.

19. A display apparatus comprising: a display substrate of claim 10.

20. A driving method of a pixel circuit configured to drive the pixel circuit of claim 1, the method comprising:

the first control sub-circuit provides the signal of the first initial signal terminal or the third node to the first node under control of the first reset signal terminal and the second scanning signal terminal, and provides the signal of the second initial signal terminal to the fourth node under control of the second reset signal terminal;

the second control sub-circuit provides the signal of the third initial signal terminal or the data signal terminal to the second node under control of the third reset signal terminal and the first scanning signal terminal;

the third control sub-circuit provides a first signal to the third node in the display stage and a second signal to the third node or obtains a signal of the third node in the non-display stage under control of the third reset signal terminal;

the driving sub-circuit provides driving current to the third node under control of the first node and the second node;

the light emitting control sub-circuit provides the signal of the first power supply terminal to the second node and the signal of the third node to the fourth node under control of the light emitting signal terminal.

* * * * *